US009288249B1

(12) United States Patent
Chang et al.

(10) Patent No.: US 9,288,249 B1
(45) Date of Patent: Mar. 15, 2016

(54) CONTENT INTERACTION TECHNOLOGY

(71) Applicant: PurpleComm Inc., Santa Clara, CA (US)

(72) Inventors: Jack H. Chang, Saratoga, CA (US); William H. Sheu, Fremont, CA (US); Sherman Tuan, Cupertino, CA (US)

(73) Assignee: PurpleComm Inc., Santa Clara, CA (US)

( * ) Notice: Subject to any disclaimer, the term of this patent is extended or adjusted under 35 U.S.C. 154(b) by 294 days.

(21) Appl. No.: 13/958,498

(22) Filed: Aug. 2, 2013

(51) Int. Cl.
*G06F 3/00* (2006.01)
*H04L 29/06* (2006.01)
*G06F 17/30* (2006.01)
*H04N 21/462* (2011.01)
*H04N 5/44* (2011.01)
*G06F 3/0481* (2013.01)

(52) U.S. Cl.
CPC .......... *H04L 65/60* (2013.01); *G06F 17/30398* (2013.01); *H04N 5/4401* (2013.01); *H04N 21/4622* (2013.01); *G06F 3/0481* (2013.01)

(58) Field of Classification Search
USPC ........ 715/717, 719, 968; 725/109, 35, 43, 12, 725/16; 709/203, 204, 219; 340/995, 14; 701/25, 455
See application file for complete search history.

(56) References Cited

U.S. PATENT DOCUMENTS 6,760,916 B2   7/2004  Holtz et al.
6,865,483 B1 * 3/2005  Cook et al. ............... 340/995.14
7,089,579 B1   8/2006  Mao et al.
7,225,456 B2   5/2007  Kitsukawa et al.
7,228,560 B2   6/2007  Panabaker
7,624,416 B1 * 11/2009  Vandermolen et al. ........ 725/109
7,823,066 B1 * 10/2010  Kuramura ..................... 715/717
8,001,577 B2   8/2011  Fries
8,384,743 B2   2/2013  Gorti et al.
8,688,781 B2   4/2014  Taleb et al.
8,875,172 B1   10/2014  Chang et al.
9,015,759 B2 * 4/2015  Elend et al. ..................... 725/43
2002/0078456 A1   6/2002  Hudson et al.
2002/0184634 A1   12/2002  Cooper (Continued)

FOREIGN PATENT DOCUMENTS

WO   WO2006041784 A2   4/2006

OTHER PUBLICATIONS

U.S. Final Office Action for U.S. Appl. No. 12/795,007 dated Dec. 4, 2013, 13 pages.

(Continued)

*Primary Examiner* — Kyung H Shin
(74) *Attorney, Agent, or Firm* — Fish & Richardson P.C.

(57) ABSTRACT

Content interaction technology, in which data used in defining a point of interest that supplements content arranged in a channel is accessed. The accessed data defines timing information that indicates when the point of interest is used, output information that defines how the point of interest is output, and action information that defines one or more actions that occur based on user interaction with the point of interest. The point of interest is defined based on the timing information, the output information, and the action information and associated with the channel and/or a content link arranged in the channel. During a time at which a user has selected the channel, output of the point of interest in addition to content defined by the channel is controlled. An indication that the user interacted with the point of interest is received and an action defined by the action information is performed.

23 Claims, 48 Drawing Sheets

(56) References Cited

U.S. PATENT DOCUMENTS

| | | |
|---|---|---|
| 2003/0110503 A1 | 6/2003 | Perkes |
| 2003/0221197 A1 | 11/2003 | Fries et al. |
| 2005/0081244 A1 | 4/2005 | Barrett et al. |
| 2006/0075428 A1 | 4/2006 | Farmer et al. |
| 2007/0011702 A1 | 1/2007 | Vaysman |
| 2007/0277219 A1 | 11/2007 | Toebes et al. |
| 2008/0022320 A1 | 1/2008 | Ver Steeg |
| 2008/0086456 A1 | 4/2008 | Rasanen et al. |
| 2008/0115182 A1 | 5/2008 | van Willigenburg |
| 2008/0216020 A1 | 9/2008 | Plummer |
| 2009/0083815 A1 | 3/2009 | McMaster et al. |
| 2009/0254931 A1 | 10/2009 | Pizzurro et al. |
| 2011/0153631 A1 | 6/2011 | Kondasani |
| 2011/0161882 A1 | 6/2011 | Dasgupta et al. |
| 2011/0307298 A1 | 12/2011 | Russ |
| 2011/0321072 A1 | 12/2011 | Patterson et al. |
| 2012/0124630 A1 | 5/2012 | Wellen et al. |
| 2012/0291059 A1 | 11/2012 | Roberts et al. |
| 2013/0024891 A1* | 1/2013 | Elend et al. .................... 725/35 |
| 2013/0257900 A1* | 10/2013 | Brahmakal et al. ........... 345/619 |
| 2013/0262620 A1 | 10/2013 | Wood et al. |
| 2014/0149918 A1 | 5/2014 | Asokan et al. |

OTHER PUBLICATIONS

U.S. Final Office Action for U.S. Appl. No. 13/958,516 dated Jan. 30, 2015, 26 pages.

U.S. Non-Final Office Action for U.S. Appl. No. 12/795,007 dated May 16, 2013, 17 pages.

U.S. Non-Final Office Action for U.S. Appl. No. 13/958,508 dated Mar. 26, 2015, 35 pages.

U.S. Non-Final Office Action for U.S. Appl. No. 13/958,516 dated Sep. 30, 2014, 30 pages.

U.S. Notice of Allowance for U.S. Appl. No. 12/795,007 dated Jun. 24, 2014, 8 pages.

Xbox Live Fall 2011 Dashboard (2011), 9 pages.

* cited by examiner

300

```
┌─────────────────────────────────────────────────────────────┐
│ RECEIVE, FROM A CONTENT CURATOR, INPUT DEFINING MULTIPLE    │
│ CONTENT LINKS TO INCLUDE IN A CHANNEL ASSOCIATED WITH       │
│ THE CONTENT CURATOR, EACH CONTENT LINK INCLUDING AN         │
│ ADDRESS AT WHICH CONTENT IS MADE AVAILABLE OVER A           │
│                    NETWORK             302                  │
└─────────────────────────────────────────────────────────────┘
                              │
                              ▼
┌─────────────────────────────────────────────────────────────┐
│ DETERMINE SUPPLEMENTAL CHANNEL INFORMATION THAT             │
│ FACILITATES USER EXPERIENCE OF CONTENT                      │
│ LINKED TO BY AT LEAST ONE OF THE MULTIPLE                   │
│              CONTENT LINKS           304                    │
└─────────────────────────────────────────────────────────────┘
                              │
                              ▼
┌─────────────────────────────────────────────────────────────┐
│ DEFINE CHANNEL INFORMATION FOR THE CHANNEL ASSOCIATED       │
│ WITH THE CONTENT CURATOR BASED ON THE MULTIPLE CONTENT      │
│ LINKS AND THE SUPPLEMENTAL CHANNEL INFORMATION              │
│                                        306                  │
└─────────────────────────────────────────────────────────────┘
                              │
                              ▼
┌─────────────────────────────────────────────────────────────┐
│ PUBLISH THE DEFINED CHANNEL INFORMATION AT A CHANNEL        │
│ LINK TO MAKE THE CHANNEL INFORMATION AVAILABLE TO USER      │
│ DEVICES OF A CONTENT DELIVERY NETWORK                       │
│                                        308                  │
└─────────────────────────────────────────────────────────────┘
```

FIG. 3

Example DJ Channel
DJ Channel Name: My DJ Channel
DJ Channel Link: http://9x9.tv/channel/rssfeed/123456.html
Notes: Documentaries and other interesting content

| Content Link | Hot Index | Preview Content | Notes |
|---|---|---|---|
| http://isohunt.com/download/12345/torrentA.torrent | 1:20, 3:30, 4:30 | myChannel1.wmv | |
| http://9x9.tv/licensedcontent/video/54321.torrent | 15:20, 30:20 | myChannel2.wmv | |
| http://www.nonproftA.org/download/fileB.torrent | 00:00, 3:56 | | interesting documentary |
| http://9x9.tv/licensedcontent/video/22333.torrent | 00:40 | myChannel4.wmv | |
| http://www.youtube.com/watch?v=xxx&feature=featured | | | |
| http://www.broadcasterA.com/watch/show1-episode4 | 13:45, 32:45 | myChannel6.wmv | |

```
┌─────────────────────────────────────────────────┐
│  DETERMINE THAT ONE OR MORE MODIFICATIONS TO    │
│  CHANNEL INFORMATION THAT DEFINES A CHANNEL     │
│         ASSOCIATED WITH A CONTENT               │
│           CURATOR ARE NEEDED      1102          │
└─────────────────────────────────────────────────┘
                        │
                        ▼
┌─────────────────────────────────────────────────┐
│  IDENTIFY UPDATED CHANNEL INFORMATION THAT DEFINES │
│  UPDATES TO THE CHANNEL INFORMATION NEEDED TO MAKE THE │
│         ONE OR MORE MODIFICATIONS               │
│                                   1104          │
└─────────────────────────────────────────────────┘
                        │
                        ▼
┌─────────────────────────────────────────────────┐
│  PUBLISH THE UPDATED CHANNEL INFORMATION AT A CHANNEL │
│  LINK FOR THE CHANNEL SUCH THAT SUBSCRIBERS TO THE │
│  CHANNEL RECEIVE THE UPDATED CHANNEL INFORMATION │
│                                   1106          │
└─────────────────────────────────────────────────┘
```

```
┌─────────────────────────────────────────────────────────────┐
│ ACCESS DATA USED IN DEFINING A POINT OF INTEREST THAT       │
│ SUPPLEMENTS CONTENT ARRANGED IN A CHANNEL ASSOCIATED        │
│ WITH THE CONTENT CURATOR                                    │
│                                                        1602 │
└─────────────────────────────────────────────────────────────┘
                              │
                              ▼
┌─────────────────────────────────────────────────────────────┐
│ DEFINE THE POINT OF INTEREST BASED ON TIMING INFORMATION,   │
│ OUTPUT INFORMATION, AND ACTION INFORMATION                  │
│                                                        1604 │
└─────────────────────────────────────────────────────────────┘
                              │
                              ▼
┌─────────────────────────────────────────────────────────────┐
│ ASSOCIATE THE POINT OF INTEREST WITH AT LEAST ONE OF THE    │
│ CHANNEL ASSOCIATED WITH THE CONTENT CURATOR AND A           │
│ CONTENT LINK ARRANGED IN THE CHANNEL ASSOCIATED WITH        │
│ THE CONTENT CURATOR                                    1606 │
└─────────────────────────────────────────────────────────────┘
                              │
                              ▼
┌─────────────────────────────────────────────────────────────┐
│ CONTROL, BASED ON THE TIMING INFORMATION AND THE OUTPUT     │
│ INFORMATION, OUTPUT OF THE POINT OF INTEREST IN ADDITION    │
│ TO CONTENT DEFINED BY THE CHANNEL ASSOCIATED WITH THE       │
│ CONTENT CURATOR                                        1608 │
└─────────────────────────────────────────────────────────────┘
                              │
                              ▼
┌─────────────────────────────────────────────────────────────┐
│ RECEIVE AN INDICATION THAT THE USER INTERACTED WITH THE     │
│ POINT OF INTEREST OUTPUT IN ADDITION TO THE CONTENT         │
│ DEFINED BY THE CHANNEL ASSOCIATED WITH THE CONTENT          │
│ CURATOR                                                1610 │
└─────────────────────────────────────────────────────────────┘
                              │
                              ▼
┌─────────────────────────────────────────────────────────────┐
│ PERFORM AN ACTION DEFINED BY                                │
│ THE ACTION INFORMATION                                      │
│                                                        1612 │
└─────────────────────────────────────────────────────────────┘
```

FIG. 16

| Channel ~2102 | Episode ~2104 | Time ~2106 | Duration ~2108 | Type ~2110 | Display Text ~2112 | Button Text ~2114 | Action ~2116 |
|---|---|---|---|---|---|---|---|
| www.my3.com | www.cityep2.com | 5:34 | 30 secs | Link | Have you ever seen such a beautiful night | Plan Your Trip Online | Link to www.trav2.com/city2 |
| | | 10:00 | 10 secs | Instant Notification | Better Life Products | Get Shopping Information | Send Shopping Information to Mobile |
| | www.soc14.com | 32:30 | 2 mins | Scheduled Notification | Watch Highlights of the FIFA World Cup Championship | Remind me to watch | Send Reminder at 8:00PM on 7/30/2013 |
| www.cook8.com | www.tea143.com | 0:10 | 1 min | Poll | Which is your favorite one in tea time? | Tea; Cake; Coffee | Display Poll Results |

| | 3104 | 3106 | 3108 | 3110 | 3112 | 3114 | 3116 | 3118 | 3120 | 3122 | 3124 |
|---|---|---|---|---|---|---|---|---|---|---|---|
| 3102 | Channels | Episodes | Total POI | Channel POI | Episode POI | Total Response | Channel Response | Episode Response | Total Percent | Channel Percent | Episode Percent |
| Curator1 | 10 | 425 | 1200 | 200 | 1000 | 400 | 50 | 350 | 33% | 25% | 35% |
| Curator2 | 45 | 1275 | 10000 | 1200 | 8800 | 6000 | 1000 | 5000 | 60% | 83% | 56% |
| Curator3 | 5 | 150 | 400 | 50 | 350 | 380 | 50 | 330 | 95% | 100% | 94% |
| ⋯ | | | | | | | | | | | |
| CuratorN | 25 | 950 | 10000 | 3000 | 7000 | 2000 | 100 | 1900 | 20% | 3% | 27% |

CONTENT INTERACTION TECHNOLOGY

FIELD

The present disclosure generally relates to content interaction technology.

BACKGROUND

Content viewers today are exposed to an overwhelming amount of information and are challenged by the degree of interaction and personalization needed to manage this massive amount of information. In an era of digital communications, a user may be confused by an array of technology including traditional analog televisions, DVRs (Digital Video Recorders), PVRs (Personal Video Recorders), media centers, EPG (Electronic Program Guide)-based systems, Internet-related content, and traditional remote control devices.

SUMMARY

In one aspect, a method of defining a point of interest for content includes accessing data used in defining a point of interest that supplements content arranged in a channel associated with a content curator on a content delivery network. The accessed data defines timing information that indicates when the point of interest is used to supplement content arranged in the channel associated with the content curator on the content delivery network, output information that defines how the point of interest is output with content arranged in the channel associated with the content curator on the content delivery network, and action information that defines one or more actions that occur based on user interaction with the point of interest. The method also includes defining the point of interest based on the timing information, the output information, and the action information and associating the point of interest with at least one of (1) the channel associated with the content curator on the content delivery network and (2) a content link arranged in the channel associated with the content curator on the content delivery network. The method further includes, during a time at which a user has selected the channel associated with the content curator and is experiencing content defined by the channel associated with the content curator, controlling, based on the timing information and the output information, output of the point of interest in addition to the content defined by the channel associated with the content curator. In addition, the method includes receiving an indication that the user interacted with the point of interest output in addition to the content defined by the channel associated with the content curator and, based on the indication that the user interacted with the point of interest, performing, by at least one processor, an action defined by the action information.

Implementations may include one or more of the following features. For example, the timing information may indicate that the point of interest is to be output at a specific time during output of content linked to by the content link arranged in the channel associated with the content curator on the content delivery network and the method may include associating the point of interest with the content link arranged in the channel associated with the content curator on the content delivery network. In this example, the method may include controlling, at the specific time during output of the content linked to by the content link, output of the point of interest in addition to the content linked to by the content link. The method also may include making the point of interest available in multiple channels that are associated with the content curator and that each include the content link and withholding the point of interest from channels that are defined by other content curators on the content delivery network and that include the content link such that the point of interest is output only when the user is experiencing the content linked to by the content link from the channel associated with the content curator.

In some implementations, the timing information may indicate that the point of interest is to be output at a specific time during selection of the channel associated with the content curator on the content delivery network and the method may include associating the point of interest with the channel associated with the content curator on the content delivery network. In these implementations, the method may include controlling, at the specific time during selection of the channel associated with the content curator, output of the point of interest in addition to the content defined by the channel associated with the content curator. Further, in these implementations, the method may include controlling, at the specific time during selection of the channel associated with the content curator, output of the point of interest regardless of how the channel has been controlled during selection such that the point of interest is output with different content for different users.

The timing information indicates a duration of how long the point of interest is output to supplement content arranged in the channel associated with the content curator on the content delivery network and the method may include controlling, for the duration indicated by the timing information, output of the point of interest in addition to the content defined by the channel associated with the content curator. The output information may define text to be displayed with content arranged in the channel associated with the content curator on the content delivery network and the method may include adding the text defined by the output information to a display of the content defined by the channel associated with the content curator. In addition, the output information may define one or more user input controls to be displayed with content arranged in the channel associated with the content curator on the content delivery network and the method may include adding the one or more user input controls defined by the output information to a display of the content defined by the channel associated with the content curator.

In some examples, the action information defines a notification action that occurs based on user interaction with the point of interest and the method may include accessing information defined, by the notification action, to be communicated to the user that interacted with the point of interest, identifying communication information associated with the user that interacted with the point of interest, and sending, to the user that interacted with the point of interest using the identified communication information, the accessed information. The communication information may be for a communication mechanism that is different than a mechanism used in communicating the content defined by the channel associated with the content curator. In these examples, the method may include identifying an electronic mail address associated with the user that interacted with the point of interest and sending, to the user that interacted with the point of interest using the identified electronic mail address, the accessed information. Further, in these examples, the method may include identifying device information for a communication device of the user that is different than a device outputting the content defined by the channel associated with the content curator and sending, to the communication device of the user using the identified device information, the accessed information.

In some implementations, the action information may define a scheduled notification action that occurs based on user interaction with the point of interest. In these implementations, the method may include accessing information defined, by the scheduled notification action, to be communicated to the user that interacted with the point of interest and determining a time, defined by the scheduled notification action, at which to deliver the accessed information. Further, in these implementations, the method may include identifying communication information associated with the user that interacted with the point of interest, monitoring for the time at which to deliver the accessed information, and, based on the monitoring, sending, using the identified communication information, the accessed information to the user that interacted with the point of interest at the time at which to deliver the accessed information. The communication information may be for a communication mechanism that is different than a mechanism used in communicating the content defined by the channel associated with the content curator.

In some examples, the action information may define a poll action that occurs based on user interaction with the point of interest. In these examples, the method may include controlling, based on the timing information and the output information, output of a poll with a question and multiple answer input controls in addition to the content defined by the channel associated with the content curator and receiving an indication of a selection, by the user, of one of the multiple answer input controls. Also, in these examples, the method may include determining an answer to the poll for the user that corresponds to the one of the multiple answer input controls selected by the user, updating data tracking results of the poll based on the determined answer to the poll for the user, determining a result of the poll based on the updated data tracking results of the poll, and controlling output, to the user, of the determined result of the poll.

In some implementations, the point of interest may be an episode point of interest and the timing information may indicate that the episode point of interest is to be output at a specific time during output of content linked to by the content link arranged in the channel associated with the content curator on the content delivery network. In these implementations, the method may include associating the episode point of interest with the content link arranged in the channel associated with the content curator on the content delivery network and receiving, from the content curator, additional input defining a channel point of interest that supplements content arranged in the channel associated with the content curator on the content delivery network. The received additional input may define additional timing information that indicates when the channel point of interest is used to supplement content arranged in the channel associated with the content curator on the content delivery network, additional output information that defines how the channel point of interest is output with content arranged in the channel associated with the content curator on the content delivery network, and additional action information that defines one or more actions that occur based on user interaction with the channel point of interest. Also, in these implementations, the method may include defining the channel point of interest based on the additional timing information, the additional output information, and the additional action information, associating the channel point of interest with the channel associated with the content curator on the content delivery network, and determining that the channel point of interest conflicts with the episode point of interest. Further, in these implementations, the method may include accessing one or more rules used in resolving conflicts for points of interest, analyzing the channel point of interest and the episode point of interest with respect to the one or more rules, and, based on the analysis, selecting one of the channel point of interest and the episode point of interest to output in addition to the content defined by the channel associated with the content curator. In addition, the method may include accessing a rule that prioritizes channel points of interest over episode points of interest and selecting the channel point of interest.

In some examples, the method may include tracking, across multiple, different content curators that define channels on the content delivery network, points of interests that have been output to users of the content delivery network and responses to the points of interests that have been output to users of the content delivery network. In these examples, the method may include determining, for the multiple, different content curators, statistics related to use and effectiveness of points of interests based on the tracking of the points of interests that have been output to users of the content delivery network and the responses to the points of interests that have been output to users of the content delivery network.

In addition, the method may include receiving, from the content curator, input defining the point of interest that supplements content arranged in the channel associated with the content curator on the content delivery network. The method may include automatically, without input from the content curator, determining data used in defining the point of interest based on one or more rules that control definition of points of interest for the channel associated with the content curator on the content delivery network.

The method may include controlling a television to output the point of interest in addition to the content defined by the channel associated with the content curator and receiving, from a remote control that controls the television, one or more commands interacting with the point of interest. The method also may include controlling a mobile device to output the point of interest in addition to the content defined by the channel associated with the content curator and receiving, from a touch screen interface that controls the mobile device, touch input interacting with the point of interest. The method further may include controlling a computer to output the point of interest in addition to the content defined by the channel associated with the content curator and receiving, from at least one of a mouse and keyboard that control the computer, one or more commands interacting with the point of interest.

In another aspect, a system includes at least one computer and at least one computer-readable medium coupled to the at least one computer having instructions stored thereon which, when executed by the at least one computer, causes the at least one computer to perform operations. The operations include accessing data used in defining a point of interest that supplements content arranged in a channel associated with a content curator on a content delivery network. The accessed data defines timing information that indicates when the point of interest is used to supplement content arranged in the channel associated with the content curator on the content delivery network, output information that defines how the point of interest is output with content arranged in the channel associated with the content curator on the content delivery network, and action information that defines one or more actions that occur based on user interaction with the point of interest. The operations also include defining the point of interest based on the timing information, the output information, and the action information and associating the point of interest with at least one of (1) the channel associated with the content curator on the content delivery network and (2) a content link arranged in the channel associated with the content curator on the content delivery network. The operations further include, during a time at which a user has selected the channel associated with the content curator and is experiencing content defined by the channel associated with the content curator, controlling, based on the timing information and the output information, output of the point of interest in addition to the content defined by the channel associated with the content curator. In addition, the operations include receiving an indication that the user interacted with the point of interest output in addition to the content defined by the channel associated with the content curator and, based on the indication that the user interacted with the point of interest, performing an action defined by the action information.

In yet another aspect, at least one computer-readable storage medium is encoded with at least one computer program comprising instructions that, when executed, operate to cause a computer to perform operations. The operations include accessing data used in defining a point of interest that supplements content arranged in a channel associated with a content curator on a content delivery network. The accessed data defines timing information that indicates when the point of interest is used to supplement content arranged in the channel associated with the content curator on the content delivery network, output information that defines how the point of interest is output with content arranged in the channel associated with the content curator on the content delivery network, and action information that defines one or more actions that occur based on user interaction with the point of interest. The operations also include defining the point of interest based on the timing information, the output information, and the action information and associating the point of interest with at least one of (1) the channel associated with the content curator on the content delivery network and (2) a content link arranged in the channel associated with the content curator on the content delivery network. The operations further include, during a time at which a user has selected the channel associated with the content curator and is experiencing content defined by the channel associated with the content curator, controlling, based on the timing information and the output information, output of the point of interest in addition to the content defined by the channel associated with the content curator. In addition, the operations include receiving an indication that the user interacted with the point of interest output in addition to the content defined by the channel associated with the content curator and, based on the indication that the user interacted with the point of interest, performing an action defined by the action information.

The details of one or more implementations are set forth in the accompanying drawings and the description, below. Other potential features and advantages of the disclosure will be apparent from the description and drawings, and from the claims.

BRIEF DESCRIPTION OF THE DRAWINGS

FIGS. 3-8, 11, 12, 14, 16, 26, 27, 28, 30, 32, 36, 37, and 47 are flowcharts of exemplary processes.

FIG. 10 illustrates an exemplary channel definition.

FIG. 21 illustrates an example data structure that stores point of interest data.

FIG. 31 illustrates example data that reflects tracking of points of interest and responses to points of interest and statistics generated from the tracking of points of interest and responses to points of interest.

Like reference numbers represent corresponding parts throughout.

DETAILED DESCRIPTION

Figure 1:
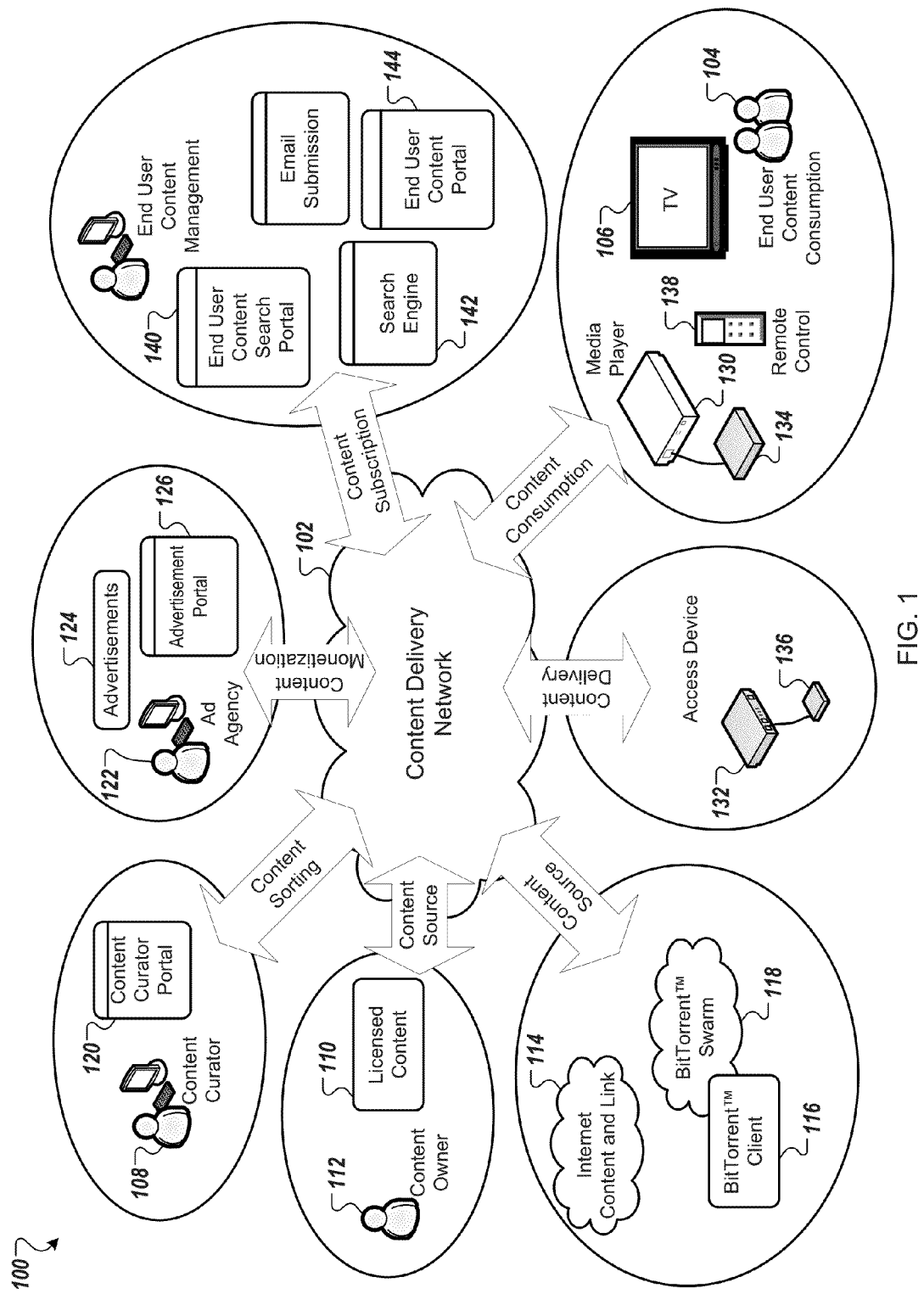
FIGS. 1, 2, 9, and 48 are diagrams of exemplary systems.

FIG. 1 illustrates a content delivery system 100. The system 100 provides support for various aspects of content delivery, such as content sourcing, content sorting, content monetization, content subscription, content delivery, and content consumption. The content delivery system 100 includes a content delivery network 102. The content delivery network 102 may be one or more public or private, wired or wireless networks, such as the Internet or a Session Initiated Protocol (SIP) network such as the PsipTN™ network offered by TelTel™. Using the system 100, end users 104 may view channels, for example, on a television 106 located in their home. Channels may be defined by end users 104, or by "content curators" 108.

Multiple types of content, such as audio (e.g., music, podcasts), video, and still images (e.g., photographs), may be made available over the content delivery network 102. Licensed and license-free content may be made available. For example, licensed content 110 may be acquired from a content owner 112.

Content may be made available from a variety of sources. For example, Internet content may be accessed from an Internet link 114 (e.g., URL (Uniform Resource Locator)). Content may also be accessed from peer-to-peer networks. For example, content may be accessed from one or more BitTorrent™ clients 116 which are part of one or more BitTorrent™ "swarms" 118. Content may be accessed from other sources, such as from a television broadcast (e.g., MSO (Multiple System Operator), cable, satellite, local) or from content (e.g., photographs, audio, previously recorded video) available from devices (e.g., DVR, stereo, computer, DVD (Digital Video Disc) player) connected to a user's home network and/or located in a user's home.

Content curators 108 may use a content curator portal 120 to define custom channels which may be made available for subscription by end users 104. The content curators 108 may be commissioned to search for, select, and organize multiple types of content from various sources into channels. Content curators 108 may, for example, organize channels by topic or genre. Content curators 108 may, for example, select licensed content, license-free content, content available over the Internet, or content from their private collection, to name a few examples.

Channels may be offered for free to end users 104 or end users 104 may subscribe to channels on a fee basis. Users may rate or rank channels or content curators based, for example, on programming selection, sequencing, and quality. Content curators 108 may be promoted, for example, based on popularity.

Content owners 112 may be compensated for the use of licensed content 110 that they own which is used in channels defined by content curators 108. For example, the system 100 may provide support for digital rights management (DRM). By allowing access to their licensed content 110, content owners 112 may experience increased distribution and revenue and targeted exposure in focused channels. Multiple revenue agreements may be possible, such as per-use agreements, subscription revenue sharing, and advertisement revenue sharing.

A content curator 108 may work with one or more advertisers 122, such as an ad agency, to include advertisements 124 on a channel. For example, an advertisement may be displayed if a user switches a channel or when a program finishes. As another example, advertisements may be displayed on the display of a remote control device, such as while a program is being displayed on a television. Content curators 108, advertisers 122, and content owners 112 may share advertising revenue. Sharing in advertising revenue may provide an incentive for content curators 108 to create interesting and popular channels. A content curator 108 may work with one or more advertisers 122 to create one or more advertisements 124 which are customized and targeted for one or more particular channels. End users 104 may customize advertisement viewing preferences, such as by specifying preferred topics, preferred or excluded companies, region preferences, etc.

Advertisers 122 may use an advertiser portal 126 to upload advertisements 124 and to control advertisement publication. Advertisers 122 may define and apply advertisement insertion rules to particular advertisements 124 and/or may allow a content curator 108 to decide when and how to insert the advertisements 124 into channels defined by the content curator 108. APIs (Application Programming Interfaces) may be provided which allow advertisers 122 to enable the system 100 to interface with standard advertisement inventory management systems to allow for control and management of advertisements 124. Various advertisement pricing plans may be supported, such as individually-priced ads or bulk pricing. Other advertising features may be included, such as online purchasing of items or providing customer contact options.

Advertisers 122, content curators 108, and content owners 112 may access user viewing behavior data. Advertisers 122 may access user viewing behavior data, such as viewed channels, viewed content, viewed advertisements, advertisement display frequency, advertisement viewed length, user actions during advertisement display, user characteristics, advertisement and content view times, advertisement and content view counts, and hosting channel information, to monitor reach and performance of advertising campaigns. Advertisements may be targeted to specific users based on recorded user viewing behavior data. Content curators 108 may access user viewing behavior data to learn about behaviors of end users 104 who subscribe to their channels. Content owners 112 may access user viewing behavior data to learn about their fan base, such as accessing information about user demographics, time of day of access, and user actions during content display. Content presentation and playback may be customized and personalized for a particular end user 104, based specifically on recorded user viewing behavior of the particular end user 104 and generally on recorded user viewing behavior of all users.

User viewing behavior data may be captured, for example, by a media player 130 and/or an access device 132. The media player 130 and/or the access device 132 may play content included or ordered on a channel defined by a content curator 108. In some implementations, the media player 130 may play content accessed (e.g., streamed or downloaded) from the content delivery network 102 by the access device 132. In some implementations, the media player 130 and the access device 132 are different logical functions of the same physical device. In other implementations, the media player 130 and the access device 132 are different physical devices. In some implementations, the media player 130 is a software application which may be executed, for example, on a computing device such as a desktop or laptop computer.

In some examples, the media player 130 and/or the access device 132 may be a dongle that plugs in to an input of a display device, such as a television, a computer, etc. In these examples, the dongle may be a High-Definition Multimedia Interface (HDMI) dongle that includes an HDMI connector that plugs into an HDMI port of a television. The HDMI dongle may have a relatively small size and weight such that the HDMI port of the television supports the weight of the HDMI dongle and the HDMI dongle does not significantly diminish the aesthetic appearance of the television. In addition, in these examples, the dongle may include a network interface that enables the dongle to access a network through which content is accessible. For instance, the dongle may include Wi-Fi capability that allows the dongle to wirelessly connect to a network that enables access to content available on the Internet. Accordingly, the dongle may be configured to wirelessly stream content from the Internet using the Wi-Fi capability, convert the streamed content into a format needed for an HDMI input port of a television, and output the converted content using an HDMI output port of the dongle. The dongle may operate a mobile device-based operating system (e.g., the Android operating system) and the operations performed by the dongle may be performed software (e.g., one or more applications) executed by the mobile device-based operating system. The dongle may be controlled by a remote control device. The commands from the remote control device may be received by the dongle through the network interface (e.g., from a server in the cloud). Alternatively, the dongle may have an infrared (IR) or radio frequency (RF) interface and may receive commands directly from an IR or RF-based remote control.

The media player 130 and/or the access device 132 may be connected to external media storage devices 134, 136 respectively. The external media storage devices 134, 136 may be, for example, USB (Universal Serial Bus) drives. The external media storage devices 134,136 may be used, for example, to transfer data to/from the media player 130 or the access device 132, respectively, such as to transfer data to/from a computing device.

The media player 130 and/or the access device 132 may communicate wirelessly with one or more remote control devices 138. The end user 104 may navigate through channels and perform other functions using the remote control device 138. The remote control device 138 may communicate (e.g., using Infrared (IR) technology of radio frequency (RF) technology) with the television 106, the media player 130, and/or the access device 132. The remote control device 138 also may communicate over a network with the media player 130 and/or the access device 132 to control functions of the media player 130 or the access device 132. The remote control device 138 may include a small display screen that displays preview content and/or advertisements.

The media player 130 and/or the access device 132 may access content from the content delivery network 102 without consuming resources of a computing device owned by the end user 104. For example, content may be streamed or downloaded into the home of an end user 104 without using resources of a personal computer owned by the end user 104. The media player 130 and the access device 132 may use less electricity than a personal computer, thus reducing the electric bill of the end user 104. The media player 130 and/or the access device 132 may connect to other computing devices connected on a user's home network. The media player 130 and/or the access device 132 may include built-in functionality to communicate with and download information from a peer-to-peer network, such as the BitTorrent™ swarm 118.

The end user 104 may search for and subscribe to content using an end-user content search portal 140. For example, the end-user content search portal 140 may provide a directory listing of available defined channels. The directory listing may be organized in a hierarchy of categories and sub-categories. A particular channel may appear in one or more categories or sub-categories. The end-user content search portal 140 may also provide a search function to allow end users to search for available defined channels based on a keyword search. As another example, users may search for channels based on other criteria, such as sorting channels based on channel or content curator popularity or ranking. An end user may subscribe to a defined channel, for example, by selecting a channel link displayed in a directory listing or in a list of search results.

The end user 104 may also search for and initiate access to individual content items by the access device 132 using a partner site that operates a search engine 142. As another example, the end user 104 may send an email which includes a content link to an email address associated with their access device 132 to initiate automatic access, by the access device 132, to the content linked to by the content link. The content link may refer to a content file available on the Internet, and may be a reference to a video resource available from a streaming video website. The end user 104 may send an email with an attachment to an email address associated with the access device 132, to initiate access, by the access device 132, to the attachment. The end user 104 may use an end-user content portal 144 to search for and to select content to cause the access device 132 to access.

Figure 2:
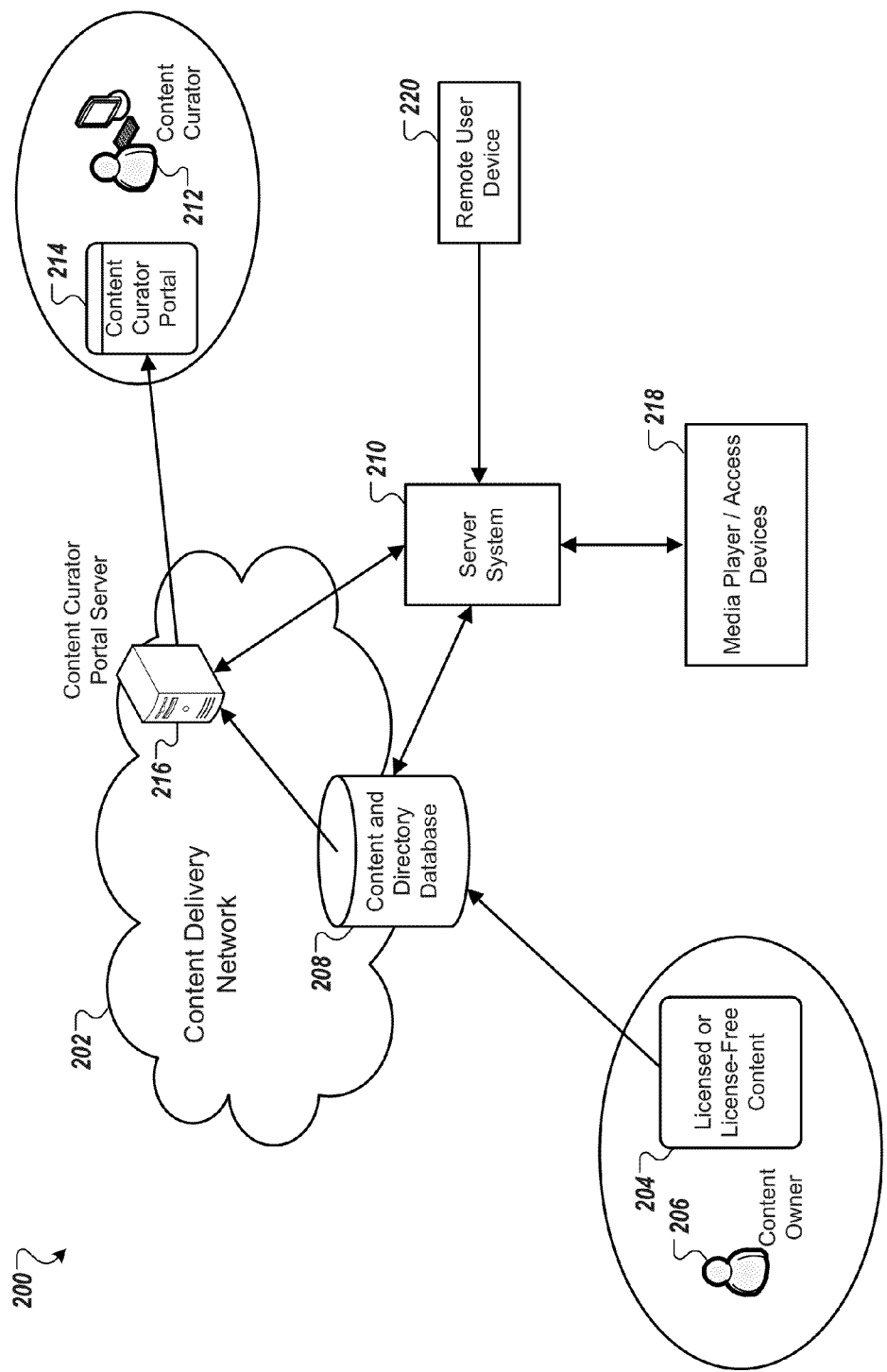

FIG. 2 illustrates a system 200 for content sourcing and access over a content delivery network 202. Licensed or license-free content 204 is acquired from one or more content owners 206 or from a publicly available source, such as the Internet. For example, content owners 206 may transfer content over the content delivery network 202 to a content and directory database 208. Content may also be transferred to the content and directory database 208 from a server system 210, such as using a DVD or CD (Compact Disc) drive. License-free content, such as license-free video or podcasts, may be downloaded from the Internet and stored in the content and directory database 208. In some implementations, some or all content may be stored in the content and directory database 208 as BLOBs (Binary Large Objects). In some implementations, some or all content may be stored in the file system of the server system 210 and references to file system locations may be stored in the content and directory database 208.

The content and directory database 208 stores information about content and also information about defined channels. Content curators 212 may use a content curator portal 214 to define channels and to manage defined channels. The content curator portal 214 may display a listing of licensed and license-free content available in the content and directory database 208. The content curator portal 214 may also provide a search function which allows the content curator 212 to search for content available in the content and directory database 208 and to also search for content available on the Internet, such as content available from peer-to-peer networks, such as BitTorrent™, and content available from streaming video sites.

The content curator portal 214 may communicate with a content curator server 216. For example, a channel definition defined using the content curator portal 214 may be sent to the content curator server 216, which may communicate with the server system 210 to request that the channel definition be stored in the content and directory database 208. As another example, information for existing channel definitions associated with a particular content curator 212 may be retrieved from the content and directory database 208 and sent from the content curator portal server 216 to the content curator portal 214 for display.

In some implementations, the content curator portal server 216 is one physical server computing device and in other implementations, the content curator portal server 216 includes multiple physical server computing devices. Similarly, in some implementations, the server system 210 is one physical server computing device, and in other implantations, the server system 210 includes multiple physical server computing devices. In some implementations, multiple physical server computing devices are used, with some or all server computing devices implementing both the content curator portal server 216 and the server system 210. In some implementations, one physical server computing device is used, with the one physical server device implementing both the content curator portal server 216 and the server system 210.

The network 202 may be one or more public or private, wired or wireless networks, such as the Internet, or may be a Session Initiated Protocol (SIP) network such as the PsipTN™ network offered by TelTel™. The network 202 may include, for example, one or more of the Internet, Wide Area Networks (WANs), Local Area Networks (LANs), analog or digital wired and wireless telephone networks (e.g., a PSTN, Integrated Services Digital Network (ISDN), and Digital Subscriber Line (xDSL)), radio, television, cable, satellite, and/or any other delivery or tunneling mechanism for carrying data services. The network 202 may include multiple networks or subnetworks, each of which may include, for example, a wired or wireless data pathway.

Content may be accessed by one or more user media player/access devices 218. For example, content corresponding to a user-subscribed channel may be automatically streamed or downloaded to the media player/access device 218, in response to a user selection of a corresponding channel. As another example, a user may search for and select content for the media player/access device 218. A user may, using a remote user device 220, monitor and manage user-initiated content requests. The remote user device 220 may be any type of electronic device configured to exchange communications with the server system 210 over a network. The remote user device 220 may be a general-purpose computer (e.g., a desktop personal computer, a workstation, or a laptop computer), a mobile or wireless device, or a device designed for a specific function (e.g., a cell phone, a smart phone, a tablet PC, a personal digital assistant (PDA), etc.).

FIG. 3 illustrates a process 300 for defining channel information. The operations of the process 300 are described generally as being performed by the system 200. The operations of the process 300 may be performed by one of the components of the system 200 (e.g., the server system 210) or may be performed by a combination of the components of the system 200. In some implementations, operations of the process 300 may be performed by one or more processors included in one or more electronic devices.

The system 200 receives, from a content curator, input defining multiple content links to include in a channel associated with the content curator, with each content link including an address at which content is made available over a network (302). For example, a content curator may search for and select multiple content links using a content curator portal. The content curator portal may display a listing of content available in a content and directory database. The content curator portal may also provide a search function which allows the content curator to search for content available in the content and directory database and to also search for publicly-available content, such as content available on the Internet. The content curator may select content links which link to various types of content, such as Internet video, podcasts, BitTorrent™ content, other peer-to-peer content, licensed and license-free content, music, etc. For BitTorrent™ content, the content link may refer to a BitTorrent™ torrent file. For other content, the content link may be a URL. When selecting content links for a channel, the content curator may select links that have a characteristic in common, such as links relating to the same genre.

The system 200 determines supplemental channel information that facilitates user experience of content linked to by at least one of the multiple content links (304). Supplemental channel information may include, for example, one or more hot indices, one or more content preview files, metadata, or content order information. A hot index points or refers to a position of interest within a content file. Supplemental channel information is described in more detail below with respect to FIG. 4.

Figure 4:
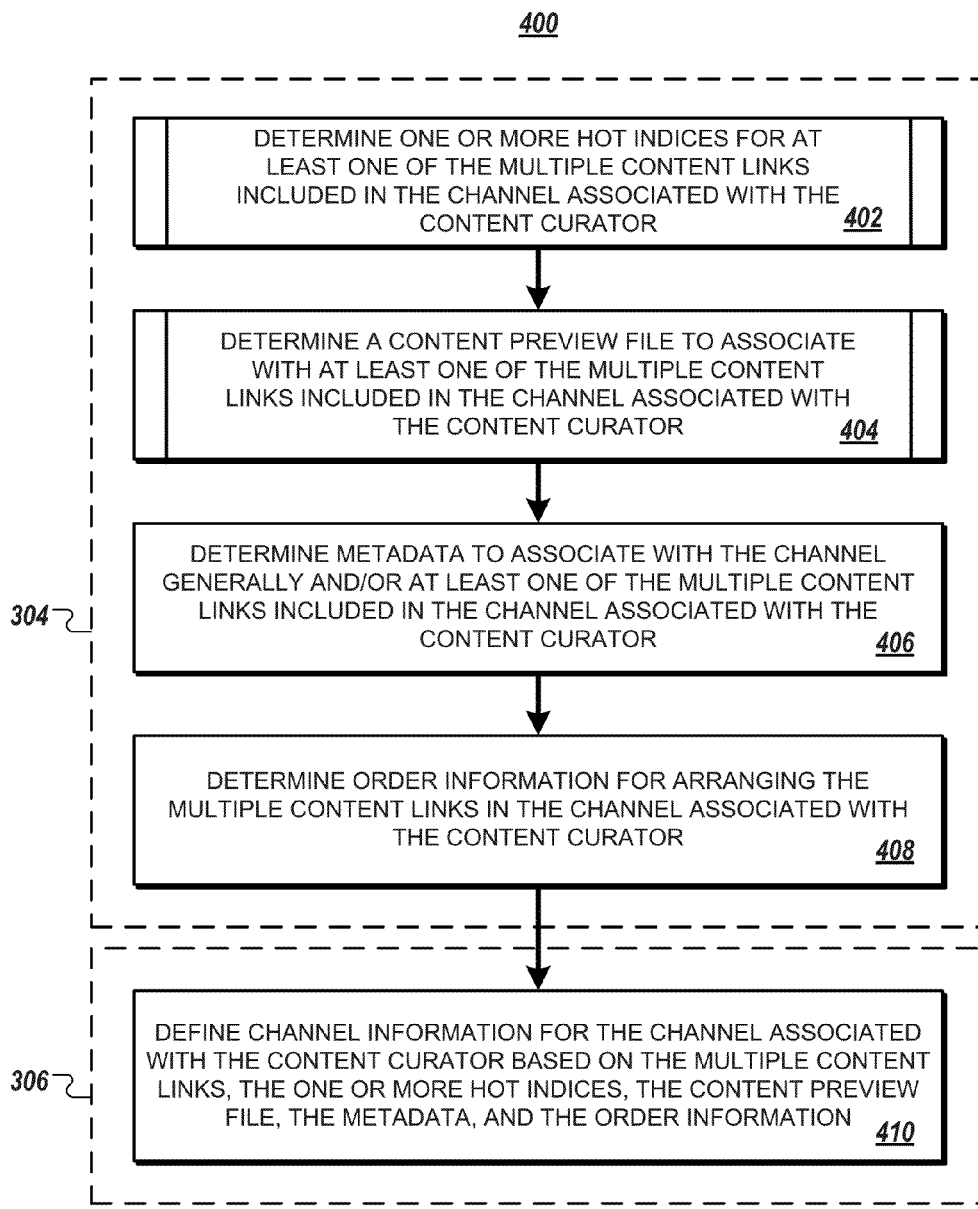

FIG. 4 illustrates a process 400 for defining channel information based on supplemental channel information. The process 400 may be used in determining supplemental channel information referenced above with respect to reference numeral 304 and in defining channel information for the channel associated with the content curator referenced below with respect to reference number 306. The operations of the process 400 are described generally as being performed by the system 200. The operations of the process 400 may be performed by one of the components of the system 200 (e.g., the server system 210) or may be performed by a combination of the components of the system 200. In some implementations, operations of the process 400 may be performed by one or more processors included in one or more electronic devices.

The system 200 determines one or more hot indices for at least one of the multiple content links included in the channel associated with the content curator (402). Hot indices are described in more detail below with respect to FIGS. 5 and 6.

Figure 5:
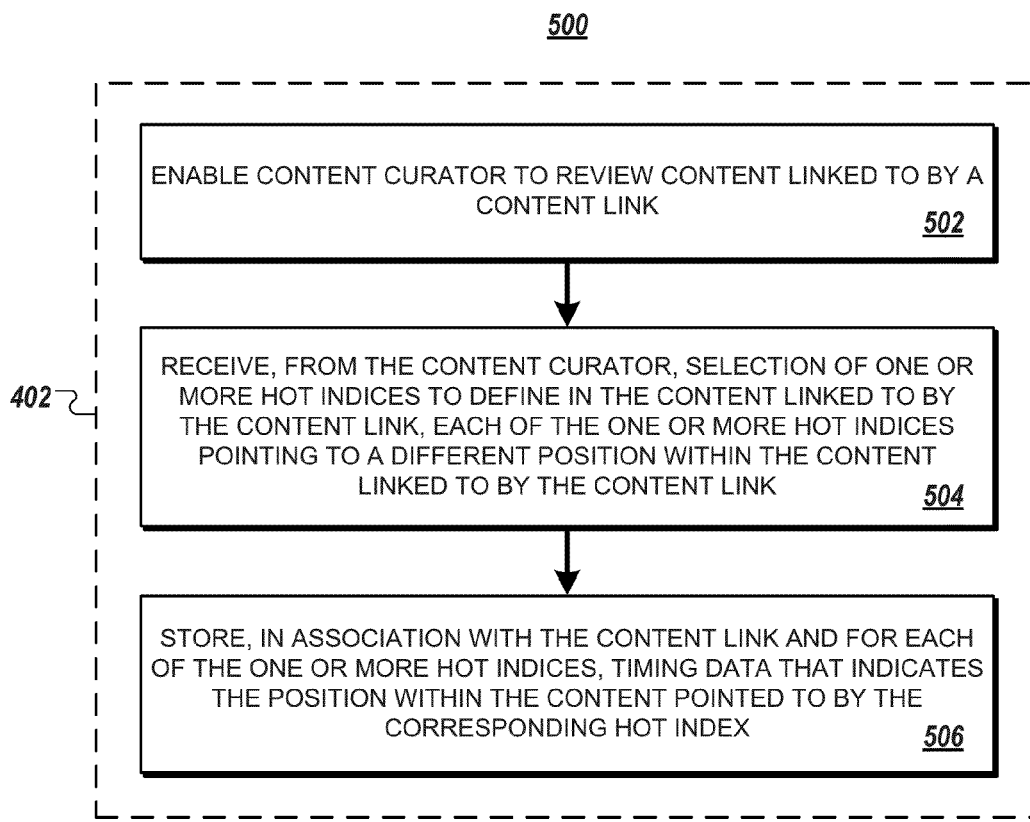

FIG. 5 illustrates a process 500 for determining hot indices. The process 500 may be used in determining one or more hot indices referenced above with respect to reference numeral 402. The operations of the process 500 are described generally as being performed by the system 200. The operations of the process 500 may be performed by one of the components of the system 200 (e.g., the server system 210) or may be performed by a combination of the components of the system 200. In some implementations, operations of the process 500 may be performed by one or more processors included in one or more electronic devices.

The system 200 enables a content curator to review content linked to by a content link (502). For example, the content curator may review content using a media player application which is capable of playing multiple types of content (e.g., various types of video content, music content). The media player application may be part of or may be accessed through a content curator portal. The content curator may use the media player application to play the content linked to by the content link, as well as to stop, fast forward, rewind, and restart the content. The content may be viewed online (e.g., in a streaming format), or some or all of the content may be downloaded before viewing by the content curator. Some content may be retrieved from a content and directory database prior to being viewed.

The system 200 receives, from the content curator, selection of one or more hot indices to define in the content linked to by the content link, where each of the one or more hot indices points to a different position within the content linked to by the content link (504). For example, the content curator may play the content linked to by the content link in a media player application and may define a hot index in the content by pausing the content playback when a particular point of interest within the content is reached. While the playback is paused, the content curator may, for example, select a "define hot index" control of the media player application (e.g., button, menu) to define a hot index at the current (e.g., paused) position within the content. The content curator may restart playback of the content in the media player application and may define additional hot indices by repeating, for each additional hot index, a pausing of the playback at a point of interest within the content and a selecting of the "define hot index" control.

The system 200 stores, in association with the content link and for each of the one or more hot indices, timing data that indicates the position within the content pointed to by the corresponding hot index (506). For example, timing data for a hot index can include hour, minute, and second values which collectively indicate the position within the content associated with the hot index. Timing data can include, for example, values such as "1:02:00" (indicating hour one, minute two, second zero), "02:12:30:" (indicating hour two, minute twelve, second thirty), and "00:05:11" (indicating hour zero, minute five, second eleven). Timing data for each hot index associated with a content link may be stored in association with the content link in a database, such as in a content and directory database.

Figure 6:
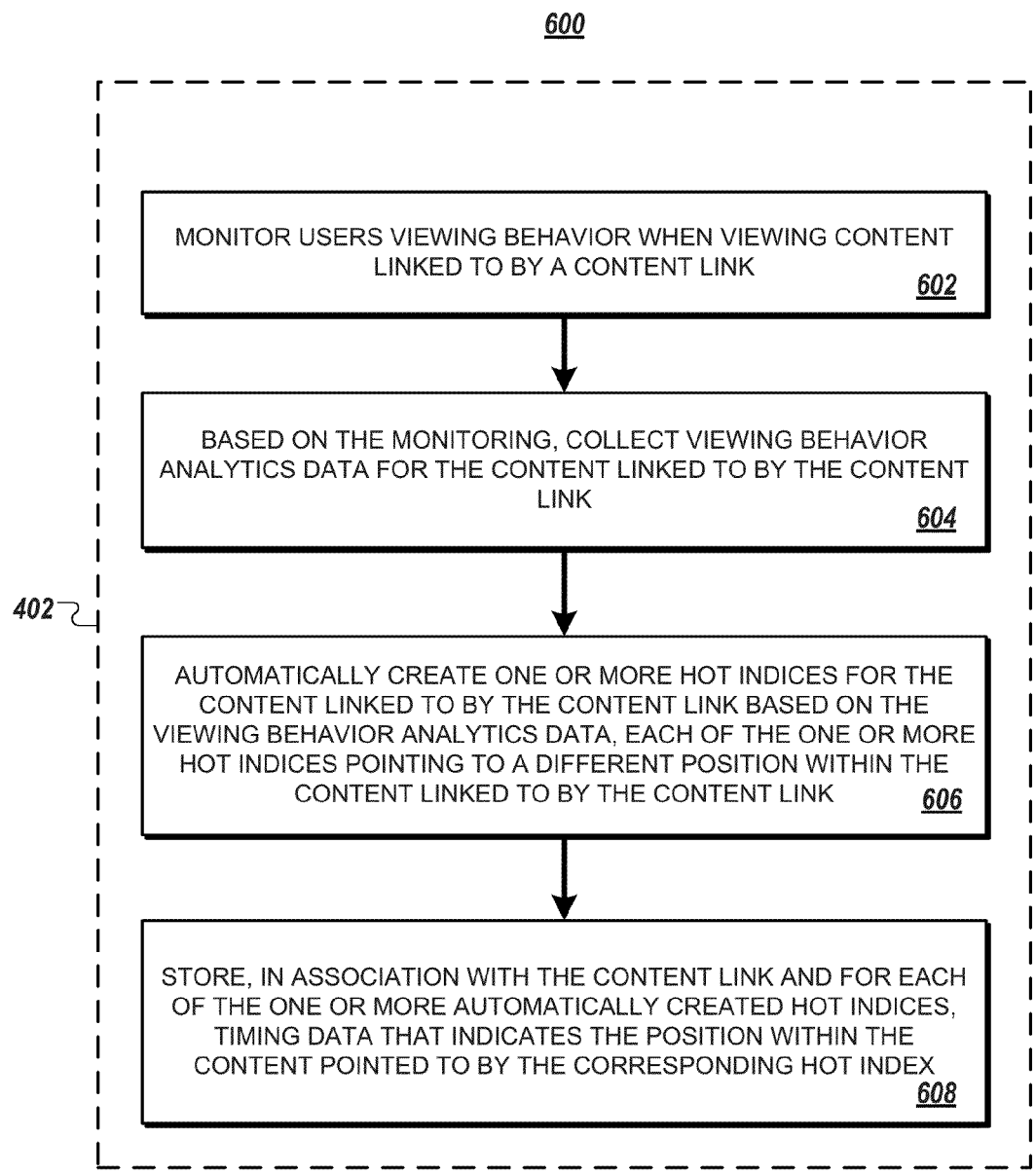

FIG. 6 illustrates a process 600 for determining hot indices. The process 600 may be used in determining one or more hot indices referenced above with respect to reference numeral 402. The operations of the process 600 are described generally as being performed by the system 200. The operations of the process 600 may be performed by one of the components of the system 200 (e.g., the server system 210) or may be performed by a combination of the components of the system 200. In some implementations, operations of the process 600 may be performed by one or more processors included in one or more electronic devices.

The system 200 monitors users' viewing behavior when viewing content linked to by a content link (602). For example, the system 200 may monitor users' fast forwarding, rewinding, stopping, playing, and other behaviors when viewing content linked to by a particular content link. For example, the system may track where in the content a user stops after fast forwarding or may track where in the content a user stops after rewinding. As another example, the system 200 may track whether particular portions of content are played (e.g., watched) multiple times, and may track the start and end positions of those content portions that are watched multiple times.

Based on the monitoring, the system 200 collects viewing behavior analytics data for the content linked to by the content link (604). For example, based on the monitoring, the system 200 may collect fast forwarding, rewinding, playing, and other behavior data for the content linked to by the particular content link, where the fast forwarding, rewinding, and playing behavior data includes data indicating portions of the content where users tend to fast forward the content, portions of the content where users tend to rewind the content, and portions of the content where users tend to play the content. Portions of content may be indicated, for example, by a portion start time and a portion end time. Viewing behavior analytics data may be stored in association with the content link. That is, data may be stored so that viewing behavior analytics data collected for all users for a particular content link may be retrieved.

The system 200 automatically creates one or more hot indices for the content linked to by the content link based on the viewing behavior analytics data, where each of the one or more hot indices points to a different position within the content linked to by the content link (606). For example, the system 200 may automatically create, without human intervention, one or more hot indices for the content linked to by the particular content link based on the fast forwarding, rewinding, and playing behavior data. As a particular example, a hot index may be created to identify a position within the content where users transition from fast forwarding or rewinding the content to playing the content. For example, a hot index may be associated with a position in the content which corresponds to the end of a commercial, or to a particularly interesting point within the content, such as a sports highlight, or a highly interesting scene in a movie.

Hot indices may be created at a particular position for a content link if a certain threshold is reached. For example, if viewing behavior analytics data indicate that at least a certain number of users (e.g., one thousand) or at least a certain percentage of users (e.g., five percent) stop playback of content linked to by a content link at a particular position, then a hot index corresponding to that position might be created. Conversely, if less than a certain number or certain percentage of users stop playback of content at a particular position, then a hot index corresponding to that position might not be automatically created.

The system 200 stores, in association with the content link and for each of the one or more automatically created hot indices, timing data that indicates the position within the content pointed to by the corresponding hot index (608). For example, timing data for a hot index can include hour, minute, and second values which collectively indicate a position within the content associated with the hot index. Timing data for each hot index associated with a content link may be stored in association with the content link in a database, such as in a content and directory database.

Returning to FIG. 4, the system 200 determines a content preview file to associate with at least one of the multiple content links included in the channel associated with the content curator (404). A content preview file may be, for example, a subset of the content file linked to a content link (e.g., the first thirty seconds of the content file) or the content preview file may be a different file having different content than the content file linked to by the content link. As another example, a content preview file may be an image file. Content preview files are discussed in more detail below with respect to FIGS. 7 and 8.

Figure 7:
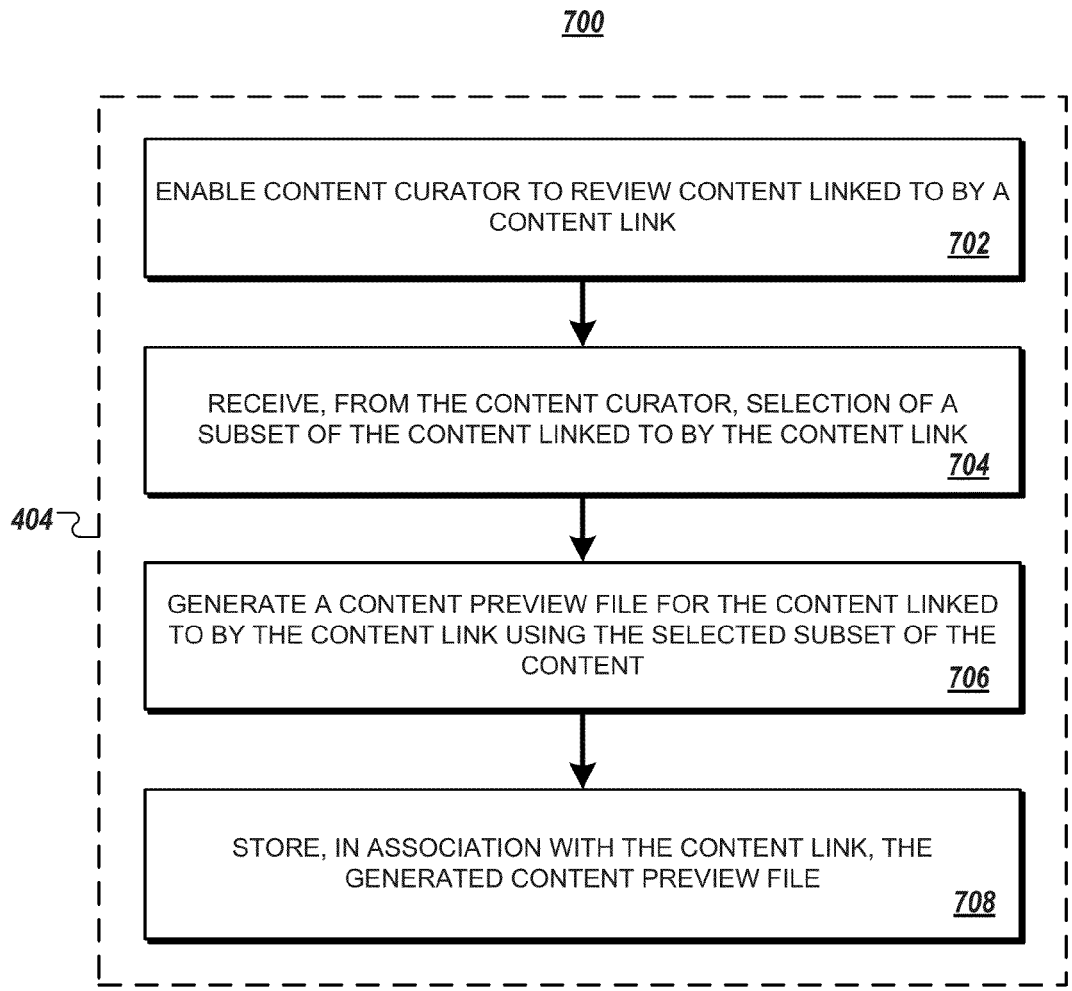

FIG. 7 illustrates a process 700 for determining preview content. The process 700 may be used in determining a content preview file referenced above with respect to reference numeral 404. The operations of the process 700 are described generally as being performed by the system 200. The operations of the process 700 may be performed by one of the components of the system 200 (e.g., the server system 210) or may be performed by a combination of the components of the system 200. In some implementations, operations of the process 700 may be performed by one or more processors included in one or more electronic devices.

The system 200 enables a content curator to review content linked to by a content link (702). For example, the content curator may review content using a media player application which is capable of playing multiple types of content (e.g., various types of video content, music content). The media player application may be part of or may be accessed through a content curator portal. The content curator may use the media player application to play the content linked to by the content link, as well as to stop, fast forward, rewind, and restart the content. The content may be viewed online (e.g., in a streaming format), or some or all of the content may be downloaded before viewing by the content curator. Some content may be retrieved from a content and directory database prior to being viewed.

The system 200 receives, from the content curator, selection of a subset of the content linked to by the content link (704). For example, the content curator may play (e.g., watch) the content in a media player application and may define a subset of the content by selecting begin time and end time values which indicate the start and end, respectively, of the content subset. For example, the content curator may watch the content and may stop or pause the content playback when the desired start time of the content subset is reached. The content curator may, for example, indicate that the position within the content at which the playback was paused is the start time of the content subset by selecting a "define start time" control (e.g., menu, button) of the media player application. The content curator may fast forward and/or resume playback of the content and may pause the content again when the desired end time of the content subset is reached. The content curator may, for example, indicate that the position within the content at which the playback is paused is the end time of the content subset by selecting a "define end time" control (e.g., button, menu) of the media player application.

The system 200 generates a content preview file for the content linked to by the content link using the selected subset of the content (706). For example, a new content file may be created by copying a subset of a content file linked to by the content link to a newly created content file. The content curator may create a new content file based on a content subset by using a media player application or another application.

The system 200 stores, in association with the content link, the generated content preview file (708). For example, the content preview file may be stored as a "BLOB" data type in a database system, or the content preview file may be stored in a folder on the hard drive of a server (with a path to the content preview file stored in a database).

Figure 8:
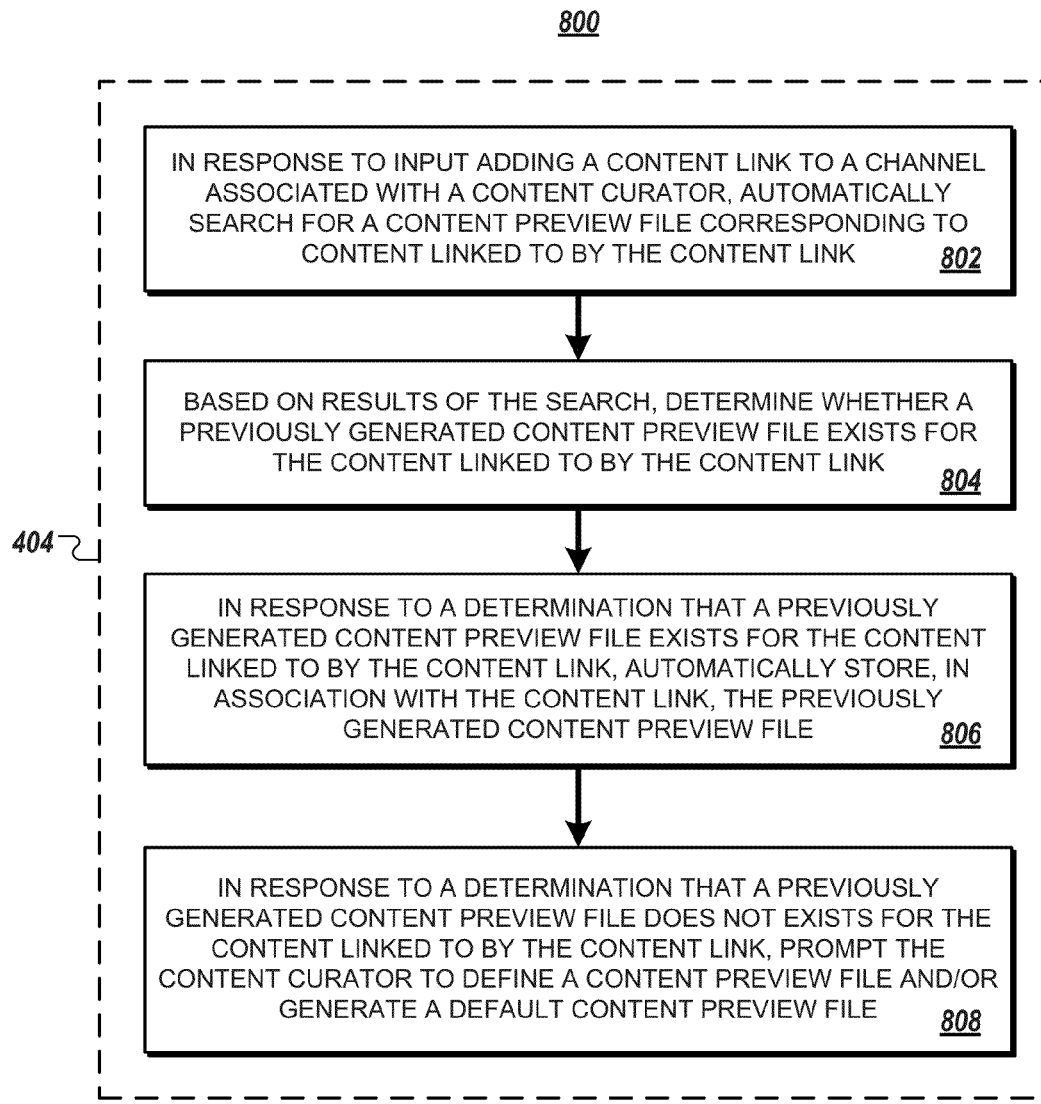

FIG. 8 illustrates a process 800 for determining preview content. The process 800 may be used in determining a content preview file referenced above with respect to reference numeral 404. The operations of the process 800 are described generally as being performed by the system 200. The operations of the process 800 may be performed by one of the components of the system 200 (e.g., the server system 210) or may be performed by a combination of the components of the system 200. In some implementations, operations of the process 800 may be performed by one or more processors included in one or more electronic devices.

In response to input adding a content link to a channel associated with a content curator, the system 200 automatically searches for a content preview file corresponding to content linked to by the content link (802). For instance, the system 200 may automatically search for a content preview file in response to the content curator adding a content link to a channel using a content curator portal. As one example, for movie content, the system 200 may automatically search for movie trailers or recorded movie reviews or interviews corresponding to the movie, such as by searching using the title of the movie. If a content preview file associated with the movie content is found (e.g., found on the Internet based on a movie title search), the content preview file may be downloaded and may be associated with the movie content as a preview content file for the movie content file. As another example, for music content, the system 200 may automatically search for music sample files or recorded interviews corresponding to the music content.

Based on results of the search, the system 200 determines whether a previously generated content preview file exists for the content linked to by the content link (804). For example, the system 200 may determine whether a movie trailer file, a music sample file, or another type of previously generated content preview file exists for the content.

In response to a determination that a previously generated content preview file exists for the content linked to by the content link, the system 200 automatically stores, in association with the content link, the previously generated content preview file (806). For example, the content preview file may be accessed from a remote server and a copy of the content preview file may be requested and copied to the server system 210. The copy of the content preview file may be stored as a BLOB data type in a database, or the copy of the content preview file may be stored in a file system folder of the server system 210. As another example, a link to the content preview file may be stored in a database (e.g., the content preview file itself might not be copied to the server system 210, but may be accessible through a stored link which points at the location of the content preview file on the remote server).

In response to a determination that a previously generated content preview file does not exist for the content linked to by the content link, the system 200 prompts the content curator to define a content preview file and/or generate a default content preview file (808). For example, the content curator may browse for and select a content preview file stored on a local or remote computing device (e.g., the content curator may select a preview content file which was not automatically located in reference to step 802 above). As another example, the content curator may input a link (e.g., URL) to a content preview file available on the Internet. The link may be, for example, a link to streaming content or a link to a content file.

The content curator may generate a content preview file for the content linked to by the content link. For example, the content curator may generate a content preview file by specifying a subset of the content linked to by the content link. For example, the content curator may watch (e.g., play) the content in a media player application and may specify a content subset by specifying start and end times within the content. For example, the content curator may watch the content file in the media player application and may pause or stop the content at the desired start time, select a control to indicate that the paused time is the subset start time, resume playback of the content, watch and/or fast forward the content until the desired subset end time is reached, pause or stop the content, and select a control to indicate that the paused time is the desired subset end time. As another example, the content curator may define a content subset to be a first portion (e.g., the first thirty seconds) of the content linked to by the content link. A content preview file may be generated by copying the content subset to a new content file.

The content curator may generate a content subset by combining multiple subsets of the content linked to by the content link. For example, the content curator may play the content in a media player application and may define multiple start and end times which define multiple content subsets. The content preview file may be generated, for example, by creating a new content file and appending each content subset to the newly created content file to create a compilation of content subsets. The content subsets may be appended to the content preview file in the order in which they appear in the content linked to by the content link, or the content curator may define an order in which the content subsets are to appear in the preview content file.

The content curator may generate a content preview file by combining content from multiple content files or sources. For example, a content curator may create a content preview file by combining any or all of previously existing content preview files, subsets of previously existing content preview files, subsets of the content linked to by the content link, subsets of other content files, and other content files.

In some implementations, a default content preview file may be automatically generated, without human intervention, in response to a determination that a previously generated content preview file does not exist for the content linked to by the content link. For example, a content preview file which includes the first thirty seconds of content may be automatically generated. The length of an automatically generated content preview file may be based on the type of content. For example, for movie content, a content preview file which includes the first minute of content may be generated, and for music content, a content preview file which includes the first thirty seconds of content may be generated. In some implementations, a default content preview file may be generated by the content curator, such as in response to a prompt, and the content curator may specify the length (e.g., thirty seconds, one minute) of the default content preview file.

Returning to FIG. 4, the system 200 determines metadata to associate with the channel generally and/or with at least one of the multiple content links included in the channel associated with the content curator (406). For example, the content curator may provide metadata information such as a channel name and a channel description using a content curator portal. The content curator may also provide notes and comments for one or more content links (e.g., the content curator may include a comment or a description for the content linked to by the content link). Metadata may include, among other things, the run length of the content, user and/or critic ratings and reviews of the content (e.g., either full text reviews or links to reviews), links to one or more websites associated with the content, and links to related content. Metadata may also include one or more keywords which describe or are representative of the channel, to help facilitate the finding of published channels in an end-user search portal.

The system 200 determines order information for arranging the multiple content links in the channel associated with the content curator (408). For example, the content curator may arrange content items using a content curator portal user interface. The user interface may display representations of available content items in an available content area of the user interface and may display a list of representations of content links included in a channel in a channel information area of the user interface. A representation of an available content item or content link may be, for example, an icon, a thumbnail, or a textual link. The content curator may arrange the representations of content links in the channel information area to define a desired order of content. For example, the content curator may drag and drop or otherwise reorder representations of content links in the channel information area of the user interface. The content curator may drag and drop or otherwise move a representation of an available content item from the available content area to the channel information area, placing the available content item in a desired position within the list of content links.

Returning to FIG. 3, the system 200 defines channel information for the channel associated with the content curator based on the multiple content links and the supplemental channel information (306). For example, referring to FIG. 4, the system 200 defines channel information for the channel associated with the content curator based on the multiple content links, the one or more hot indices, the content preview file, the metadata, and the order information (410).

The system 200 publishes the defined channel information at a channel link to make the channel information available to user devices of a content delivery network (308). For example, the defined channel information may be published using RSS (Really Simple Syndication) or similar technology. The channel link may be made available through an end-user content search portal. For example, the channel link may appear in one or more directory listings of available channels. The channel link may also be returned as a search result from searches performed through the end-user content search portal. Once a user has subscribed to a channel, channel information may be sent to a media player/access device of the user. In some implementations, channel information is sent in response to a user switching to a subscribed channel. In other implementations, channel information is sent to the media player/access device in response to the user subscription (e.g., possibly before the user views the channel for the first time).

Figure 9:
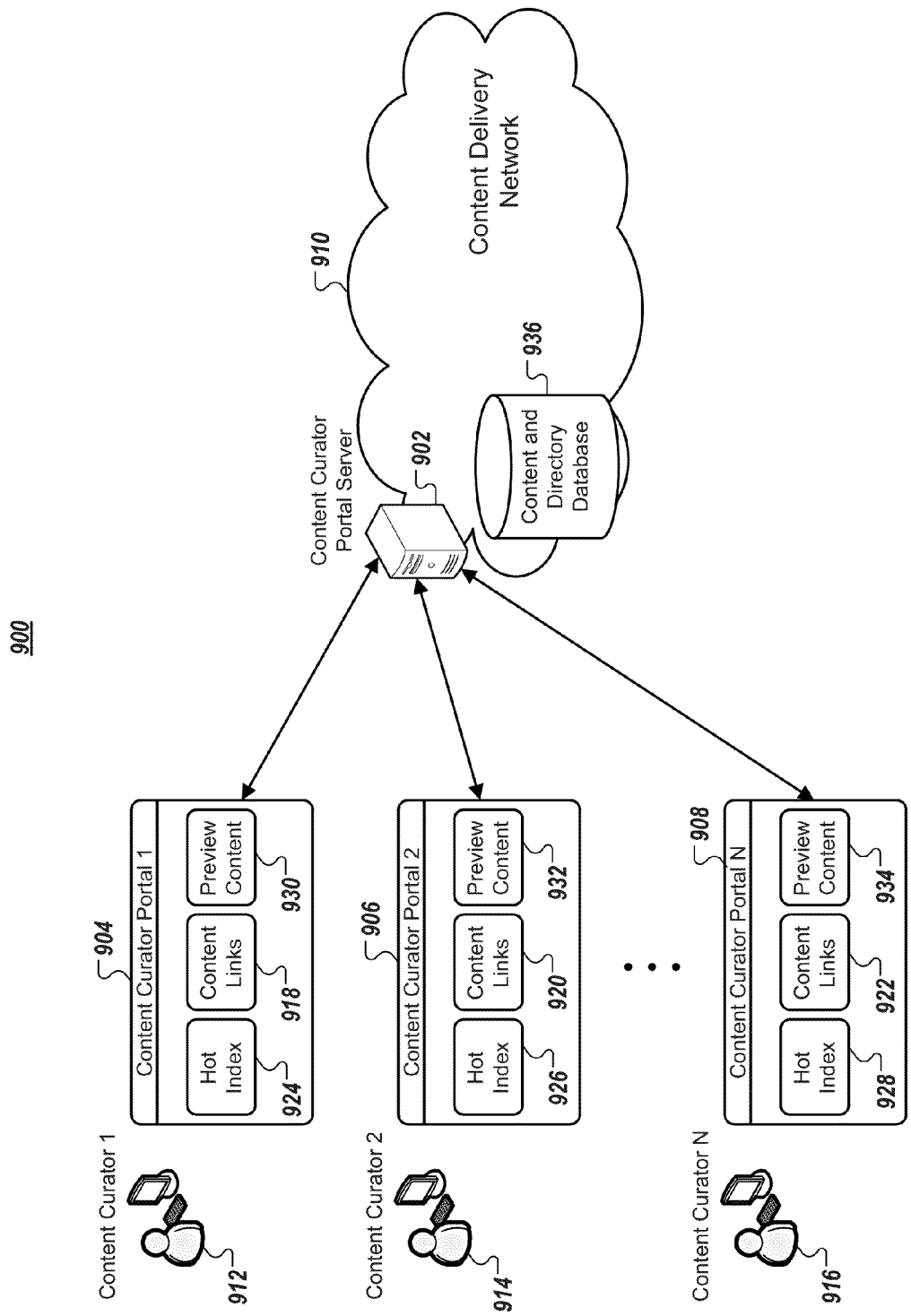

FIG. 9 illustrates an exemplary system 900 for defining channel information. The system 900 includes a content curator portal server 902 serving multiple content curator portal instances 904, 906, 908 over a content delivery network 910. Multiple content curators 912, 914, 916 use the multiple content curator portal instances 904, 906, 908, respectively. The multiple content curators 912, 914, 916 define, using the multiple content curator portal instances 904, 906, 908, respectively, content links 918, 920, 922, respectively, where each content link in the content links 918, 920, 922 is associated with a channel and includes an address at which content is made available over the content delivery network 910.

The multiple content curators 912, 914, 916 also define, using the multiple content curator portal instances 904, 906, 908, respectively, supplemental channel information which includes hot indices 924, 926, 928, respectively, and preview content 930, 932, 934, respectively. Supplemental channel information may also include metadata associated with a channel generally and/or metadata associated with one or more content links associated with a channel and may also include ordering information for arranging content links associated with a channel. A content curator 912, 914, 916 may define, using the respective content curator portal instances 904, 906, 908, channel information for a channel based on the respective content links 918, 920, 922 and based on respective supplemental channel information. Defined channel information may be sent to the content curator portal server 902 and may be stored in a content and directory database 936, in association with information identifying the respective content curator 912, 914, 916.

FIG. 10 illustrates an exemplary channel definition 1000. The channel definition 1000 may be associated with a particular content curator, such as a content curator named "DJ". The channel definition 1000 includes a channel name 1002 of "My DJ Channel" and a channel link 1004 of "http://9x9.tv/channels/rssfeed123456.html". The channel link 1004 makes the channel definition 1000 available to user devices of a content delivery network. The channel definition 1000 also includes metadata 1006. The metadata 1006 is data that is generally associated with the channel defined by the channel definition 1000.

Metadata and other supplemental channel information may also be associated with one or more content links. The channel definition 1000 includes multiple content links 1008-1018, as shown in a table 1020. Each content link 1008-1018 includes an address at which content is made available over a content delivery network. Each content link 1008-1018 may refer, for example, to a URL of a content file or to a BitTorrent™ torrent file. For example, the content link 1018 refers to the URL "http://www.broadcasterA.com/watch/show1-episode4" and the content link 1012 refers to the BitTorrent™ torrent file address of "http://www.nonprofitA.org/download/fileB.torrent".

As shown in columns 1022, 1024, 1026 of table 1020, each content link 1008-1018 may have one or more associated hot indices, one or more associated content preview files, or associated metadata, respectively. Hot indices may be automatically identified based on user viewing behavior data, or may be manually identified by a content curator. Each hot index refers to a position within a respective content item (e.g., content file). For example, the content link 1008 has associated hot indices corresponding to positions of one minute twenty seconds, three minutes thirty seconds, and four minutes thirty seconds within the content linked to by the content link 1008. As another example, the content link 1014 has one associated hot index corresponding to a position of zero minutes, forty seconds within the content linked to by the content link 1014. Some content links, such as content link 1016, have no associated hot indices.

The content link 1008 has an associated content preview file named "myChannel1.wmv". Content preview files may be generated automatically (e.g., as the first portion of an associated content file), may be generated manually by a content curator, or may be selected from existing content preview files (e.g., a movie trailer). Some content links, such as content links 1012 and 1016, do not have associated content preview files.

Content links may have associated metadata. For example, as shown in column 1026, the content link 1012 has metadata describing the content linked to by the content link 1012. Metadata associated with a content link may be distinguished from metadata which is generally associated with the channel and not specifically associated with a content link, such as metadata 1006.

FIG. 11 illustrates a process 1100 for updating channel information. The operations of the process 1100 are described generally as being performed by the system 200. The operations of the process 1100 may be performed by one of the components of the system 200 (e.g., the server system 210) or may be performed by a combination of the components of the system 200. In some implementations, operations of the process 1100 may be performed by one or more processors included in one or more electronic devices.

The system 200 determines that one or more modifications to channel information that defines a channel associated with a content curator are needed (1102). For example, the system 200 may determine that modifications to one or more content links, hot indices, content preview files, or other supplemental channel information are needed. The system 200 may determine automatically, without human intervention, that modifications are needed, or the system 200 may determine that modifications are needed based on a received input from a content curator. Determining that modifications to channel information are needed is described in more detail below with respect to FIGS. 12 and 14.

Figure 12:
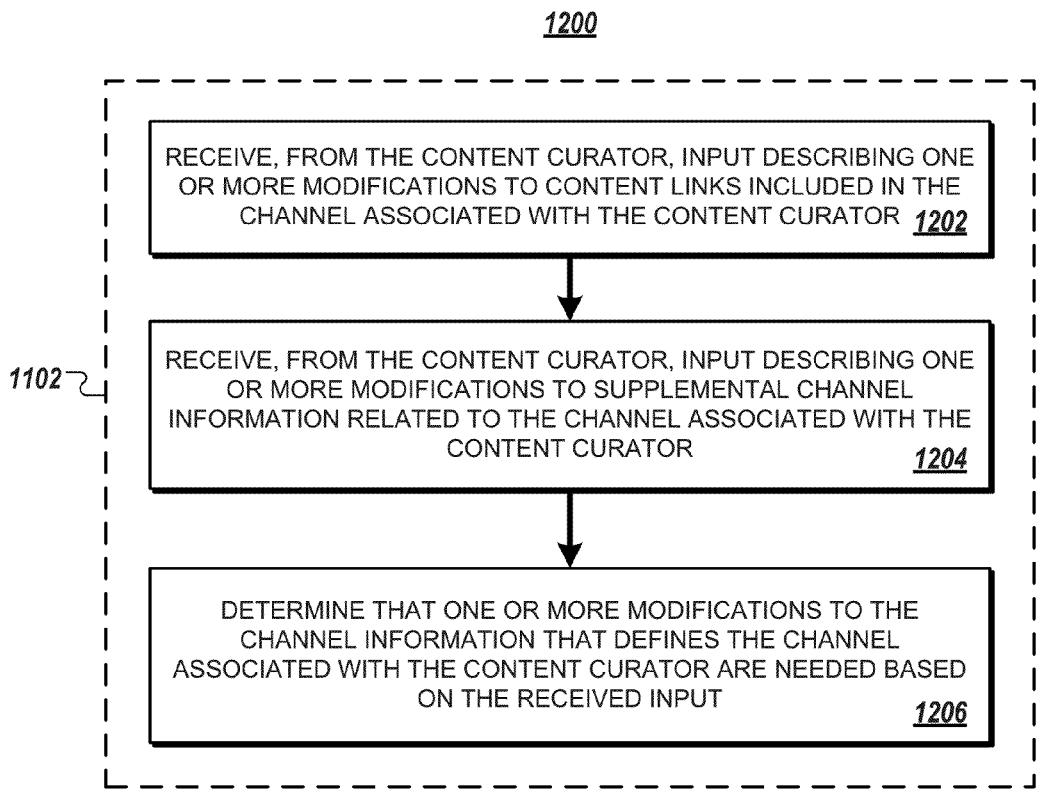

FIG. 12 illustrates a process 1200 for determining that one or more modifications to channel information that defines a channel associated with a content curator are needed. The process 1200 may be used in determining that one or more modifications to channel information are needed referenced above with respect to reference numeral 1102. The operations of the process 1200 are described generally as being performed by the system 200. The operations of the process 1200 may be performed by one of the components of the system 200 (e.g., the server system 210) or may be performed by a combination of the components of the system 200. In some implementations, operations of the process 1200 may be performed by one or more processors included in one or more electronic devices.

Figure 13:
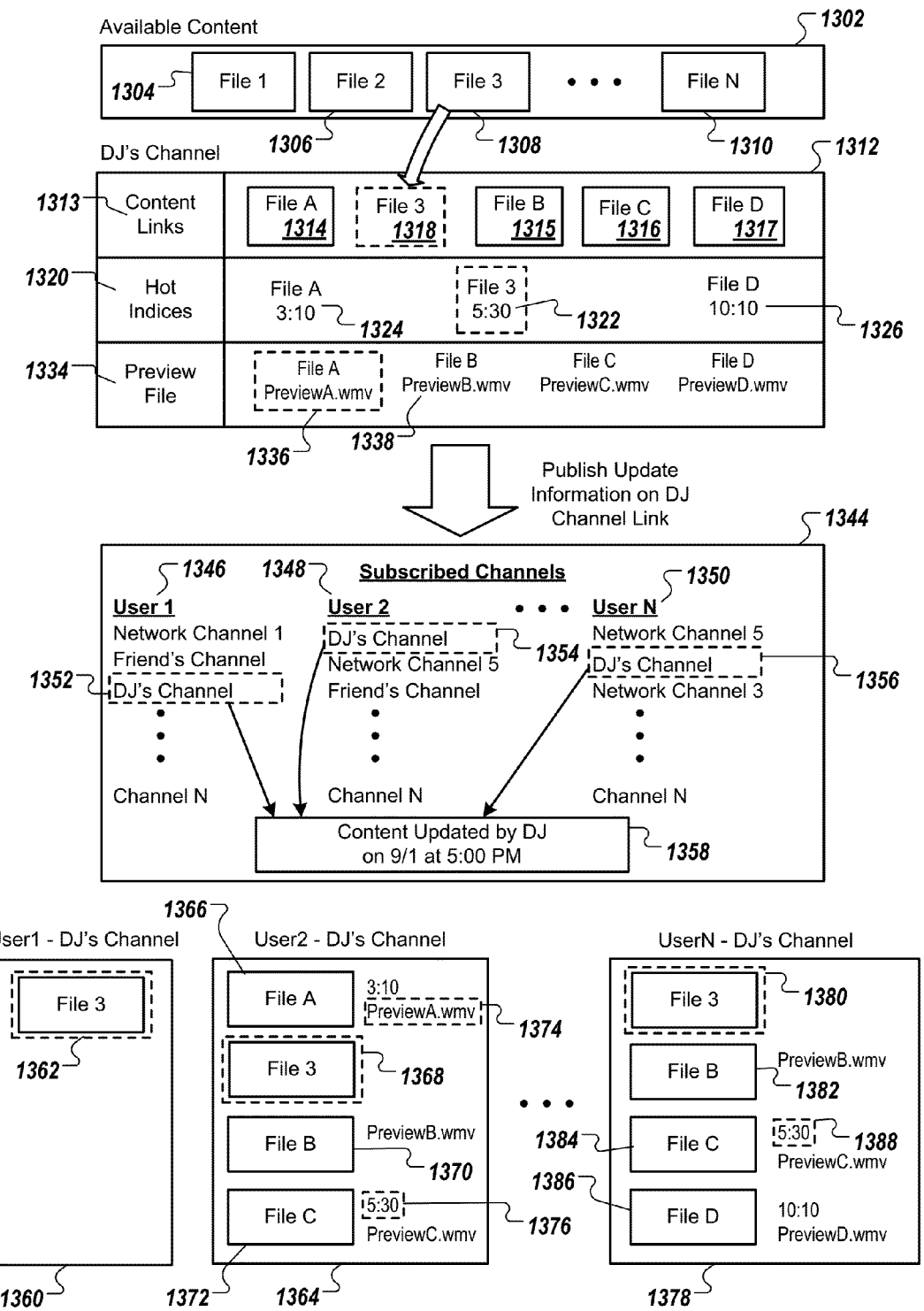
FIG. 13 illustrates an example of manual channel information modifications.

The system 200 receives, from the content curator, input describing one or more modifications to content links included in the channel associated with the content curator (1202). For example, a content curator may add a new content link to a channel, may edit an existing content link (e.g., update the link address), or may delete a content link from a channel. For example, FIG. 13 illustrates an available content user interface area 1302 which displays content which is available to be added to a channel. The user interface 1302 may be displayed, for example, on a content curator portal. The available content user interface 1302 displays available content file representations 1304-1310. For example, the representations 1304-1310 may be icons or thumbnail images.

The available content user interface area 1302 may be displayed on a content curator portal along with a channel definition area 1312. The content curator may use the channel definition area 1312 to define and/or modify a channel definition. For example, the channel definition area 1312 is displaying a channel definition for a channel named "DJ's Channel". To add a new content link to a channel, the content curator may drag an available file representation 1304-1310 and drop it onto a content links area 1313 of the channel definition area 1312. The content links area 1313 includes representations 1314-1317 of content links which are currently included in the channel. The content curator may, for example, drag the representation 1308 of a "File 3" content item and drop it onto the content links area 1313, between the representations 1314 and 1315, as illustrated by a dashed-line representation 1318. The dragging and dropping of the representation 1308 results in the adding of a new content link to the channel and also in a modification of the positions of the content links currently in the channel. The content curator may select a representation 1314-1318 to delete or to modify an existing content link.

Returning to FIG. 12, the system 200 receives, from the content curator, input describing one or more modifications to supplemental channel information related to the channel associated with the content curator (1204). For example, the content curator may add, edit, or delete one or more hot indices, preview content files, or metadata for a channel, or the content curator may reorder content links for a channel. For example and as illustrated in FIG. 13, the content curator may use a hot index area 1320 of the channel definition user interface area 1312 to add a new hot index 1322 for a "File 3" content link, to delete a hot index 1324 for a "File A" content link, or to edit a hot index 1326 for a "File D" content link.

As another example, the content curator may use a preview file area 1334 to add a new content preview file (e.g., corresponding to representation 1336) for the "File A" content link, or to delete a content preview file (e.g., corresponding to representation 1338) for the "File B" content link. In some implementations, the content curator portal allows a content curator to edit an existing content preview file (e.g., to edit a video, audio, or image file). In other implementations, to effectively edit an existing content preview file, the content curator may delete the existing content preview and add a new content preview file which includes the desired changes.

Returning to FIG. 12, the system 200 determines that one or more modifications to the channel information that defines the channel associated with the content curator are needed based on the received input (1206). For instance, in the example of FIG. 13, the system may determine that one or more modifications to the "DJ's Channel" channel are needed based on the content curator interacting with the channel definition user interface area 1312.

Figure 14:
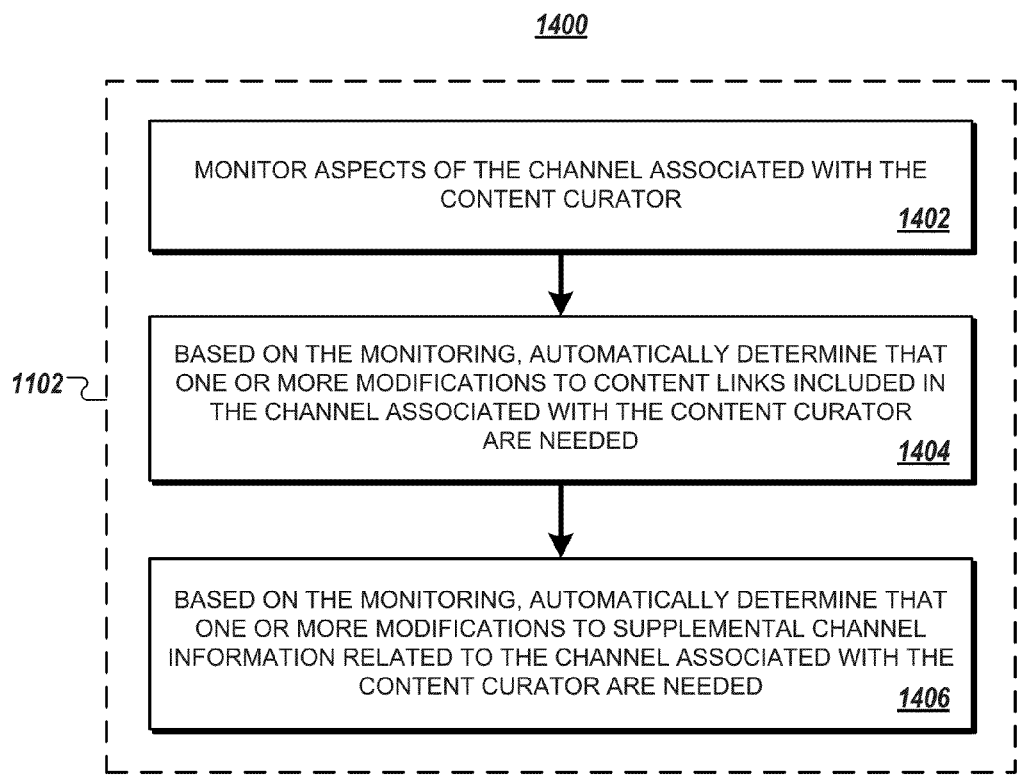

FIG. 14 illustrates a process 1400 for determining that one or more modifications to channel information that defines a channel associated with a content curator are needed. The process 1400 may be used in determining that one or more modifications to channel information are needed referenced above with respect to reference numeral 1102. The operations of the process 1400 are described generally as being performed by the system 200. The operations of the process 1400 may be performed by one of the components of the system 200 (e.g., the server system 210) or may be performed by a combination of the components of the system 200. In some implementations, operations of the process 1400 may be performed by one or more processors included in one or more electronic devices.

The system 200 monitors aspects of the channel associated with the content curator (1402). For example, the system 200 may monitor, without human intervention, aspects of content links and supplemental channel information associated with the channel. The system 200 may automatically detect aspects of the channel, such as broken or changed content links, newly-created hot indices, and newly-available content preview files. Monitoring aspects of content links and supplemental channel information is described in more detail below with respect to FIG. 15.

Figure 15:
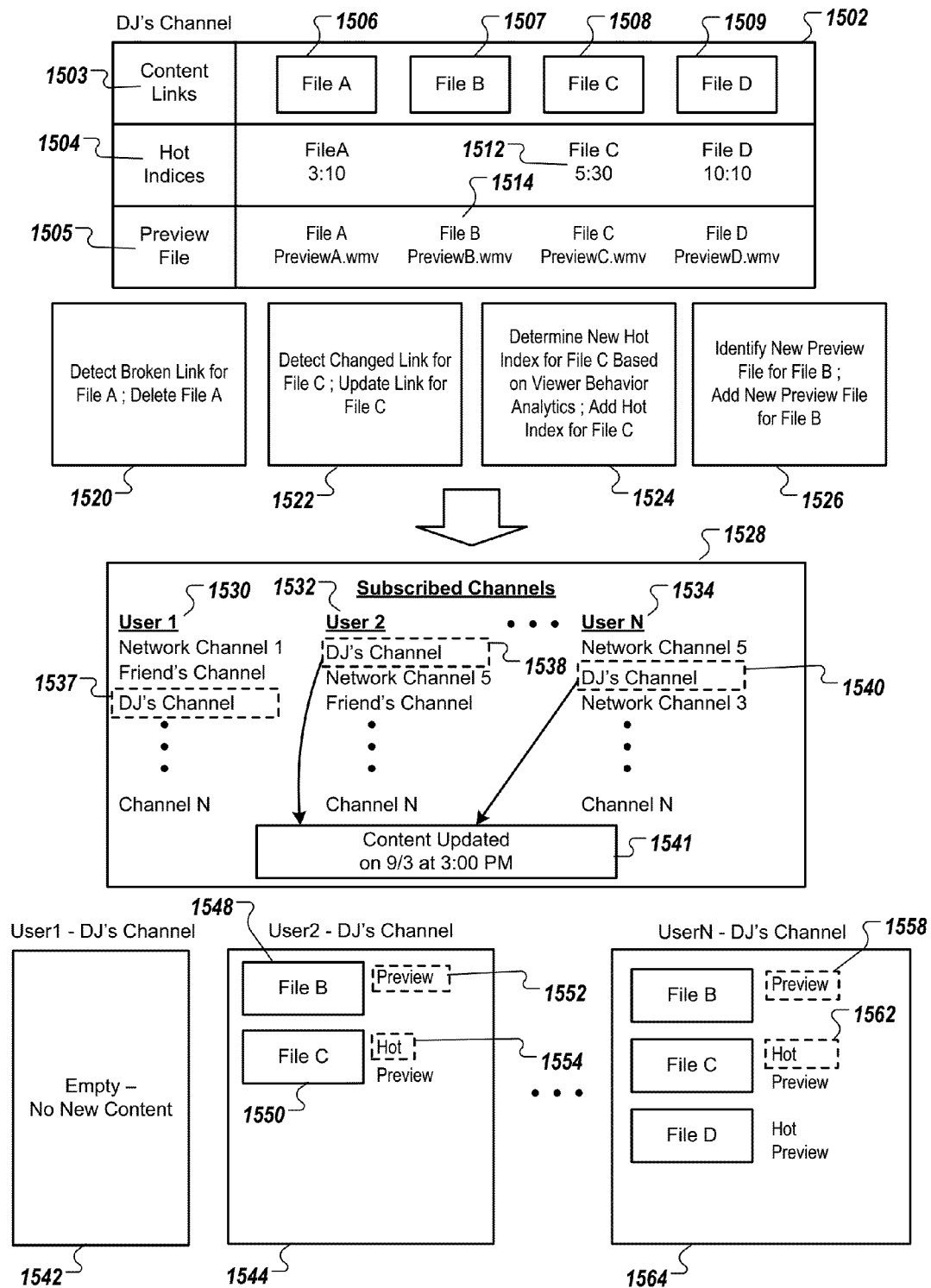
FIG. 15 illustrates an example of automatic detection of needed channel information modifications.

FIG. 15 illustrates a channel definition area 1502 for a channel named "DJ's Channel". The channel definition area 1502 includes a content links area 1503, a hot indices area 1504, and a content preview area 1505. The content links area 1503 includes representations 1506-1509 for content links currently included in the channel.

The system 200 may automatically detect, for example, that the content link for "File A" (e.g., corresponding to representation 1506) is a broken link (e.g., that "File A" is no longer accessible at the specified content link). The system 200 may also detect, for example, that the content link for "File C" (e.g., corresponding to representation 1508) has changed (e.g., that the "File C" is still accessible, but is accessible at a different link address). As another example, the system 200 may determine that a new hot index 1512 has been automatically generated for "File C", based on viewer behavior analytics. For example, automatic monitoring of user viewing behavior may have determined that users frequently stop rewinding the "File C" content at a position of 5:30 and the system 200 may determine that a new hot index corresponding to position 5:30 of "File C" has been created. As yet another example of automatic monitoring of channel aspects, the system 200 may detect that a new content preview file 1514 is available for "File B" (e.g., the content link corresponding to representation 1507). For example, "File B" may be movie content and a new movie trailer may have been made available and discovered by the system 200.

Returning to FIG. 14, based on the monitoring, the system 200 automatically determines that one or more modifications to content links included in the channel associated with the content curator are needed (1404). For instance, in the example of FIG. 15, the system 200 may determine that a deletion modification 1520 of the content link associated with representation 1506 is needed based on the detection of a broken link for "File A". As another example, the system 200 may determine that an update-link modification 1522 is needed for the content link associated with representation 1508 based on the detection of the modified link for "File C".

Based on the monitoring, the system 200 automatically determines that one or more modifications to supplemental channel information related to the channel associated with the content curator are needed (1406). For instance, in the example of FIG. 15, the system 200 may determine that an add-hot-index modification 1524 is needed based on the determination that a new hot index has been created for "File C". As another example, the system 200 may determine that an add-content-preview-file modification 1526 is needed based on the detected availability of a new content preview file for "File B".

Returning to FIG. 11, the system 200 identifies updated channel information that defines updates to the channel information needed to make the one or more modifications (1104). For instance, in the example of FIG. 13, the system 200 may identify the newly-added content link for "File 3" associated with the representation 1308, the newly-added content preview file 1336 for "File A", the newly-added hot index 1322 for "File 3", the deletion of the hot index 1324 for "File A", the modification of the hot index 1326 for "File D", and the deletion of the content preview file 1338 for "File B". In the example of FIG. 15, the system 200 may identify the delete link modification 1520, the update link modification 1522, the add hot index modification 1524, and the add new content preview file modification 1526. The updated channel information may include only the information related to the channel that has changed.

The system 200 publishes the updated channel information at a channel link for the channel such that subscribers to the channel receive the updated channel information (1106). For example, the updated channel information may be published using RSS or similar technology. Updated channel information may be automatically sent to media player/access devices of users who have subscribed to the channel. Channel information for an update may include only information related to modified channel information (e.g., downloaded channel information for an update may not include information for channel information that has not changed).

A user may receive an update message subsequent to a media player/access device receiving updated channel information. For instance, in the example of FIG. 13, channel lists 1346-1350 for users one, two, and "N", respectively, each include the "DJ's Channel" channel (as shown by channel indicators 1352-1356) which the content curator modified using the user interface 1312. In response to the modifications to the channel, updated channel information may be sent to the media player/access devices for user one, user two, and user "N". Each of the users one, two, and "N" may see an update message 1358 the next time they use their media player/access device which indicates that "DJ's Channel" has been updated.

Whether a user sees update messages or other update indicators may depend on whether a user has already watched content related to channel updates. For instance, in the example of FIG. 13, the "DJ's Channel" channel has current content associated with "File A", "File 3", "File B", "File C", and "File D", with the "File 3" content recently added. Suppose that user one has already watched the "File A", "File B", "File C", and "File D" content. An updated content list 1360 for the "DJ's Channel" channel for user one shows a single representation 1362 corresponding to the recently added "File 3" content. The representation 1362 is highlighted (e.g., with a dashed line) to indicate that it represents newly-added content. User one does not receive notification related to the new hot index associated with the "File C" content or the new content preview file associated with the "File A" content, since user one has already watched the "File C" and "File A" content.

Although user one has watched "File A", "File B", and "File C", those content files may or may not be deleted from the media player/access device associated with user one. For example, the content list 1360 may be a content list which shows unwatched shows for the associated channel. In general, in some implementations, a content file may be deleted after a user has finished viewing the content file (possibly based on a user preference). In some implementations, a content file may be deleted after being viewed and after the content expires. In other implementations, content files are deleted only if a user issues an explicit request to delete a content file.

Suppose that user two has not watched any of the "File A", "File B", "File C", or "File D" content. After receiving updated channel information, a content list 1364 for user two may display representations 1366-1372 for the "File A", "File 3", "File B", and "File C" content, respectively. A representation for the "File D" content may be available, for example by scrolling. The representation 1368 for the "File 3" content is highlighted to indicate that it represents newly-added content. A representation 1374 of a recently-added preview file for "File A" and a representation 1376 of a recently-added hot index for "File C" may appear highlighted, to indicate that the corresponding supplemental channel information is new.

As another example, suppose that user "N" has watched "File A" but has not watched "File B", "File C", or "File D". A content list 1378 for user "N" may include representations 1380-1386, corresponding to the "File 3", "File B", "File C", and "File D" content, respectively. The representation 1380 for the "File 3" content is highlighted to indicate that it represents newly-added content. The channel list 1378 does not include a representation for "File A" or a notification of the new content preview file for "File A" since user "N" has already watched "File A". A representation 1388 for the recently-added hot index for "File C" is highlighted, to indicate that the corresponding hot index is new.

A user may also be updated in response to updates to channel information which are automatically determined (e.g., in contrast to channel information updates initiated by a content curator). For instance, in the example of FIG. 15, channel lists 1530-1534 for users one, two, and "N", respectively, each include the "DJ's Channel" channel (as shown by channel indicators 1537-1540). Assume that modifications 1520-1526 have been previously automatically determined, based on monitoring of aspects of the channel. In response to the modifications 1520-1526, updated channel information may be sent to the media player/access devices for user one, user two, and user "N". The users two, and "N" may see an update message 1541 the next time they use their media player/access device which indicates that "DJ's Channel" has been updated.

Suppose, similar to the user one, user two, and user "N" viewing behavior in the example of FIG. 13, that user one has already watched the "File A", "File B", "File C", and "File D" content (a content list 1542 for user one is correspondingly empty). In such a scenario, user one might not see the update message 1541 or see any notifications related to the modifications 1520-1526, since the updates are applicable to content that user one has already seen. Also, in some examples, update messages may generally be displayed only if certain types of updates occur (e.g., new or deleted content links) and may not be shown if only certain other types of updates occur (e.g., if the only types of updates that have occurred are modifications to supplemental channel information, update messages might not be displayed).

Suppose, in the example of FIG. 15, that prior to the updates 1520-1526, that user two has watched the "File D" content but has not watched any of the "File A", "File B", or "File C" content. A content list 1544 may correspondingly display representations 1548 and 1550 for the "File B" and "File C" content, respectively. A representation for "File A" is not shown, due to the modification 1520. The representation 1550 for "File C" might not be highlighted, despite the update-link modification 1522. For example, the update-link modification might not be deemed of interest to the user (e.g., the "File C" content is still available, and the user may not be interested in the fact that the link is available at a different link address). A representation 1552 of a recently-added preview file for "File B" (e.g., corresponding to modification 1526) and a representation 1554 of a recently-added hot index for "File C" (e.g., corresponding to modification 1524) may appear highlighted, to indicate that the corresponding supplemental channel information is new. Similarly, representations 1558 and 1562, corresponding to the recently-added preview file for "File B" (e.g., modification 1526) and the recently-added hot index for "File C" (e.g., modification 1524) may appear highlighted in a content list 1564 for user "N". The content list 1564 does not include a representation for "File A", due to modification 1520.

As another example of defining a channel, in some implementations, a first user may subscribe to a channel associated with a second user. For example, the second user may send a content item or a link to a content item to the first user, such as by sending an electronic communication (e.g., email) addressed to a communications address associated with the media player/access device of the first user. In response to receiving an electronic communication from the second user, the media player/access device of the first user (or, as other examples, a server device, or a remote control device associated with the first user) may extract the content from the communication (e.g., by streaming content through a link included in the communication, extracting content attached to the communication, or downloading content using download information (e.g., a BitTorrent™ torrent file) included in the communication, to name a few examples).

After content has been extracted, the content may be organized in a channel associated with the second user. The first user may watch the content items received from the second user, in a manner similar to watching content files included on a channel defined by a content curator. In some implementations, the second user in this example is a content curator. In some implementations, the second user is not a defined content curator, but is a regular user who has subscribed to the system. For example, the first user and second user may be friends or may belong to the same family. For example, a first user sending content to a second user with the received content being organized into a channel for the second user may be a convenient way for the second user to share content with the first user and possibly with other users (e.g., the second user may send electronic communication to a group of users).

In some implementations, content curators may define points of interest in channels organized by the content curators. In these implementations, the points of interest may represent interactive elements that supplement and enhance content arranged in the channels organized by the content curators. For instance, a point of interest may define a specific time interval for an episode to display a curator-prepared text message to appear on a media player outputting the episode. The purpose of the point of interest may be to prompt the user to take some sort of action while watching that episode. The action that the user is asked to take may be executed from a remote control, such as by pushing a button on the remote control. The actions may include asking the user if he or she wants to receive more information about a subject/celebrity/object related to the content currently being played. If the user answers yes, then a promotional message or coupon may be sent to the user's email account or to his mobile phone. In another example, the action may include asking the user to participate in taking a poll or survey. In yet another example, the action may include asking the user to set up a future reminder which will trigger a reminder message to be sent to the user's mobile phone at a future time (e.g., a real-time reminder to remind the user about a television program which is about to air). A point of interest may be created by a content curator on a Curation Management System (CMS) using techniques similar to those discussed above for creating supplemental channel information. An episode can have multiple points of interest and, if a user takes no action to a point of interest, then the point of interest message will disappear after a timeout period. In addition, a channel also may have its own point of interest, which is separate from points of interest for the episodes within that channel and is output based on viewing of the channel, regardless of what episodes from the channel are being viewed.

FIG. 16 illustrates a process 1600 for handling points of interest. The operations of the process 1600 are described generally as being performed by the system 200. The operations of the process 1600 may be performed by one of the components of the system 200 (e.g., the server system 210) or may be performed by a combination of the components of the system 200. In some implementations, operations of the process 1600 may be performed by one or more processors included in one or more electronic devices.

The system 200 accesses data used in defining a point of interest that supplements content arranged in a channel associated with the content curator (1602). For example, the system 200 may display an interface that enables a content curator to enter information that defines a point of interest and receive the data that defines the point of interest through the displayed interface. In this example, the system 200 may solicit and receive information defining when the point of interest should be output, how the point of interest should be output with content defined by the channel, and what action the point of interest invokes based on a response from a user perceiving the point of interest.

In some examples, the system 200 automatically, without input from the content curator, determines data used in defining the point of interest based on one or more rules that control definition of points of interest for the channel associated with the content curator on the content delivery network. In these examples, the one or more rules may be system-defined rules that specify when points of interest are presented within multiple channels in the content delivery network or when a point of interest is to be presented in a particular episode for all channels that include the particular episode. The one or more rules also may be specific to the content curator and only control definition of points of interest for channels associated with the content curator. The content curator may provide input defining the one or more rules and the system 200 may automatically, without further input from the content curator, define points of interest for the content curator's channels based on the provided input. The one or more rules may use various criteria in determining to define points of interest. The criteria may include the type of content arranged in a channel, end user interactions with content and/or channels, external events (e.g., changing weather data or stock prices), or any other criteria using data accessible to the system 200.

In some implementations, the system 200 accesses timing information that indicates when the point of interest is used to supplement content arranged in the channel associated with the content curator on the content delivery network. In these implementations, the timing information may be defined relative to an amount of time a particular episode or content file has been played or relative to an amount of time a channel has been output. For instance, the timing information may indicate that the point of interest should be output five minutes into playing of a particular episode organized in the channel or may indicate that the point of interest should be output after the channel has been experienced by a user for two hours. The timing information also may define an absolute time at which the point of interest should be displayed, such as every Thursday at 8:00 PM or on July 29 at 6 PM. The timing information also may be defined relative to actions taken by a user experiencing a channel or an episode. For instance, the timing information may indicate that the point of interest should be displayed after content of a channel or episode has been fast-forwarded for more than one minute (e.g., a point of interest to jump to a hot index may be displayed when the content of a channel or episode has been fast-forwarded for more than one minute). In addition, the timing information may be relative to the number of times a user has taken a particular action, such as skipping episodes a particular number of times or watching entire episodes without interruption for a particular number of times (e.g., a first poll point of interest soliciting feedback on the channel may be displayed after a user has skipped three episodes in the channel and a second poll point of interest soliciting feedback on the channel may be displayed after a user has watched three episodes in a row in their entirety without fast forwarding). Any timing parameters and any actions taken by a user in experiencing content on the channel or within an episode may be used to trigger presentation of a point of interest.

In some examples, the timing information indicates a duration of how long the point of interest is output to supplement content arranged in the channel associated with the content curator on the content delivery network. In these examples, the system 200 receives, form the content curator, input defining how long the point of interest should be displayed with content from the channel. For instance, the content curator may specify that the point of interest should be displayed for thirty seconds and the system 200 receives the duration information for use in defining the point of interest. In other examples, the system 200 may use a default duration (e.g., fifteen seconds) for all points of interest.

In some implementations, the system 200 accesses output information that defines how the point of interest is output with content arranged in the channel associated with the content curator on the content delivery network. The output information may define the visual display of the point of interest and/or the audio output of the point of interest. For example, the output information may define text to be displayed with content arranged in the channel associated with the content curator on the content delivery network and/or one or more user input controls to be displayed with content arranged in the channel associated with the content curator on the content delivery network. In this example, the output information also may include a definition of where the point of interest is output in a visual interface. The definition of where the point of interest is output in the visual interface may specify that the point of interest is displayed as a horizontal bar running along a lowermost edge of the interface, a horizontal bar running along an uppermost edge of the interface, a vertical bar running along a left edge of the interface, a vertical bar running along a right edge of the interface, or a location in a central portion of the interface displaying content from the channel. The system 200 may enable the content curator to modify any output characteristics for the point of interest.

Further, the system 200 may display a preview of content to a content curator in receiving input that defines the point of interest. For instance, the system 200 may enable the content curator to watch or scrolling content of content files organized in the content curator's channel to identify a location at which the content curator would like to output the point of interest. In this regard, the system 200 may receive, from the content curator, input indicating that the content curator would like to output the point of interest at the current point in the content displayed in the preview and determine the timing information from that input. Also, the system 200 may receive a definition of where the point of interest is output in the visual interface based on the content curator's interaction with the content displayed in the preview (e.g., the content curator may click on or tap an area of the content displayed in the preview to set that point as the location where the point of interest is to be displayed).

In addition, the system 200 may accesses action information that defines one or more actions that occur based on user interaction with the point of interest. The actions may include any types of actions that enhance and supplement the user's experience of content arranged in the channel. For example, the action information may include link actions that link to other content that is related to or relevant to the content arranged in the channel. In this example, the link action would cause the system 200 to output content made available at a linked address responsive to interaction with the point of interest. The content made available at the linked address may include another video made available at the linked address and/or a web page with information relevant to the content being output from the channel. The system 200 may enable the user to perceive the content/information associated with the link action and then return to the content organized in the channel at the point in time at which the user interacted with the point of interest.

Figure 17:
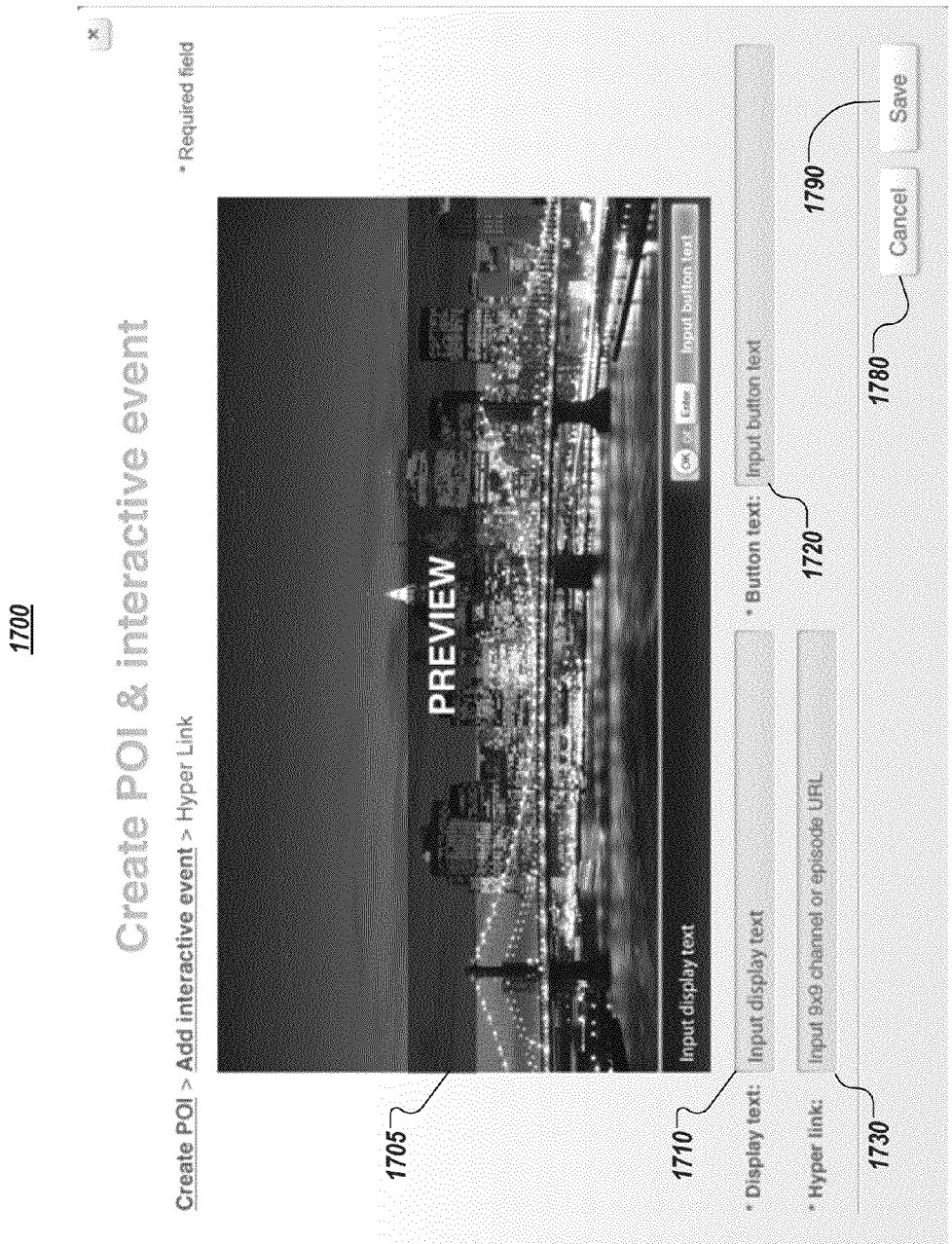
FIGS. 17-20 illustrate example interfaces that receive input from a content curator in defining points of interest.

FIG. 17 illustrates an example interface 1700 that receives input from a content curator in defining a link point of interest. As shown in FIG. 17, the interface 1700 includes a preview content window 1705, a display text input box 1710, a button text input box 1720, and a hyper link input box 1730. The preview content window 1705 displays a preview of the content file in the channel to which the user is adding a point of interest. The preview content window 1705 also displays a representation of how the point of interest would be displayed with content from the content file in the channel, such as the horizontal bar located at the lowermost portion of the interface 1700. A content curator may manipulate the preview content window 1705 to identify a location in the content file at which the content curator would like to display the point of interest and the system 200 may set the timing information for the point of interest based on the location displayed in the preview content window 1705.

The display text input box 1710 receives text input used in displaying the point of interest. The system 200 may use the text provided in the display text input box 1710 as a message to display with the point of interest. The button text input box 1720 receives text input used in displaying the buttons used to interact with the point of interest. In this example, the arrangement and location of the point of interest is predefined by operators of the system 200 and the text provided to the display text input box 1710 and the button text input box 1720 is used to customize the text included in the predefined point of interest arrangement. In other examples, content curators may be allowed to define the arrangement and location of the point of interest and may have more control over customizations of the appearance of the point of interest.

In addition, the hyper link input box 1730 receives text input defining a link address used in linking to additional content or information based on a response to the point of interest. The system 200 stores the link address with the action information for the point of interest and uses the link address in performing the action associated with the point of interest. The system 200 may store data representing the point in the content at which the user responded to the link point of interest and may use the stored data to return to the exact point in the content at which the user responded to the link point of interest upon the user providing input indicating a desire to return to the content in the channel (e.g., user input selecting a back or menu button).

The interface 1700 also includes a cancel input control 1780 and a save input control 1790. The cancel input control 1780 enables a user to exit the interface 1700 without setting a point of interest. The save input control 1790 enables a user to save the input provided in the interface 1700 and trigger definition of the point of interest based on the saved information.

Referring again to FIG. 16, the action information also may include notification actions that notify the user of additional information related to or relevant to the content being output from the channel. The notification actions may result in content or information related to or relevant to the content being output from the channel to be immediately sent to another device (e.g., a mobile device) of the user that interacted with the point of interest. The user that interacted with the point of interest then may view the content or information using the other device without an interruption in the content being output from the channel.

Figure 18:
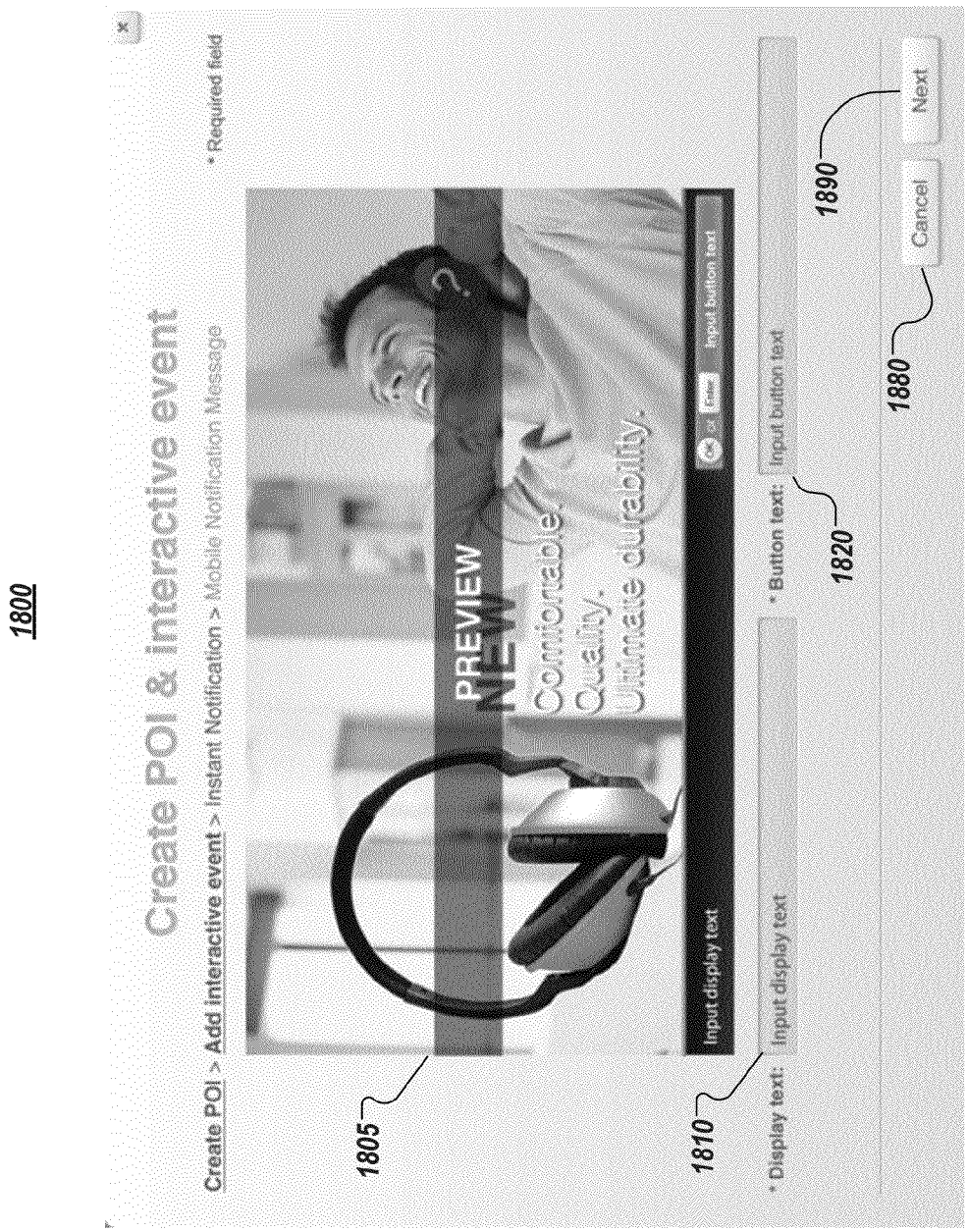

FIG. 18 illustrates an example interface 1800 that receives input from a content curator in defining a notification point of interest. As shown in FIG. 18, the interface 1800 includes a preview content window 1805, a display text input box 1810, and a button text input box 1820. The preview content window 1805 displays a preview of the content file in the channel to which the user is adding a point of interest. The preview content window 1805 also displays a representation of how the point of interest would be displayed with content from the content file in the channel, such as the horizontal bar located at the lowermost portion of the interface 1800. A content curator may manipulate the preview content window 1805 to identify a location in the content file at which the content curator would like to display the point of interest and the system 200 may set the timing information for the point of interest based on the location displayed in the preview content window 1805.

The display text input box 1810 receives text input used in displaying the point of interest. The system 200 may use the text provided in the display text input box 1810 as a message to display with the point of interest. The button text input box 1820 receives text input used in displaying the buttons used to interact with the point of interest. In this example, the arrangement and location of the point of interest is predefined by operators of the system 200 and the text provided to the display text input box 1810 and the button text input box 1820 is used to customize the text included in the predefined point of interest arrangement. In other examples, content curators may be allowed to define the arrangement and location of the point of interest and may have more control over customizations of the appearance of the point of interest.

The interface 1800 also includes a cancel input control 1880 and a next input control 1890. The cancel input control 1880 enables a user to exit the interface 1800 without setting a point of interest. The next input control 1890 enables a user to save the input provided in the interface 1800 and move to the next interface where the user is able to define the action information of the notification point of interest. In this regard, the next interface enables the user to define the notification action in terms of what content or information is provided with the notification and to which device the notification is to be provided (e.g., an application on the user's mobile device or the user's electronic mail account).

Referring again to FIG. 16, the action information further may include scheduled notification actions that provide a reminder to the user or, at a future time, notify the user of additional information related to or relevant to the content being output from the channel. The scheduled notification actions may result in a reminder or content/information related to or relevant to the content being output from the channel to be sent to another device (e.g., a mobile device) of the user that interacted with the point of interest at a future time that is likely more convenient for the user to receive the reminder or content/information. The system 200 provides the reminder or content/information to the user at the scheduled future time to provide the reminder or content/information to the user at a time that is likely best for the user to receive the information. For instance, a scheduled notification may provide the user with a reminder for a particular television show fifteen minutes prior to the show being broadcast or a scheduled notification may provide the user with information about a product on a Saturday morning because the system 200 has learned that the user typically shops on Saturday mornings and the information about the product may be most effectively presented to the user at a time when the user is already shopping or planning to shop.

Figure 19:
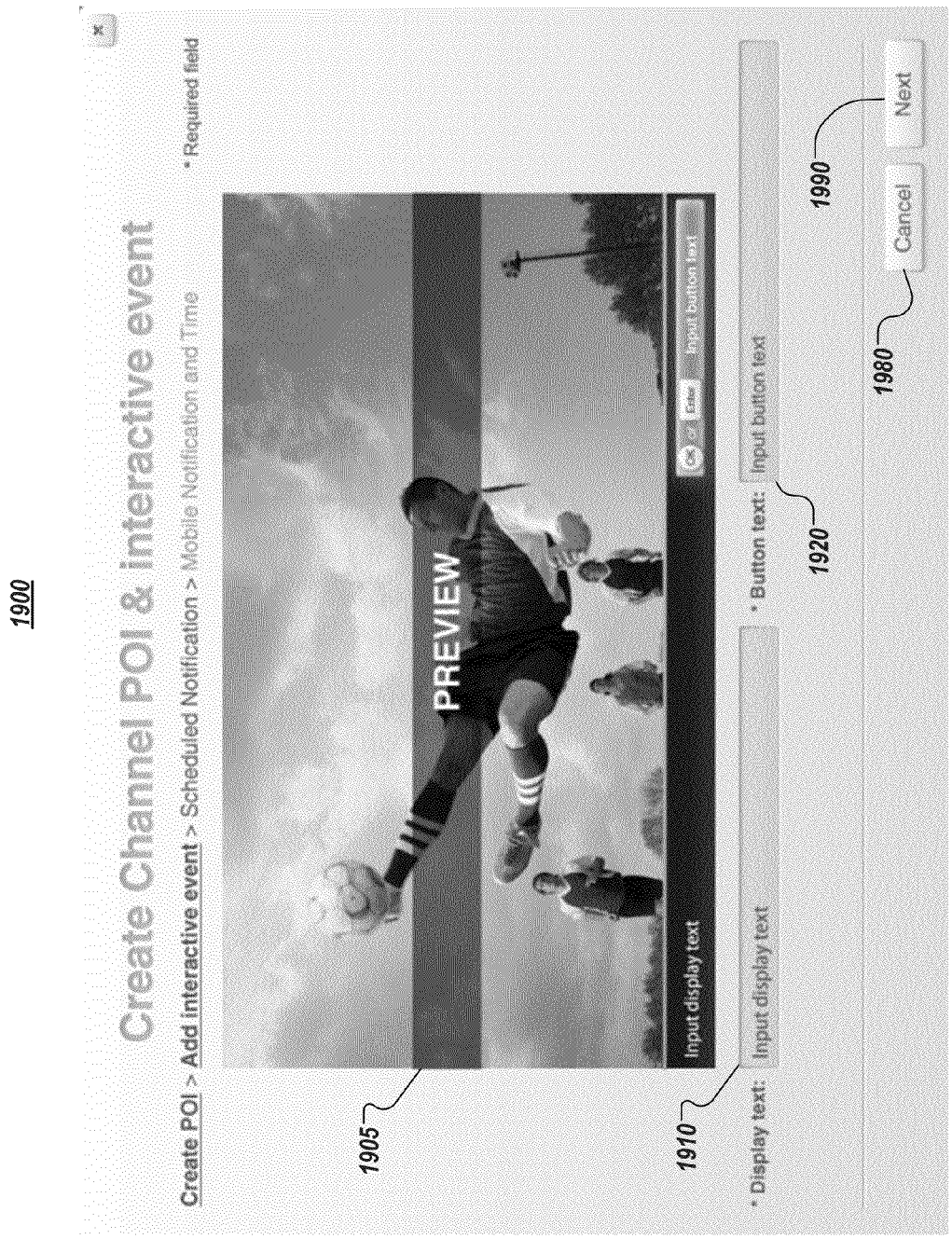

FIG. 19 illustrates an example interface 1900 that receives input from a content curator in defining a scheduled notification point of interest. As shown in FIG. 19, the interface 1900 includes a preview content window 1905, a display text input box 1910, and a button text input box 1920. The preview content window 1905 displays a preview of the content file in the channel to which the user is adding a point of interest. The preview content window 1905 also displays a representation of how the point of interest would be displayed with content from the content file in the channel, such as the horizontal bar located at the lowermost portion of the interface 1900. A content curator may manipulate the preview content window 1905 to identify a location in the content file at which the content curator would like to display the point of interest and the system 200 may set the timing information for the point of interest based on the location displayed in the preview content window 1905.

The display text input box 1910 receives text input used in displaying the point of interest. The system 200 may use the text provided in the display text input box 1910 as a message to display with the point of interest. The button text input box 1920 receives text input used in displaying the buttons used to interact with the point of interest. In this example, the arrangement and location of the point of interest is predefined by operators of the system 200 and the text provided to the display text input box 1910 and the button text input box 1920 is used to customize the text included in the predefined point of interest arrangement. In other examples, content curators may be allowed to define the arrangement and location of the point of interest and may have more control over customizations of the appearance of the point of interest.

The interface 1900 also includes a cancel input control 1980 and a next input control 1990. The cancel input control 1980 enables a user to exit the interface 1900 without setting a point of interest. The next input control 1990 enables a user to save the input provided in the interface 1900 and move to the next interface where the user is able to define the action information of the scheduled notification point of interest. In this regard, the next interface enables the user to define the scheduled notification action in terms of what content or information is provided with the notification, to which device the notification is to be provided (e.g., an application on the user's mobile device or the user's electronic mail account), and what time the scheduled notification is to be provided.

Referring again to FIG. 16, action information may include poll actions that request users to participate in a poll. The poll actions may pose a question to users perceiving the channel associated with the content curator with a set of potential answers to the question. The system 200 may define the poll question and answers based on input provided by the content curator.

Figure 20:
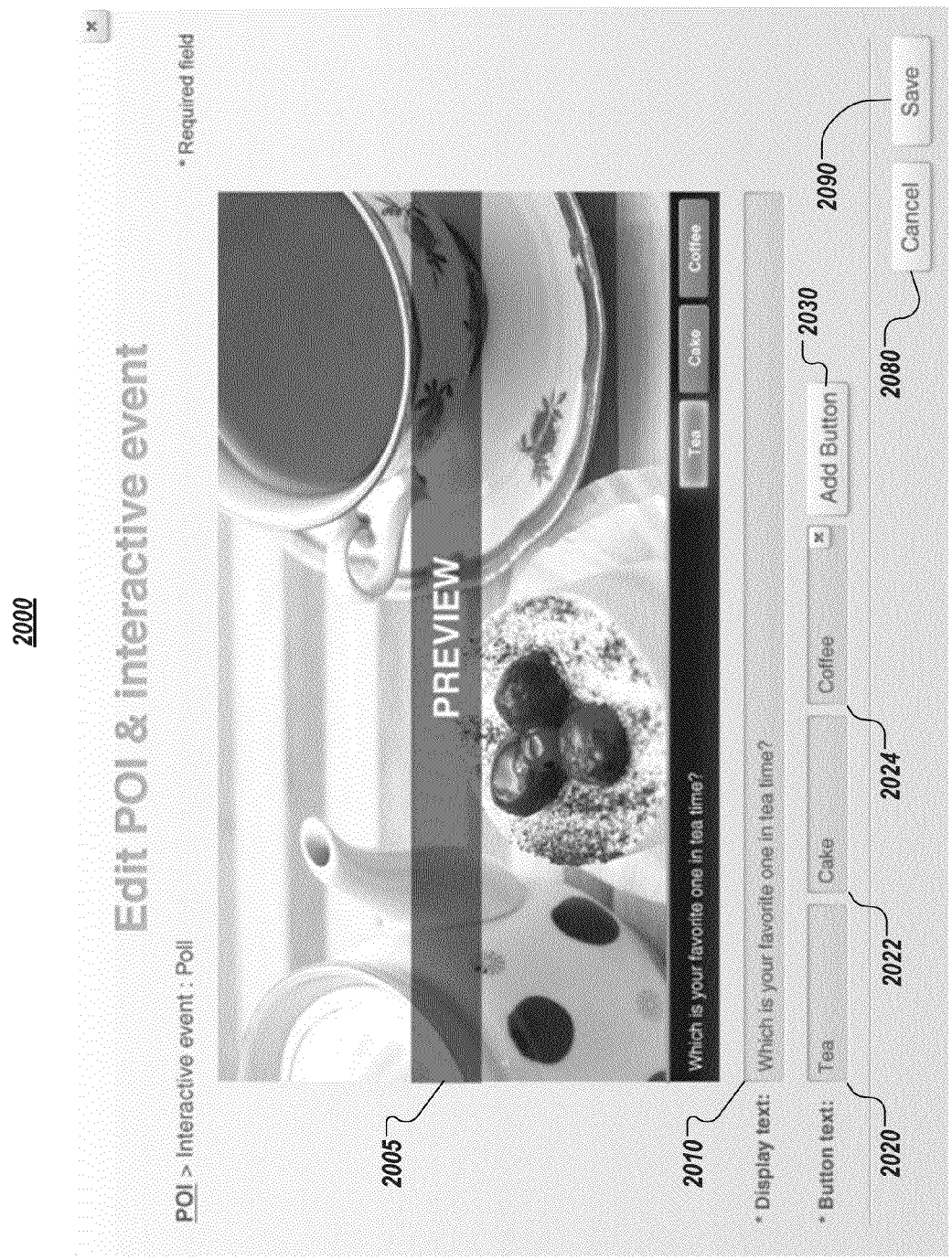

FIG. 20 illustrates an example interface 2000 that receives input from a content curator in defining a poll point of interest. As shown in FIG. 20, the interface 2000 includes a preview content window 2005, a display text input box 2010, multiple button text input boxes 2020, 2022, and 2024, and an add button input control 2030. The preview content window 2005 displays a preview of the content file in the channel to which the user is adding a point of interest. The preview content window 2005 also displays a representation of how the point of interest would be displayed with content from the content file in the channel, such as the horizontal bar located at the lowermost portion of the interface 2000. A content curator may manipulate the preview content window 2005 to identify a location in the content file at which the content curator would like to display the point of interest and the system 200 may set the timing information for the point of interest based on the location displayed in the preview content window 2005.

The display text input box 2010 receives text input used in displaying the point of interest. The system 200 may use the text provided in the display text input box 2010 as a message to display with the point of interest. In this case, the message is a poll question presented to the user with the content from the channel.

The button text input boxes 2020, 2022, and 2024 receive text input used in displaying the buttons used to interact with the point of interest. In this example, multiple buttons are defined to correspond to multiple potential answers to the poll question and the text input in the button text input boxes 2020, 2022, and 2024 represents the answers to the poll question. The add button input control 2030 receives input to add another button to the point of interest, thereby adding an additional potential answer to the poll question. The add button input control 2030 enables a content curator to customize the number of buttons in the point of interest up to a predefined limit.

The interface 2000 also includes a cancel input control 2080 and a save input control 2090. The cancel input control 2080 enables a user to exit the interface 2000 without setting a point of interest. The save input control 2090 enables a user to save the input provided in the interface 2000 and trigger definition of the point of interest based on the saved information.

Referring again to FIG. 16, the system 200 defines the point of interest based on timing information, output information, and action information (1604). For instance, the system 200 stores, in electronic storage, data that represents the point of interest and enables the point of interest to be presented with content defined by the channel or episode associated with the point of interest. The point of interest is defined in accordance with the timing information, the output information, and the action information received from the content curator.

FIG. 21 illustrates an example data structure 2100 that stores point of interest data. The data structure 2100 may be used by the system 200 in defining the point of interest based on timing information, output information, and action information. As shown in FIG. 21, the data structure 2100 includes a channel column 2102, an episode column 2104, a time column 2106, a duration column 2108, a type column 2110, a display text column 2112, a button text column 2114, and an action column 2116. The channel column 2102 identifies a channel associated with the point of interest to the extent the point of interest is associated with a channel. The episode column 2104 identifies an episode associated with the point of interest to the extent the point of interest is associated with an episode. The time column 2106 defines a time when the point of interest is to be displayed. The duration column 2108 defines a duration of how long the point of interest is to be displayed. The type column 2110 defines a type of the point of interest from among a link point of interest, a notification point of interest, a scheduled notification point of interest, and a poll point of interest. The display text column 2112 defines text for a message displayed for the point of interest. The button text column 2114 defines text displayed with buttons used in interacting with the point of interest. The action column 2116 defines one or more actions that occur based on a user interacting with the point of interest.

In FIG. 21, the data structure 2100 includes four example rows of point of interest data that define four example points of interest. The four example points of interest relate to the interfaces 1700, 1800, 1900, and 2000, respectively. As shown, the first row corresponds to a first point of interest defined using the interface 1700. The first point of interest is not associated with a channel, but is associated with the episode www.cityep2.com such that the first point of interest is displayed in all channels of the content curator that defined the first point of interest that include the episode www.cityep2.com. The first point of interest is displayed at the 5:34 mark of the episode www.cityep2.com and has a duration of thirty seconds. The first point of interest is a link point of interest and displays the text "Have you ever seen such a beautiful night." The button for the first point of interest is displayed in association with the text "Plan Your Trip Online" and the first point of interest links to www.trav2.com/city2 upon selection of the button for the first point of interest.

The second point of interest is not associated with an episode, but is associated with the channel www.my3.com such that the second point of interest is only in the channel www.my3.com of the content curator that defined the second point of interest. The second point of interest is displayed after the channel www.my3.com has been tuned for ten minutes and has a duration of ten seconds. The second point of interest is a notification point of interest and displays the text "Better Life Products." The button for the second point of interest is displayed in association with the text "Get Shopping Information" and the second point of interest causes shopping information to be sent to a user's mobile device upon selection of the button for the second point of interest.

The third point of interest is not associated with a channel, but is associated with the episode www.soc14.com such that the third point of interest is displayed in all channels of the content curator that defined the third point of interest that include the episode www.soc14.com. The third point of interest is displayed at the 32:30 mark of the episode www.soc14.com and has a duration of two minutes. The third point of interest is a scheduled notification point of interest and displays the text "Watch Highlights of the FIFA World Cup Championship." The button for the third point of interest is displayed in association with the text "Remind me to watch" and the third point of interest causes a reminder to watch World Cup highlights to be sent to a user's mobile device at 8:00 PM on Jul. 30, 2013.

The fourth point of interest is associated with the channel www.cook8.com and also associated with the episode www.tea143.com such that the fourth point of interest is displayed in the episode www.tea143.com, but only for the channel www.cook8.com. Accordingly, the fourth point of interest is not displayed in other channels of the content curator that include the episode www.tea143.com. The fourth point of interest is displayed at the 00:10 mark of the episode www.tea143.com and has a duration of one minute. The fourth point of interest is a poll point of interest and displays the text "Which is your favorite one in tea time?" as the poll question. The buttons for the fourth point of interest are displayed in association with the text "Tea," "Cake," and "Coffee," which represent the potential answers to the poll question that are selectable by a user. The fourth point of interest causes poll results to be displayed to the user with the content from the channel.

As described above, the data structure 2100 is associated with a single content curator and represents the points of interest the single content curator has defined. Each content curator in the content delivery network may have his or her own data structure such that points of interest are specific to content curators and do not permeate to channels defined by other content curators. In some implementations, content curators may be able to share and exchange points of interest to gather more poll data or assist each other in providing the best interactive experience for subscribers to the channels of the content curators.

Returning again to FIG. 16, the system 200 associates the point of interest with at least one of the channel associated with the content curator and a content link arranged in the channel associated with the content curator (1606). For instance, the system 200 associates the point of interest with a particular channel, a particular episode, or both a particular channel and a particular episode. The system 200 may associate the point of interest with a particular channel by storing a representation or indication of the point of interest in channel information for the particular channel. The system 200 may associate the point of interest with a particular episode by identifying all channels of the content curator that include the particular episode and storing a representation or indication of the point of interest for the particular episode in channel information for each of identified channels.

For episode points of interest, the timing information may indicate that the point of interest is to be output at a specific time during output of content linked to by a content link for the episode arranged in the channel associated with the content curator on the content delivery network. In these examples, the system 200 associates the point of interest with the content link arranged in the channel associated with the content curator on the content delivery network and controls, at the specific time during output of the content linked to by the content link, output of the point of interest in addition to the content linked to by the content link. The system 200 may make the point of interest available in multiple channels that are associated with the content curator and that each include the content link. In addition, the system 200 may withhold the point of interest from channels that are defined by other content curators on the content delivery network and that include the content link such that the point of interest is output only when the user is experiencing the content linked to by the content link from the channel associated with the content curator.

For channel points of interest, the timing information may indicate that the point of interest is to be output at a specific time during selection of the channel associated with the content curator on the content delivery network. In these examples, the system 200 associates the point of interest with the channel associated with the content curator on the content delivery network and controls, at the specific time during selection of the channel associated with the content curator, output of the point of interest in addition to the content defined by the channel associated with the content curator. The system 200 may control, at the specific time during selection of the channel associated with the content curator, output of the point of interest regardless of how the channel has been controlled during selection such that the point of interest is output with different content for different users. For instance, different users may fast forward and/or rewind through content at different rates and, because the fast forwarding and rewinding does not impact how long the channel has been selected, the point of interest may be output with different content for different users of the content delivery network.

The system 200 controls, based on the timing information and the output information, output of the point of interest in addition to content defined by the channel associated with the content curator (1608). For example, the system 200 monitors for the time specified by the timing information and, based on detecting the time specified by the timing information, integrates a representation of the point of interest with the content defined by the channel associated with the content curator. The system 200 may determine the representation of the point of interest based on the output information customized by the content curator and predefined attributes of how points of interest are displayed. The system 200 may output the point of interest for the duration indicated by the timing information. To the extent the timing information does not specify a duration, the system 200 may output the point of interest for a default period of time. The system 200 may integrate a representation of the point of interest with the content defined by the channel associated with the content curator by adding the text defined by the output information to a display of the content defined by the channel associated with the content curator and/or adding one or more user input controls defined by the output information to a display of the content defined by the channel associated with the content curator.

Figure 22:
FIGS. 22-25 and 29 illustrate example interface displaying points of interest integrated with content defined by a channel.

FIG. 22 illustrates an example interface 2200 displaying a link point of interest integrated with content defined by a channel. The interface 2200 represents a display of the point of interest defined using the interface 1700 and stored in the first row of the data structure 2100. As shown, the interface 2200 includes a message 2210 and an input control 2220. The message 2210 corresponds to the text stored in the display text column 2112 and the text displayed in association with the input control 2220 corresponds to the text stored in the button text column 2114. Upon selection of the input control 2220, the system 200 performs the action defined in the action column 2116.

Figure 23:
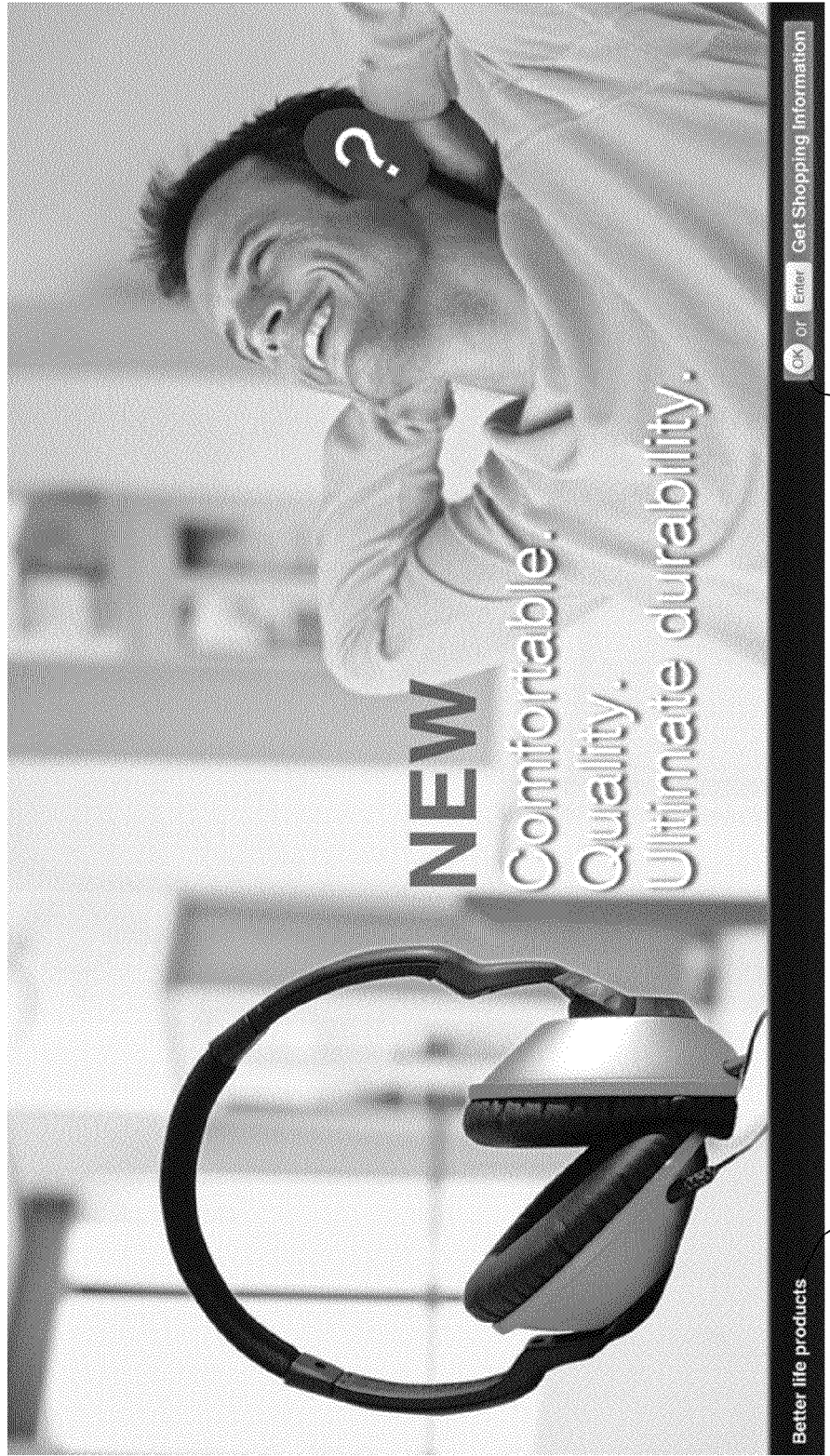

FIG. 23 illustrates an example interface 2300 displaying a notification point of interest integrated with content defined by a channel. The interface 2300 represents a display of the point of interest defined using the interface 1800 and stored in the second row of the data structure 2100. As shown, the interface 2300 includes a message 2310 and an input control 2320. The message 2310 corresponds to the text stored in the display text column 2112 and the text displayed in association with the input control 2320 corresponds to the text stored in the button text column 2114. Upon selection of the input control 2320, the system 200 performs the action defined in the action column 2116.

Figure 24:
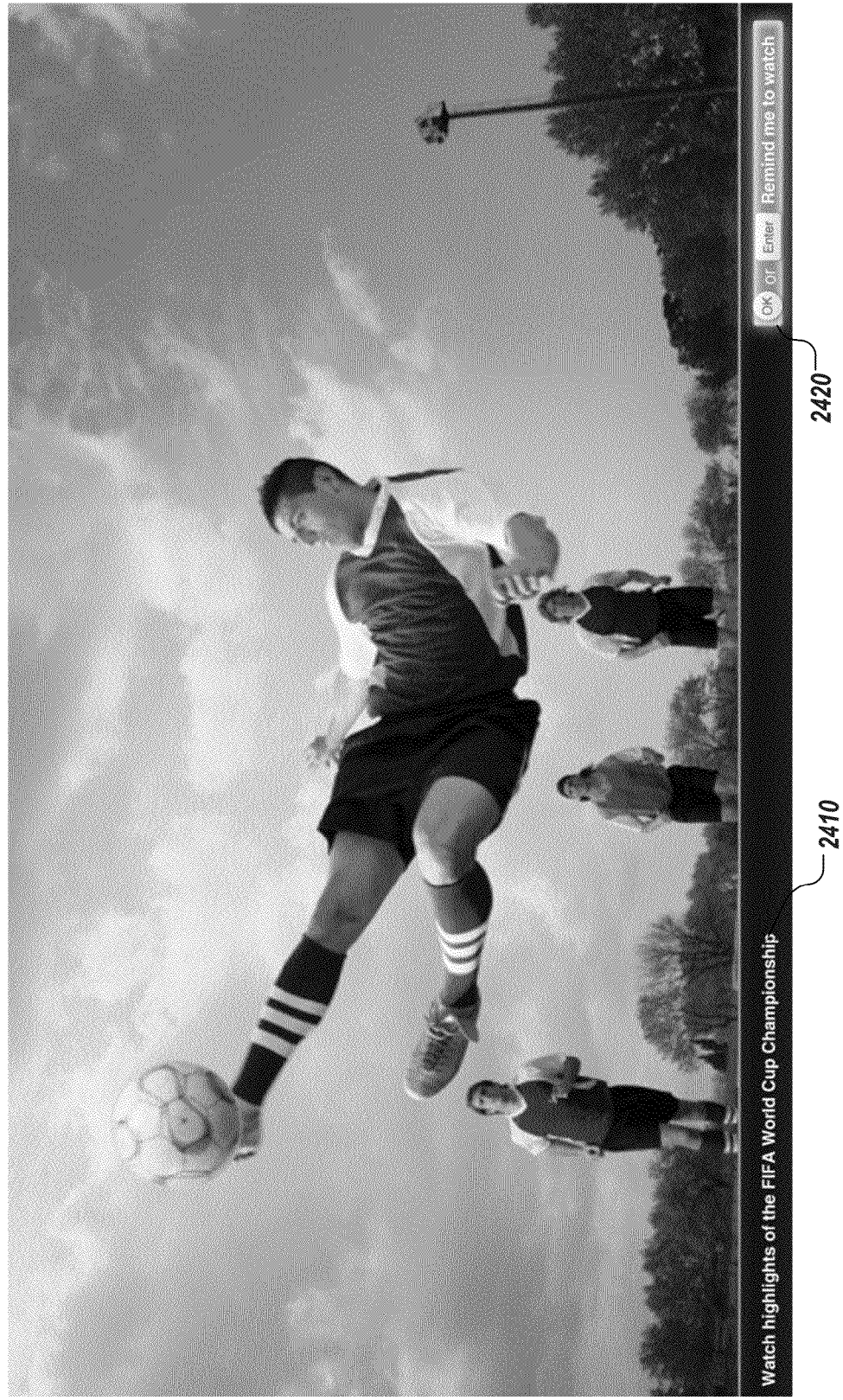

FIG. 24 illustrates an example interface 2400 displaying a scheduled notification point of interest integrated with content defined by a channel. The interface 2400 represents a display of the point of interest defined using the interface 1900 and stored in the third row of the data structure 2100. As shown, the interface 2400 includes a message 2410 and an input control 2420. The message 2410 corresponds to the text stored in the display text column 2112 and the text displayed in association with the input control 2420 corresponds to the text stored in the button text column 2114. Upon selection of the input control 2420, the system 200 performs the action defined in the action column 2116.

Figure 25:

FIG. 25 illustrates an example interface 2500 displaying a poll point of interest integrated with content defined by a channel. The interface 2500 represents a display of the point of interest defined using the interface 2000 and stored in the fourth row of the data structure 2100. As shown, the interface 2500 includes a message 2510 and three input controls 2520, 2522, and 2524. The message 2510 corresponds to the text stored in the display text column 2112 and represents the question for the poll. The text displayed in association with the three input controls 2520, 2522, and 2524 corresponds to the text stored in the button text column 2114 and represents three potential answers to the poll question. Upon selection of one of the three input controls 2520, 2522, and 2524, the system 200 performs the action defined in the action column 2116 and displays results of the poll accounting for the answer selected by the user. As shown, the input control 2520 has been selected to select the answer "Tea."

Returning again to FIG. 16, the system 200 receives an indication that the user interacted with the point of interest output in addition to the content defined by the channel associated with the content curator (1610). For example, system 200 receives an indication that the user interacted with the point of interest by selecting an input control associated with the point of interest. The indication of the user's interaction with the point of interest may be a signal from a remote control that indicates the user's selection of an input control associated with the point of interest. In the case of a poll point of interest, such as that shown in interface 2500, the indication of the user's interaction with the point of interest may indicate which of the three input controls 2520, 2522, and 2524 the user selected.

The system 200 performs an action defined by the action information (1612). For instance, upon receiving the indication of the user's interaction with the point of interest, the system 200 performs the action associated with the point of interest in the action column 2116 of the data structure 2100. As described previously, the actions may include any types of actions that enhance and supplement the user's experience of content arranged in the channel. For example, the action may include link actions that link to other content that is related to or relevant to the content arranged in the channel. In this example, the system 200 may output content made available at a linked address responsive to interaction with the point of interest. The system 200 may enable the user to perceive the content/information associated with the link action and then return to the content organized in the channel at the point in time at which the user interacted with the point of interest.

The action also may include notification actions that notify the user of additional information related to or relevant to the content being output from the channel. In this example, the system 200 may immediately send content or information related to or relevant to the content being output from the channel to another device (e.g., a mobile device) of the user that interacted with the point of interest. The user that interacted with the point of interest then may view the content or information using the other device without an interruption in the content being output from the channel.

The action further may include scheduled notification actions that provide a reminder to the user or, at a future time, notify the user of additional information related to or relevant to the content being output from the channel. In this example, the system 200 may send a reminder or content/information related to or relevant to the content being output from the channel to another device (e.g., a mobile device) of the user that interacted with the point of interest at a future time that is likely more convenient for the user to receive the reminder or content/information. The system 200 may send the reminder or content/information to the user at the scheduled future time to provide the reminder or content/information to the user at a time that is likely best for the user to receive the information.

The action may include poll actions that request users to participate in a poll. In this example, the system 200 may pose a question to users perceiving the channel associated with the content curator with a set of potential answers to the question. The system 200 may define the poll question and answers based on input provided by the content curator.

Figure 26:
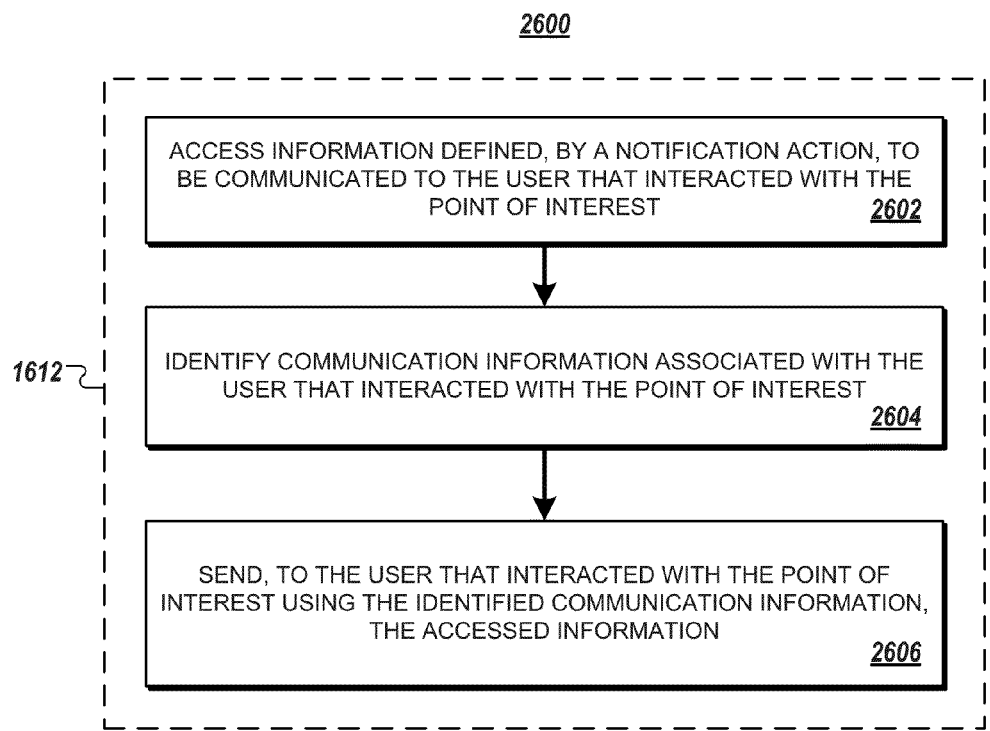

FIG. 26 illustrates a process 2600 for handling a notification action. The process 2600 may be used in performing an action defined by action information of a point of interest referenced above with respect to reference numeral 1612. The operations of the process 2600 are described generally as being performed by the system 200. The operations of the process 2600 may be performed by one of the components of the system 200 (e.g., the server system 210) or may be performed by a combination of the components of the system 200. In some implementations, operations of the process 2600 may be performed by one or more processors included in one or more electronic devices.

The system 200 accesses information defined, by a notification action, to be communicated to the user that interacted with the point of interest (2602). For example, the system 200 may access the action information associated with the notification action and stored in action column 2116 of data structure 2100 and use the action information to determine the information to access. In this example, the action information may identify a link to information to be communicated to the user or may identify a file that stores the information to be communicated to the user. The system 200 may access the information to be communicated to the user using the link defined by the action information or may access the file that includes the information to be communicated to the user. For example, the system 200 may access shopping information associated with Better Life Products from a link to website operated for Better Life Products or from a file that stores a promotional message for Better Life Products.

The system 200 identifies communication information associated with the user that interacted with the point of interest (2604). For example, the system 200 may identify electronic mail information associated with the user that interacted with the point of interest. Alternatively or in addition, the system 200 may identify device information for a communication device of the user (e.g., the user's mobile device), which is different than a device outputting the content defined by the channel associated with the content curator. For example, the notification action information may define to which device the notification is to be provided (e.g., an application on the user's mobile device or the user's electronic mail account) based on information provided by a content curator. In other cases, the system 200 may allow the user that interacted with the point of interest to decide to which device the notification should be sent by, for example, displaying a set of input controls from which the user may select the device to which the user prefers the notification to be sent.

The system 200 sends, to the user that interacted with the point of interest using the identified communication information, the accessed information (2606). For example, system 200 may send the accessed information to the user that interacted with the point of interest using the identified electronic mail address, the identified device information, or both. For example, the system 200 may send the shopping information associated with Better Life Products to the user's electronic mail account or to the user's mobile device.

Figure 27:
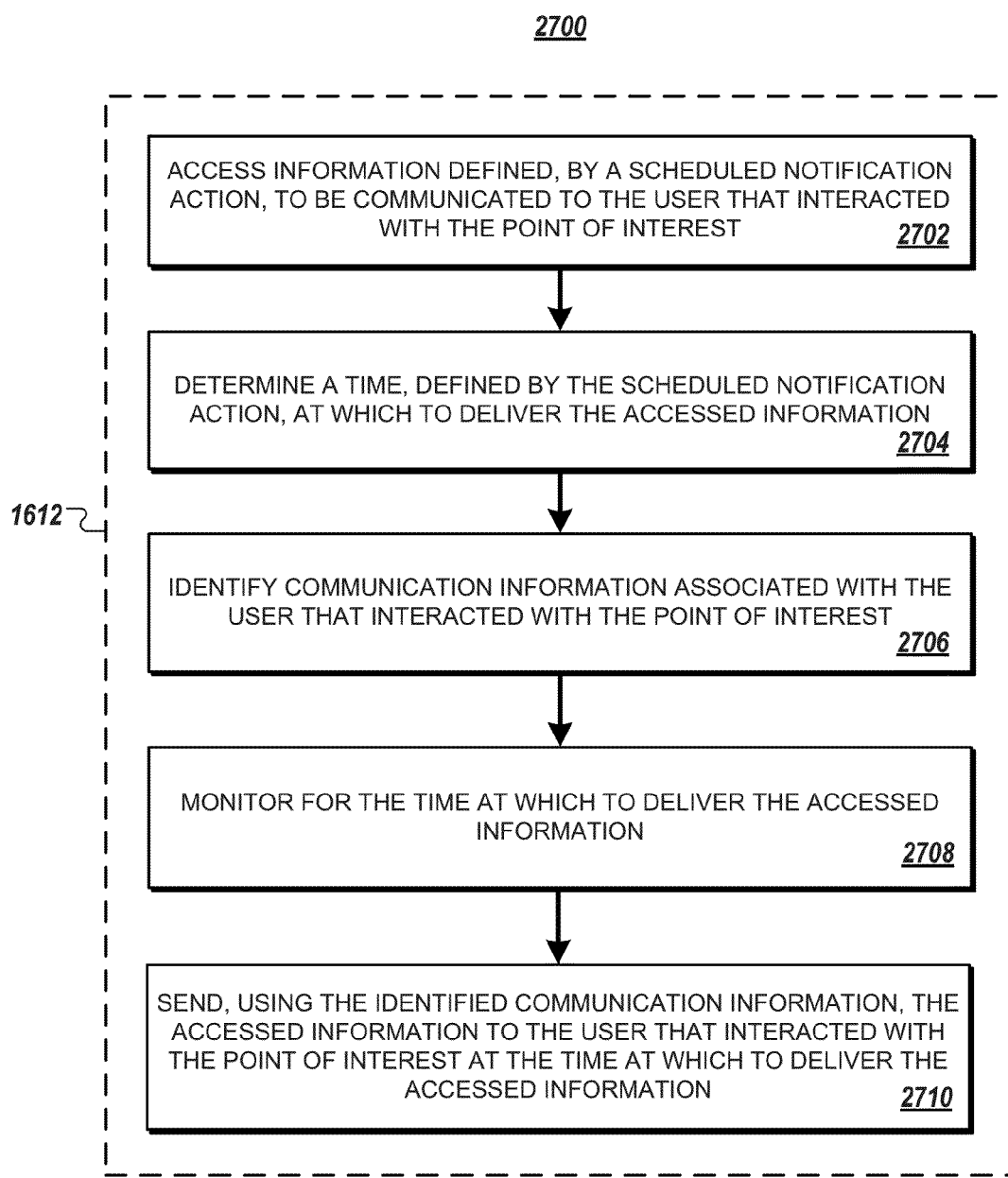

FIG. 27 illustrates a process 2700 for handling a scheduled notification action. The process 2700 may be used in performing an action defined by action information of a point of interest referenced above with respect to reference numeral 1612. The operations of the process 2700 are described generally as being performed by the system 200. The operations of the process 2700 may be performed by one of the components of the system 200 (e.g., the server system 210) or may be performed by a combination of the components of the system 200. In some implementations, operations of the process 2700 may be performed by one or more processors included in one or more electronic devices.

The system 200 accesses information defined, by a scheduled notification action, to be communicated to the user that interacted with the point of interest (2702). For example, the system 200 may access the action information associated with the notification action and stored in action column 2116 of data structure 2100 and use the action information to determine the information to access. In this example, the action information may identify a link to information to be communicated to the user or may identify a file that stores the information to be communicated to the user. The system 200 may access the information to be communicated to the user using the link defined by the action information or may access the file that includes the information to be communicated to the user. For example, the system 200 may access, from a file, the text "Watch highlights of the FIFA World Cup Championship" to use in a reminder for the scheduled notification action. The system 200 also may access a World Cup highlights video using a link defined by the action information and imbed the World Cup highlights video with the reminder.

The system 200 determines a time, defined by the scheduled notification action, at which to deliver the accessed information (2704). For example, the system 200 may determine a time based on information stored in the action column 2116 of the data structure 2100 (e.g., 8:00 PM on Jul. 30, 2013). In some implementations, the system 200 may determine a time based on information that the system 200 has learned about the user. For example, the system 200 may have learned that the user typically shops on Saturday morning and the system 200 may determine that notification for to provide the user with information about or coupons for a product should be delivered on Saturday morning at 10:00 AM.

The system 200 identifies communication information associated with the user that interacted with the point of interest (2706). For example, the system 200 may identify electronic mail information associated with the user that interacted with the point of interest. Alternatively or in addition, the system 200 may identify device information for a communication device of the user (e.g., the user's mobile device), which is different than a device outputting the content defined by the channel associated with the content curator. For example, the scheduled notification action information may define to which device the notification is to be provided (e.g., an application on the user's mobile device or the user's electronic mail account) based on information provided by a content curator. In other cases, the system 200 may allow the user that interacted with the point of interest to decide to which device the notification should be sent by, for example, displaying a set of input controls from which the user may select the device to which the user prefers the notification to be sent.

The system 200 monitors for the time at which to deliver the accessed information (2708). For example, the system 200 may use a system clock to monitor for the date and time at which to deliver the accessed information.

The system 200 sends, using the identified communication information, the accessed information to the user that interacted with the point of interest at the time at which to deliver the accessed information (2710). For example, system 200 may send the accessed information to the user that interacted with the point of interest using the identified electronic mail address, the identified device information, or both at the determined delivery time. For example, the system 200 may send a reminder including the text "Watch highlights of the FIFA World Cup Championship" along with a link to a video of World Cup highlights to the user's electronic mail address at 8:00 PM on Jul. 30, 2013. As another example, the system 200 may send the shopping information or coupon to the to the user's mobile device at 10:00 AM Saturday morning.

Figure 28:
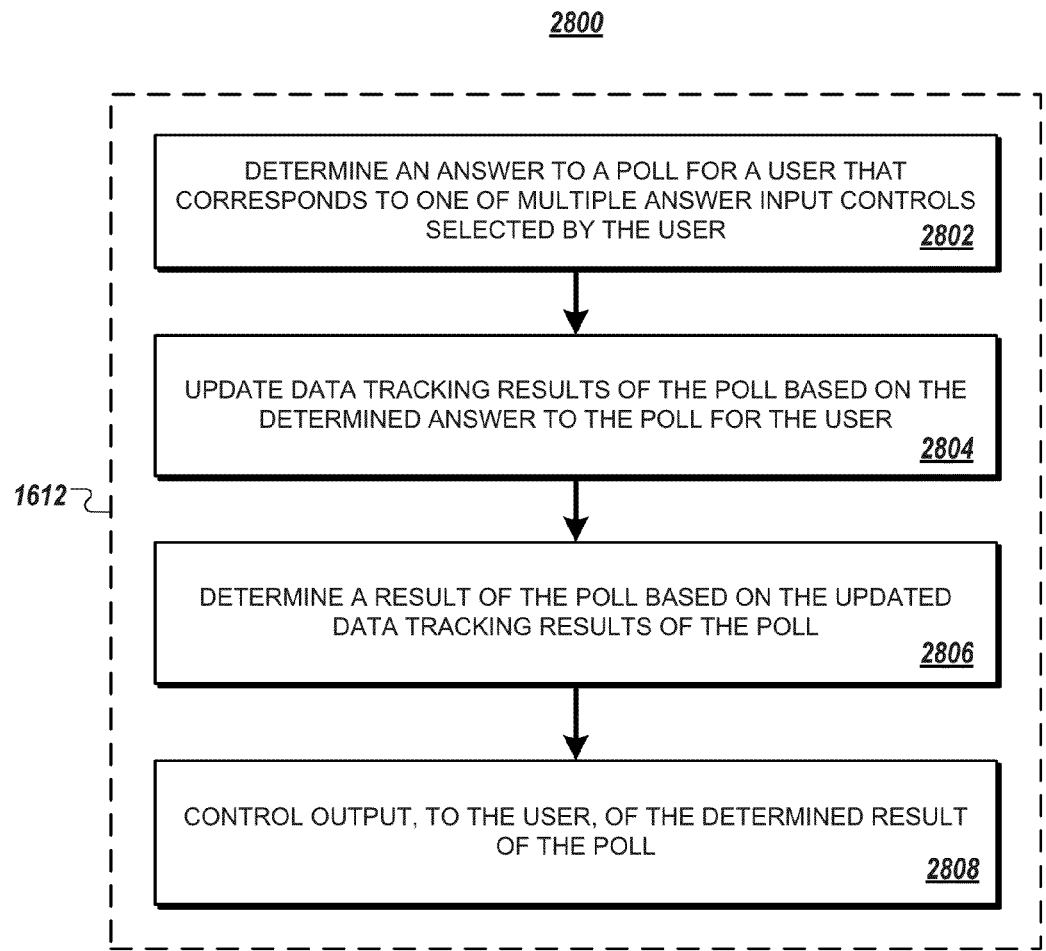

FIG. 28 illustrates a process 2800 for handling a poll action. The process 2800 may be used in performing an action defined by action information of a point of interest referenced above with respect to reference numeral 1612. The operations of the process 2800 are described generally as being performed by the system 200. The operations of the process 2800 may be performed by one of the components of the system 200 (e.g., the server system 210) or may be performed by a combination of the components of the system 200. In some implementations, operations of the process 2800 may be performed by one or more processors included in one or more electronic devices.

The system 200 determines an answer to a poll for a user that corresponds to one of multiple answer input controls selected by the user (2802). For example, the system 200 may receive an indication of one of multiple poll answer input controls selected by the user from a remote control. For instance, the system 200 may receive an indication that a user has selected the input control 2520 of interface 2500 indicating that the user prefers tea at tea time.

The system 200 updates data tracking results of the poll based on the determined answer to the poll for the user (2804). For example, the system 200 may receive poll data from multiple users and may update the poll data with each determined poll answer. Updating the data tracking results for the poll may include incrementing a counter associated with the determined answer to the poll for the user and incrementing a counter associated with the total responses received for the poll. For instance, in response to receiving an indication that a user has selected the input control 2520 of interface 2500, the system 200 may increment a counter associated with the choice of "Tea" as a response to the poll question "Which is your favorite one in tea time?"

The system 200 determines a result of the poll based on the updated data tracking results of the poll (2806). For example, the system 200 may calculate the percentage of total poll responses associated with each of multiple answers to the poll based on the updated tracking results. In addition, the system 200 may compare the calculated percentages and determine a leading answer to the poll.

The system 200 controls output, to the user, of the determined result of the poll (2808). For example, the system 200 may display the poll results in the point of interest interface upon receiving a selection of a poll input control from a user.

Figure 29:
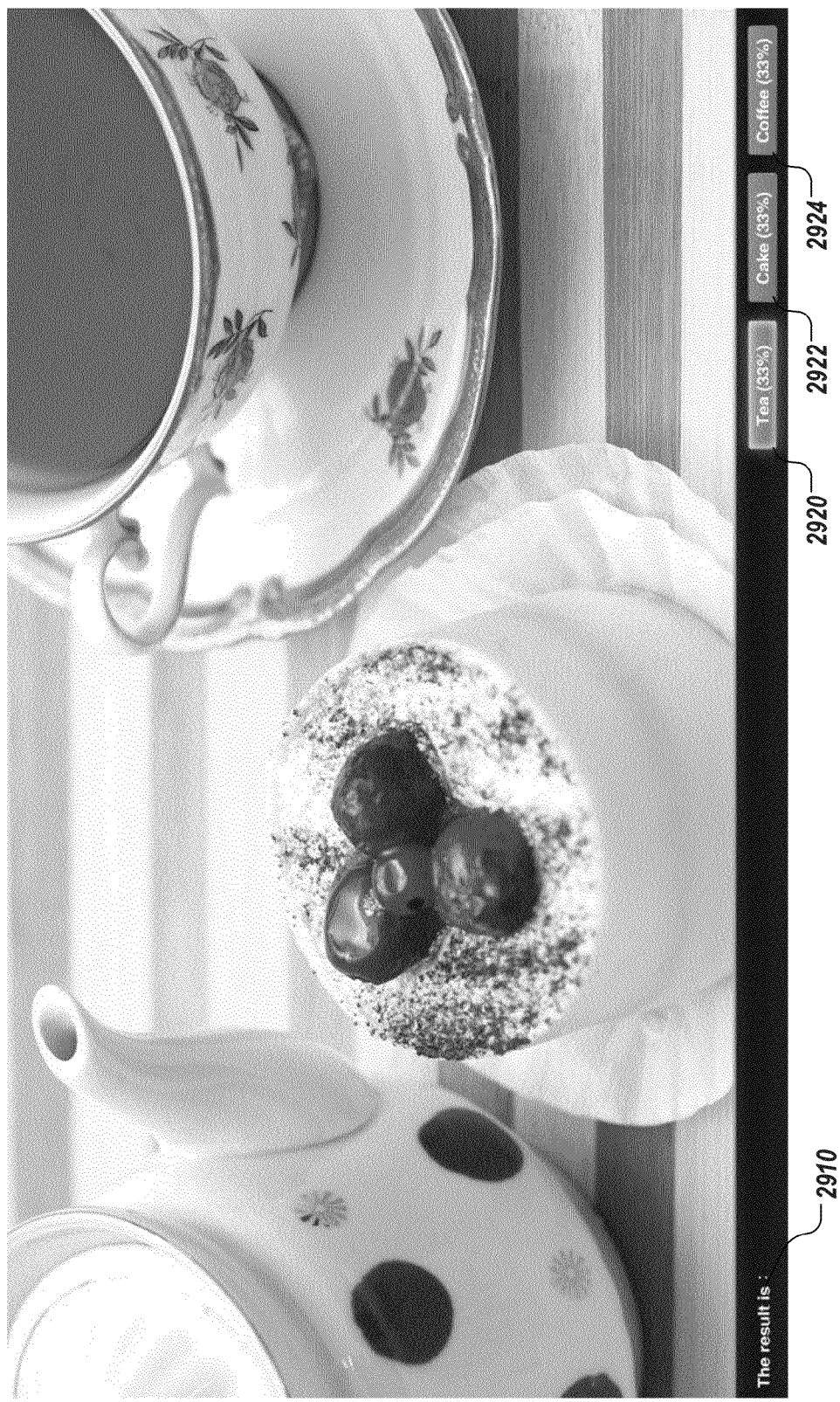

FIG. 29 illustrates an example interface 2900 displaying results of a poll point of interest integrated with content defined by a channel. The interface 2900 represents a display of poll results for the point of interest defined using the interface 2000 and stored in the fourth row of the data structure 2100. As shown, the interface 2900 includes a message 2910 and three input controls 2920, 2922, and 2924. The message 2910 indicates that the interface 2900 shows the poll results at the time of the user's interaction with the poll point of interest. The text displayed in association with the three input controls 2920, 2922, and 2924 corresponds to the text stored in the button text column 2114 and includes the poll results (as a percentage of total responses) associated with each of the three input controls 2920, 2922, and 2924. As shown, the poll is tied at 33% each for "Tea," "Cake," and "Coffee."

In some implementations, the system 200 may use a user's poll response to choose a point of interest to be displayed at a later point during a particular episode being viewed by a user. For example, a curator may define three different link type points of interest to be displayed at a later point of the www.tea143.com episode: one related to tea, another related to cake, and a third related to coffee. Based on a user's selection of "Tea" in response to the poll interest defined in the fourth row of data structure 2100, the system 200 may determine that the curator's link type point of interest related to tea should be displayed at the later point in the www.tea143.com episode.

Figure 30:
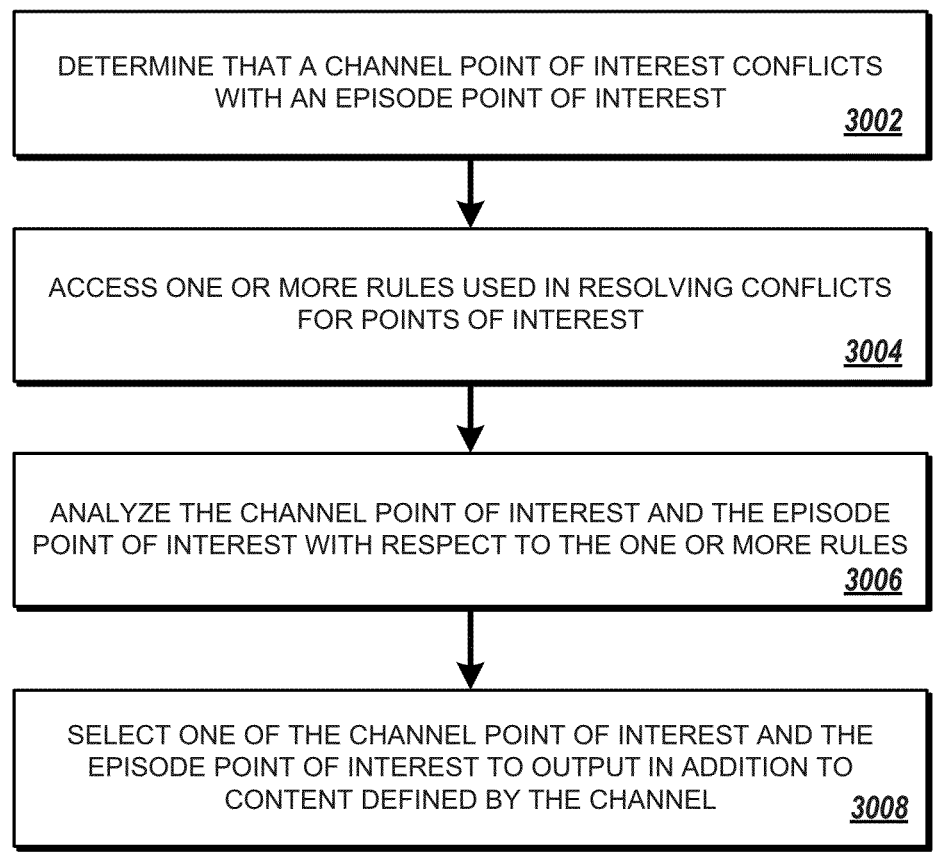

FIG. 30 illustrates a process 3000 for resolving conflicts among points of interest. The operations of the process 3000 are described generally as being performed by the system 200. The operations of the process 3000 may be performed by one of the components of the system 200 (e.g., the server system 210) or may be performed by a combination of the components of the system 200. In some implementations, operations of the process 3000 may be performed by one or more processors included in one or more electronic devices.

The system 200 determines that a channel point of interest conflicts with an episode point of interest (3002). For example, a channel point of interest may conflict with an episode point of interest when the timing information for both a channel point of interest and an episode point of interest conflict. Referring to the points of interest defined in data structure 2100, a user may be viewing episode www.cityep2.com on channel www.my3.com and because the user may have been viewing another episode on channel www.my3.com for 4 minutes and 20 seconds prior to starting the episode www.cityep2.com the timing of the first and second points of interest in data structure 2100 will conflict. The conflict arises because the channel point of interest (i.e., the second point of interest in data structure 2100) is scheduled to be displayed after the user has been viewing channel www.my3.com for 10 minutes which, due to the user's actions prior to beginning episode www.cityep2.com, coincides with the timing of the episode point of interest (i.e. the first point of interest in data structure 2100). To determine whether a channel and an episode point of interest conflict, the system 200 may take into account both the scheduled starting time of each point of interest and the respective duration of each point of interest. By taking into account both the schedule starting time and the duration, the system 200 may effectively create a real-time Gant chart for scheduled points of interest based on a user's interaction with episodes within a channel.

In addition, when determining whether a conflict exists, the system 200 may include a short amount of buffer time into the calculation such that the display of one point of interest may be removed from a user's display for a short duration before displaying a second point of interest. For example, it may be desirable to have at least a ten second gap between consecutive points of interest to ensure a user recognizes the second point of interest.

The system 200 accesses one or more rules used in resolving conflicts for points of interest (3004). Upon determining that a channel point of interest conflicts with an episode point of interest, the system 200 may access one or more rules to resolve the conflict. For example, a rule may include prioritizing channel points of interest over episode points of interest such that the channel point of interest is output to the user but the episode point of interest is not. Another rule may include accessing a ranking of points of interest and selecting the point of interest with the highest ranking. Yet another rule may include prioritizing either the channel or the episode point of interest based on the time of day. Another rule may include prioritizing either the channel or the episode point of interest based on information learned about the user. Yet another rule may include prioritizing the episode point of interest over the channel point of interest. Although several examples of rules have been provided, many other rules for resolving conflicts for points of interest are also possible.

The system 200 analyzes the channel point of interest and the episode point of interest with respect to the one or more rules (3006). For example, the system 200 may apply the rule to the channel and episode points of interest that conflict. In a case in which there are more than one rule, the system 200 may determine which rule should be applied to the conflicting channel and episode points of interest. For example, the rules may be ranked. As another example, the system 200 may determine a ranking for the channel point of interest and a ranking for the episode point of interest based on accessed ranking of points of interest, compare the ranking of the channel point of interest to the ranking of the episode point of interest, and apply a rule based on the compared rankings.

The system 200 selects one of the channel point of interest and the episode point of interest to output in addition to content defined by the channel (3008). For instance, the system 200 selects the appropriate one of the channel point of interest or the episode point of interest to output in addition to content defined by the channel based on the applied rule. For example, if the rule was to prioritize channel points of interest over episode points of interest the system 200 may select the channel point of interest to output in addition to content defined by the channel. In some implementations, the system 200 may place the unselected point of interest in an electronic queue to be output at a later time.

FIG. 31 illustrates example data 3100 that reflects tracking of points of interest and responses to points of interest and statistics generated from the tracking of points of interest and responses to points of interest. The data 3100 may be used by the system 200 to evaluate the performance of different curators, to determine revenue sharing, and/or to determine which curator's content to promote. As shown in FIG. 31, the data 3100 includes a curator column 3102, a channel column 3104, an episode column 3106, a total point of interest column 3108, a channel point of interest column 3110, an episode point of interest column 3112, a total response column 3114, a channel response column 3116, an episode response column 3118, a total percent column 3120, a channel percent column 3122, and an episode percent column 3124. The curator column 3102 identifies a curator associated with the point of interest tracking data in each row of data. In other words, the data in each row represents performance statistics based on points of interest created by each curator listed in the curator column 3102. The channel column 3104 and episode column 3106 indicate the number of channels and episodes managed by each curator listed in column 3102. The total point of interest column 3108, channel point of interest column 3110, and episode point of interest column 3112 indicate the respective total, channel, and episode points of interest created by each curator listed in column 3102 and output to users of the content delivery network. The total response column 3114, channel response column 3116, and episode response column 3118 indicate the number of responses received for the total, channel, and episode points of interest created by each curator listed in column 3102. Finally, the total percent column 3120, channel percent column 3122, and episode percent column 3124 indicate the percentage of total, channel, and episode points of interest that have been output to users and for which the system 200 has received a response. In addition to the data 3100 shown in FIG. 31, the system 200 also may track additional data related to content curators, such as the number of channel subscribers each curator has to their channels.

All or some of the data 3100 may be used in conjunction with the number of channel subscribers to evaluate the performance of different curators, to determine revenue sharing, and/or to determine which curator's content to promote. In addition, the data 3100 may also be displayed or used on a per-channel or per-episode basis to provide even more granular performance data. In some implementations, the system 200 may also provide each curator with data tracking their own points of interest to evaluate their own channels, episodes, or individual points of interest. For example, the system 200 may track the number of responses received to each point of interest created by a curator.

The operations described above with respect to FIGS. 16-31 may be performed on any suitable media device (e.g., a television, a mobile device, a computer, etc.) that is capable of outputting the interfaces described with respect to FIGS. 16-31 and receiving input from a suitable input device (e.g., a remote control device, a touch screen interface, a mouse and keyboard, etc.) in performing the operations described with respect to FIGS. 16-31. For example, points of interest may be displayed on a television and interacted with through commands received from a remote control device operated by a user perceiving the points of interest. In another example, points of interest may be displayed on a mobile device and interacted with through input (e.g., touch events, swiping gestures, etc.) applied to a touch screen interface of the mobile device. In yet another example, points of interest may be displayed on a computer and interacted with through commands received from a mouse and/or keyboard operated by a user perceiving the points of interest.

In some implementations, when an end user first launches a content presentation portal to access content from system 200 three sets of channels are displayed. Each set of channels may contain a fixed number of video channels. For example, each set of channels can contain up to 27 channels stacked together. A set of channels may be a convenient way to organize a number of related video channels in one place. When the content presentation portal is first launched, the first episode of the first channel in the middle set may immediately begin playing. The user may be allowed to navigate to other channels in the highlighted set using up arrow and down arrow input controls provided in the content presentation portal. In addition, the user may be allowed to navigate to another set of channels using left arrow and right arrow input controls provided in the content presentation portal. The content presentation portal may provide a full screen view of a particular episode in the highlighted channel when a user selects any location in a playback area of the content presentation portal. Additionally, the content presentation portal may provide input controls to allow a user to subscribe to new channels. The subscribed channels may be placed a user-defined set of channels. The content presentation portal may also include system operator defined sets of channels and content provider defined sets of channels. An end user may not be allowed to alter attributes of either the operator defined sets of channels and content provider defined sets of channels. For example, an operator (e.g., a business that runs and maintains system 200) may control the video channels and episodes organized in operator defined sets of channels. In this example an operator defined set of channels may include an account support channel the features videos explaining various features of the system 200 and a highlights channel that shows highlights of content from preferred content providers. Similarly, a content provider (e.g., a group of content curators from a television station) may control the video channels and episodes organized in content provider defined sets of channels. For example, a content provider may be XYZ News Corporation and an XYZ News Corporation set of channels may include a local XYZ News channel (e.g., XYZ News Fairfax), a national XYZ News channel, and an XYZ News commentary channel (e.g., MSXYZ News). In this example, based on an agreement between the operator and XYZ News Corporation, the operator of the system 200 may use the XYZ News Corporation set of channels as the preferred content provider set of channels that users cannot alter. In addition, the operator defined sets of channels and content provider defined sets of channels may be sets of channels that are required to be displayed in an end user's content presentation portal at a particular location. In this regard, the operator reserves screen real estate in users' portals and may display sets of channels defined by the operator in the reserved screen real estate and/or sell or lease the reserved screen real estate to content providers and content curators.

Figure 32:
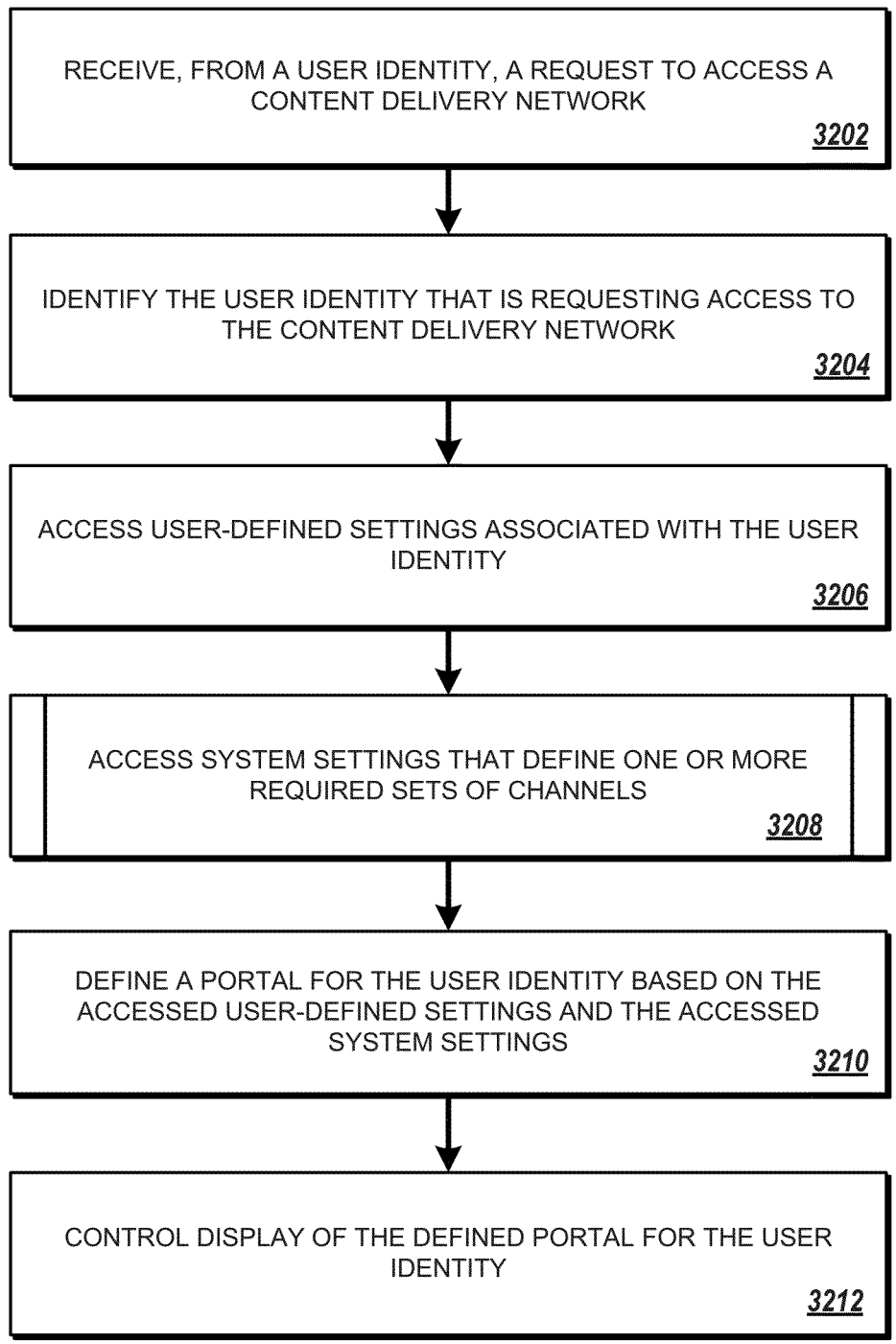

FIG. 32 illustrates a process 3200 for defining a content presentation portal. The operations of the process 3200 are described generally as being performed by the system 200. The operations of the process 3200 may be performed by one of the components of the system 200 (e.g., the server system 210) or may be performed by a combination of the components of the system 200. In some implementations, operations of the process 3200 may be performed by one or more processors included in one or more electronic devices.

The system 200 receives, from a user identity, a request to access a content delivery network (3202). For example, the system 200 may display a user login interface. In some implementations, an access device may be associated with a user identity and, when powered on by the user, the access device requests access to the content delivery network from system 200 and serves as the user identity. A user identity may be a content delivery network user account associated with one or more individual content presentation portal users. Furthermore, a user may be able to access system 200 from multiple access devices using one user identity. For instance, multiple family members may use a single user identity (e.g., user account) to access content from the system 200 using a smart phone, a media player, a laptop computer, an Internet-enabled television, or any other device capable of accessing a content delivery network.

The system 200 identifies the user identity that is requesting access to the content delivery network (3204). For example, the system 200 may identify the user identity that is requesting access to the content delivery network based on user account information, such as a user name, an electronic mail address, or other appropriate user login information. In implementations in which a user account is associated with an access device, the system 200 may identify the user identity that is requesting access to the content delivery network by identification information for the access device (e.g., a serial number or a media access control (MAC) address of the access device). The system 200 may perform authentication of the user identity as a prerequisite to granting access to the content delivery network. For instance, the system 200 may require a password or access token to authenticate the user identity.

The system 200 accesses user-defined settings associated with the user identity (3106). For example, the system 200 uses the user identity to access user-defined settings for the content presentation portal. User-defined settings may include settings related to which additional sets of channels to include in the portal (e.g., in addition to any required sets of channels), an order of the additional sets of channels in the portal, channels to which a user has subscribed, an order of channels within the additional sets of channels, and user-defined names and/or display formats for the additional sets of channels in the portal. The user-defined settings are described in more detail with respect to the user-setting control interfaces described below and shown in FIGS. 33 and 34.

Figure 33:
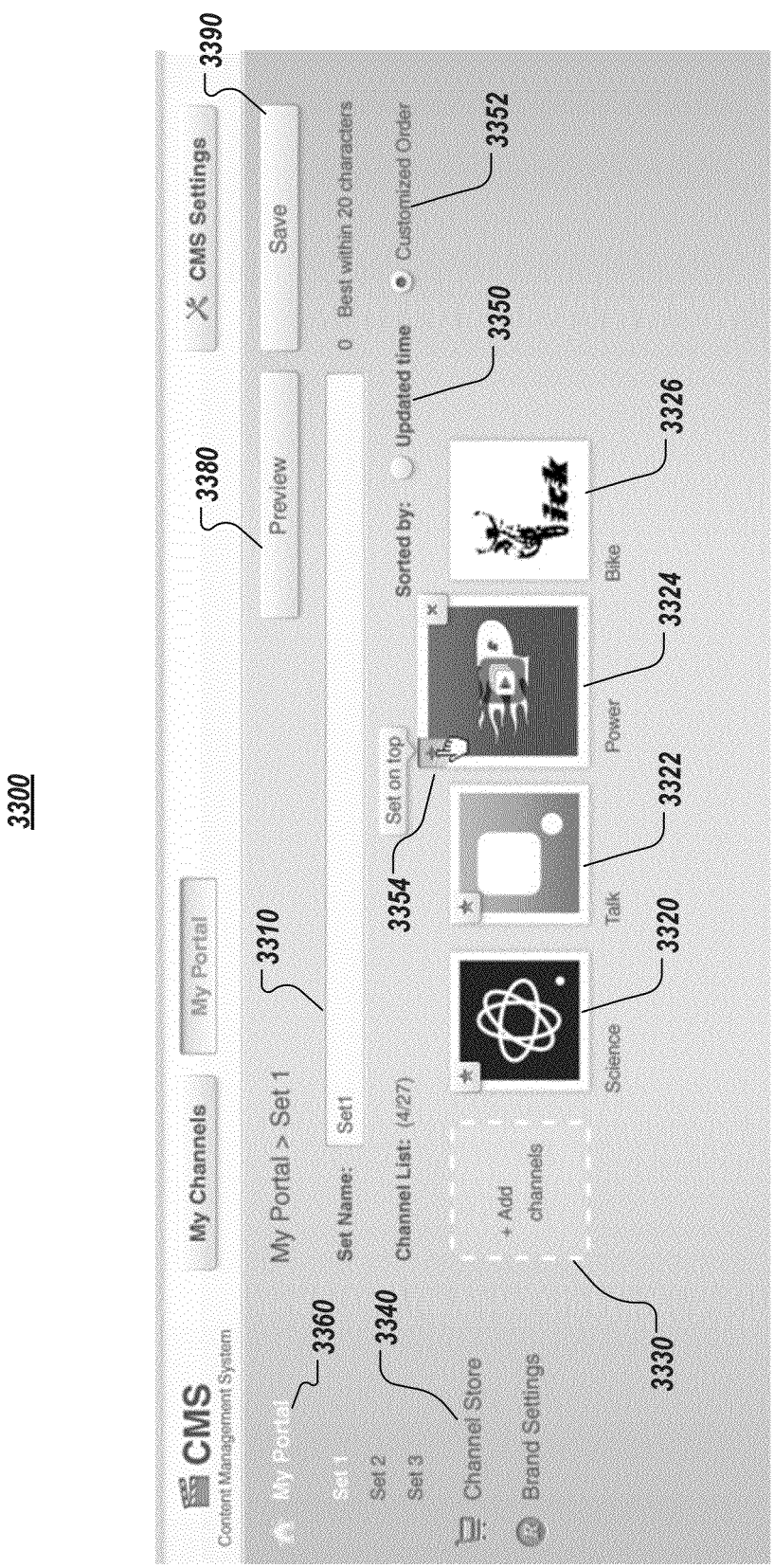
FIGS. 33 and 34 illustrate example interfaces that receive input from a user identity to define user settings for a content presentation portal.

FIG. 33 illustrates an example interface 3300 that receives input from a user identity to define user settings for a content presentation portal. The interface 3300 is an example user interface for defining user settings related to individual sets of channels. As shown in FIG. 33, the interface 3300 includes a set name text box 3310, channel icons 3320, 3322, 3324, and 3326, an add channels icon 3330, a channel store icon 3340, channel sorting input controls 3350, 3352, and 3354, and a portal menu 3360. The set name text box receives a name for a user-defined set of channels.

The channel icons 3320, 3322, 3324, and 3326 show the user the channels that are associated with the displayed set of channels. For example, as shown in FIG. 33 a user has placed Science channel 3320, Talk channel 3322, Power channel 3324, and Bike channel 3326 in channel set 1. The add channel icon 3330 may allow a user to add, to the channel set displayed in interface 3300, channels to which the user has subscribed. The channel sorting input controls 3350, 3352, and 3354 allow a user to define how the channels are arranged within the channel set displayed in interface 3300. A user selection of the updated time channel sorting input control 3350 may cause the channels to be sorted by the time of the most recent update. For example, the channel with the most recently updated episode may be displayed first within channel set 1 in the portal. A user selection of the customized order channel sorting input control 3352 may allow the user to customize the order of the channels within the channel set displayed in interface 3300. For example, the order that the channels are listed in interface 3300 may indicate to the user the order in which the channels are displayed within channel set 1 in the content presentation portal. Interface 3300 may allow a user to change the order that the channels are displayed within channel set 1 by altering the position of channel icons 3320, 3322, 3324, and 3326 in interface 3300, for example, by dragging and dropping one of channel icons 3320, 3322, 3324, and 3326 into a new position. A user selection of the set on top channel sorting input control 3354 in the upper right corner of the channel icons may cause the channel associated with the selected channel icon to be assigned as the first channel to be displayed in the channel set displayed in interface 3300. For example, when the user view's channel set 1 in the portal, the Power channel 3324 may be the first channel displayed within channel set 1.

The channel store icon 3340 may allow a user to access a channel store hosted on the system 200. The channel store may provide a list of channels or sets of channels from various curators and content providers to which the user can subscribe. Content curators or content providers may arrange channels in a set and require users to purchase the entire set of channels, rather than individual channels within the set.

The portal menu 3360 provides a user with a list of channel sets available within the content presentation portal associated with the user's user identity that may be edited by the user using interface 3300. The highlighted set (Set 1) in the portal menu may indicate which set is presently displayed for editing in interface 3300.

The interface 3300 also includes a preview input control 3380 and a save input control 3390. The preview input control 3380 enables a user to preview any changes that the user made to the channel set displayed in interface 3300. The save input control 3390 enables a user to save the user's settings related to the channel set displayed in interface 3300.

Figure 34:
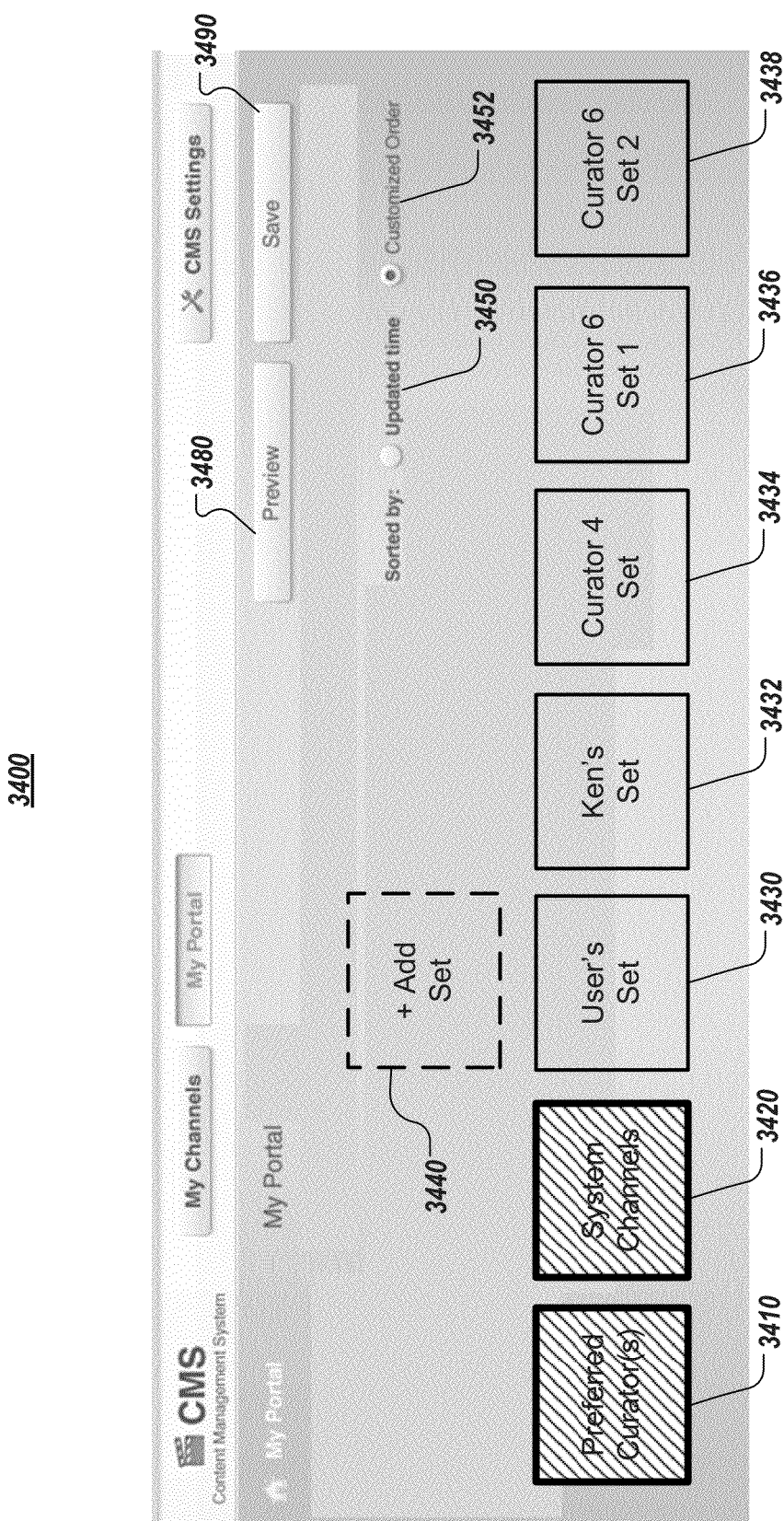

FIG. 34 illustrates an example interface 3400 that receives input from a user identity to define user settings for a content presentation portal. The interface 3400 is an example user interface for defining user settings related to how sets of channels are presented in the content presentation portal. As shown in FIG. 34, the interface 3400 includes a list of the channel set icons 3410, 3420, 3430, 3432, 3434, 3436, and 3438, an add set icon 3340, and channel set sorting input controls 3450 and 3452. The channel set icons 3410, 3420, 3430, 3432, 3434, 3436, and 3438 represent channel sets that are associated with the user's user identity within system 200.

The preferred curator(s) channel set icon 3410 represents one or more content provider channel sets and the system channels channel set icon 3420 represents one or more system operator channel sets. The preferred curator(s) channel set icon 3410 and the system channels channel set icon 3420 may, for example, be shaded, bolded, or highlighted in an appropriate manner to indicate, to a user, that attributes related to those channel sets may not be changed by the user. Thus, the inclusion of the channel sets 3410 and 3420 in the user's portal and the position of the channel sets 3410 and 3420 within the user's portal are locked and cannot be changed by the user.

The next two channel set icons 3430 and 3432 represent user defined channel sets. For example, channel set icons 3430 and 3432 may represent channel sets that the user has defined and which contain channels to which the user has subscribed. The final three channel set icons 3434, 3436, and 3438 represent content provider defined channel sets that, for example, may not be required to be included in the user's portal but to which the user may have voluntarily subscribed. For example, the channel set associated with channel set icon 3434 may have been defined by Curator 4 and would include content (e.g., channels and episodes) as defined by Curator 4.

User defined channel sets associated with channel set icons 3430 and 3432 may contain content (e.g., channels and episodes) as defined by the user or a friend or family member of the user. In addition, the user may be allowed to edit some of the attributes related to the content provider defined channel sets represented by channel set icons 3434, 3436, and 3438, such as the order that the channel sets are presented in the portal, but may not be allowed to alter the content (e.g., channels and episodes) contained within the channel set. In other words, the user's ability to change attributes related to the voluntarily subscribed content provider defined channel sets is less restricted than the user's ability to change attributes related to required content provider defined channel sets, but is more restricted than the user's ability to change attributes related to user-defined channel sets.

The add set icon 3440 may allow a user to add channel sets to the portal (e.g., by subscribing to new content provider defined channel sets or by placing additional subscribed channel sets that were previously removed from the portal). The channel set sorting input controls 3450 and 3452 allow a user to define how the channel sets (other than any required channel sets) are arranged within the portal. A user selection of the updated time channel set sorting input control 3450 may cause the channel sets (other than any required channel sets) to be sorted by the time of the most recent update. For example, the channel set with the most recently updated episode may be displayed first within the portal after the required channel sets. A user selection of the customized order channel set sorting input control 3452 may allow the user to customize the order in which the channel sets (other than any required channel sets) are presented in the portal. For example, the order that the channel sets are listed in interface 3400 may indicate to the user the order in which the channels are presented in the portal after the required channel sets. Interface 3400 also may allow a user to change the order that the channels sets (other than any required channel sets) are presented in the portal by altering the position of channel set icons 3430, 3432, 3434, 3436, and 3438 in interface 3400, for example, by dragging and dropping one of channel set icons 3430, 3432, 3434, 3436, and 3438 into a new position.

The interface 3400 also includes a preview input control 3480 and a save input control 3490. The preview input control 3480 enables a user to preview any changes that the user made to the channel sets displayed in interface 3400. The save input control 3490 enables a user to save the user's settings related to the channel sets displayed in interface 3400.

Returning to FIG. 32, the system 200 accesses system settings that define one or more required sets of channels (3208). For example, the system 200 may access system settings that define one or more required system operator defined sets of channels, one or more content provider defined sets of channels, and attributes related to the required sets of channels. Settings related to attributes of the required sets of channels may include an order for presenting the required sets of channels in the portal, a position for one or more of the required sets of channels to be displayed in the portal, an order of channels within each of the required sets of channels, and/or a name and display format for one or more sets of the required sets of channels. For example, a position of one of the sets of required sets of channels to be displayed in the portal may define specific real estate within the portal display that the required set of channels is to occupy (e.g., a center position on the portal display such that the required set of channels is readily viewable by the user when initially accessing the content delivery network).

The system 200 defines a portal for the user identity based on the accessed user-defined settings and the accessed system settings (3210). For example, the system 200 may integrate both the accessed user-defined settings and the accessed system settings to define a content presentation portal for the user identity. Defining the portal may include using the user-defined and system settings to determine content to be displayed in the user's portal and how the content should be presented to the user in the portal. In other words, based on both the user-defined and system settings, the system 200 may compile appropriate channels into user-defined sets of channels, compile appropriate channels into required sets of channels (both system operator defined and content provider defined), access appropriate content provider defined sets of channels (e.g., non-required content provider defined sets of channels), apply appropriate names to the sets of channels, and present each of the accessed and compiled sets of channels in the portal according to the user-defined and system settings.

The system 200 controls display of the defined portal for the user identity (3212). For example, the system 200 displays the content presentation portal to the user as defined by the user-defined and system settings. In addition, the system 200 receives inputs from the user and allows the user to navigate among the content presented to the user in the portal. A more detailed description of the content presentation portal is provided below in conjunction with FIG. 35.

Figure 35:
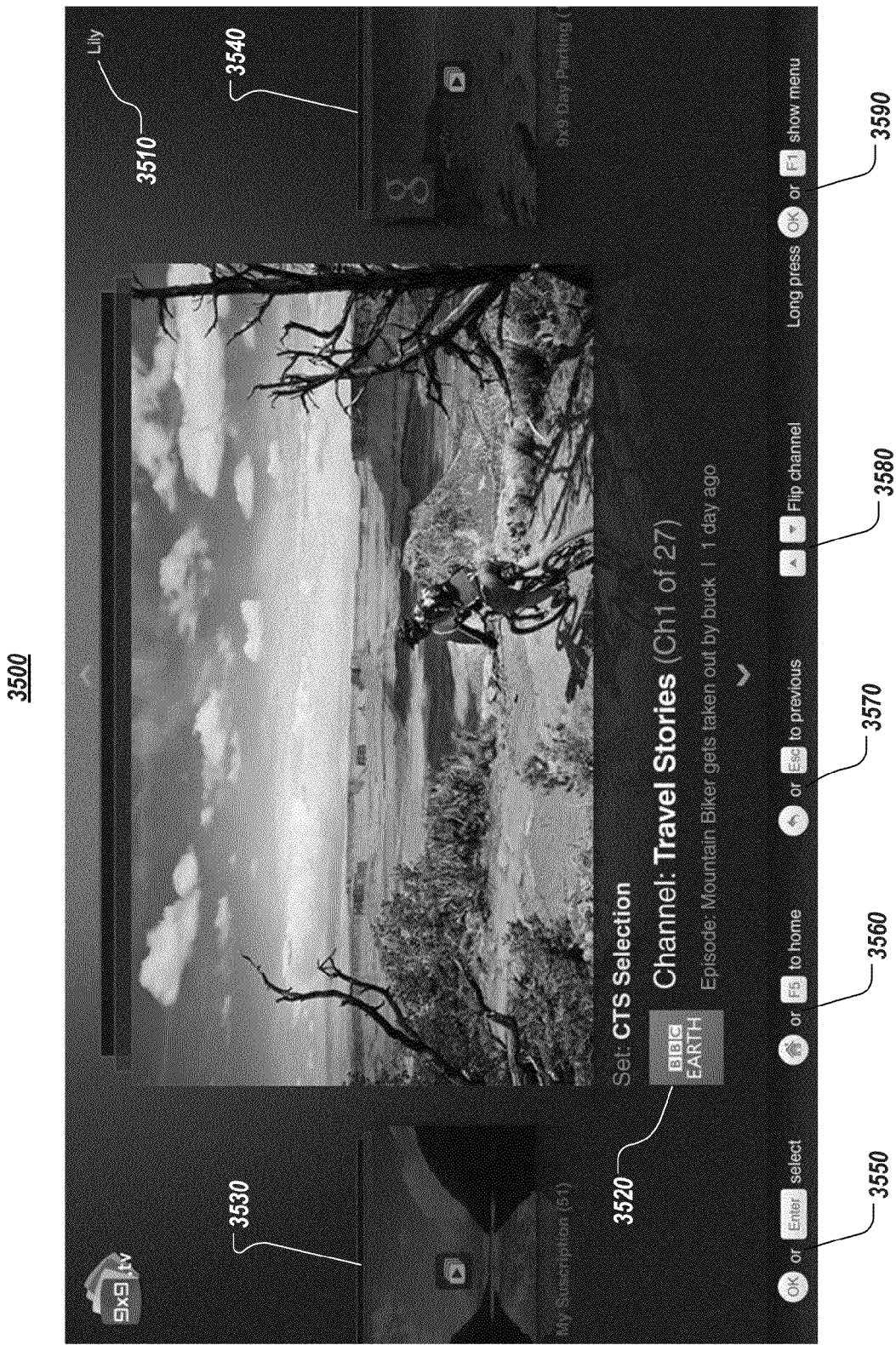
FIG. 35 illustrates an example content presentation portal.

FIG. 35 illustrates an example content presentation portal 3500. As shown in FIG. 35, the content presentation portal 3500 includes a user identity label 3510, a representation of an active set of channels 3520, representations of inactive sets of channels 3530 and 3540, and several input controls 3550, 3560, 3570, 3580, and 3590. The user identity label 3510 indicates the user identity associated with the content presentation portal 3500.

The representations of sets of channels 3520, 3530, and 3540 present the channels within the set of channels in a stacked view. For example, the first channel in each set of channels is displayed such that it appears to lie on top of a stack of other channels within the set. The representation of the active set of channels 3520 includes a playback area in which content from an active channel of the active set of channels is displayed and video associated with an episode on the active channel is streamed for a user to view. The portal may allow a user to view a streaming episode in a full-screen view by selecting any portion of the playback area, for example. Alternatively or in addition, a selectable full-screen icon may be displayed or a designated button on a remote control may be used to transition the streaming episode into and out of a full-screen view. In addition, the representation of the active set of channels 3520 includes descriptive text below the playback area. The descriptive text may include a name of the set of channels (e.g., CTS Selection), a name of the channel of the active set of channel that is presently displayed in the playback area (e.g., Travel Stories), an indication of the number of channels in the active set of channels (e.g., Ch. 1 of 27), and a title of the presently streaming episode from the active channel (e.g., Mountain Biker gets taken out by buck). Additionally, the representation of the active set of channels 3520 includes episode selection arrows above and below the playback area. The episode selection arrows enable a user to cycle through available episodes within the active channel in the active set of channels. In some implementations, the system 200 immediately begins playing the selected episode as the user cycles through the episodes.

In some examples, the system 200 automatically rotates through the episodes in the active channel and the channels in the active set displayed in the representation of the active set of channels 3520. In these examples, after the first episode in the first channel in the active set completes, the system 200 automatically begins displaying video content from the second episode in the first channel in the active set. The system 200 may cycle through all of the episodes in the first channel in the active set and then move to episodes in the second channel in the active set. The system 200 may cycle through all of the channels in the active set in this manner and return to the first episode in the first channel in the active set after all channels in the active set have been played. Alternatively, after all channels in the active set have been played, the system 200 may make the next set in the portal the active set.

Other techniques for automatically rotating through episodes, channels, and sets may be used. For example, rather than playing all episodes from a channel in the active set, the system 200 may select one episode from the channel and then move to the next channel after the episode completes. In this example, the system 200 goes through the channels in the active set more quickly, enabling the user to get a sense of the content in all channels in the active set more quickly. The number of episodes played for each channel may be selected by a content curator (or the user) and the episode(s) to display may be defined by the order of the episodes in the channel, selected by the content curator, or randomly selected. As the system 200 cycles through the channels over and over, the system 200 may, to the extent possible, select a new episode (e.g., an episode that has not been played) each time a channel repeats. In some implementations, the system 200 may randomly select the episode and the channel in the active set to display. In addition, although the description has focused on the playing of the episodes, the system 200 also may display content preview files in the representation of the active set of channels 3520.

The representations of the inactive sets of channels 3530 and 3540 may be positioned on either side of the representation of the active set of channels 3520. The representations of the inactive sets of channels 3520 and 3540 may include features similar to the representation of the active set of channels, but may be shaded and of a smaller size to indicate that the representations of the inactive sets of channels 3530 and 3540 are inactive. In addition, the playback area of the representations of the inactive sets of channels 3530 and 3540 may include a still image of either the first channel or a most recently viewed channel contained within the inactive sets of channels. Also, the descriptive text of the representations of the inactive sets of channels 3530 and 3540 may be abbreviated. In some implementations, the portal 3500 may allow a user to select one of the representations of the inactive sets of channels and, in response, the system 200 may cycle through the available sets of channels by transitioning the selected inactive set of channels into an active set of channels displayed in the representation of the active set of channels 3520. Thus, the user may be able to cycle through all available sets of channels associated with the user's user identity by repeatedly selecting the representation of inactive set of channels 3530. And, by selecting the representation of inactive set of channels 3540, the user may cycle through the available sets of channels in the opposite direction. In some implementations, the system 200 immediately begins playing a first episode in a first channel of the new active set of channels after the user cycles to the new active set of channels. For example, when the user cycles to the XYZ News set of channels, the first episode of the first XYZ News channel will begin playing.

The first set of channels displayed by system 200 when the portal is launched in the representation of the active set of channels 3520 may be a required set of channels, for example. The set of channels in representation of inactive set of channels 3530 may be, for example, a user-defined set of channels and the set of channels displayed in representation of inactive set of channels 3540 may be, for example, a non-required content provider defined set of channels. In some implementations, when the portal is initially launched, the system 200 immediately begins playing the first episode of the active channel in the active set of channels.

The input controls include a select input control 3550, a home input control 3560, a previous input control 3570, a flip channel input control 3580, and a show menu input control. The select input control 3550 may enable a user to select various menu commands, input controls associated with points of interest, or to play and pause content episodes displayed in the representation of the active set of channels. The home input control 3560 may enable a user to return the portal to a home display, for example. The previous input control 3570 may enable a user to return to a previously viewed episode, channel, or set of channels after the user has navigated away from the previously viewed episode, channel, or set of channels. The flip channel input control 3580 may enable a user to cycle through channels within the active set of channels. In some implementations, the system 200 immediately begins playing a first episode in a displayed channel after the user cycles to the channel. For example, when the system 200 receives a user selection of the flip channel input control 3580, the system 200 displays the second channel in the active set of channels and begins playing a first episode in the second channel. The show menu input control 3590 may enable the user to view a menu associated with the portal 3500. For example, a user may access interfaces 3300 and 3400 from a portal menu.

As shown in FIG. 35, the portal may allow the user to trigger the input controls in a variety of ways. For example, the user may be able to trigger the select input control 3550 by 1) clicking with a mouse or touch pad on the input control 3550, 2) by touching the input control 3550 on a touch screen, 3) by pressing an "Enter" button on a keyboard or keypad, or 4) by pushing an "OK" button on a remote control.

In some implementations, required sets of channels and channels within required sets of channels are selected based on attributes of a user identity associated with a content presentation portal. For example, required sets of channels may be selected based on viewing markets, demographics, viewing history, interaction with points of interest, time of day, or seasons.

Figure 36:
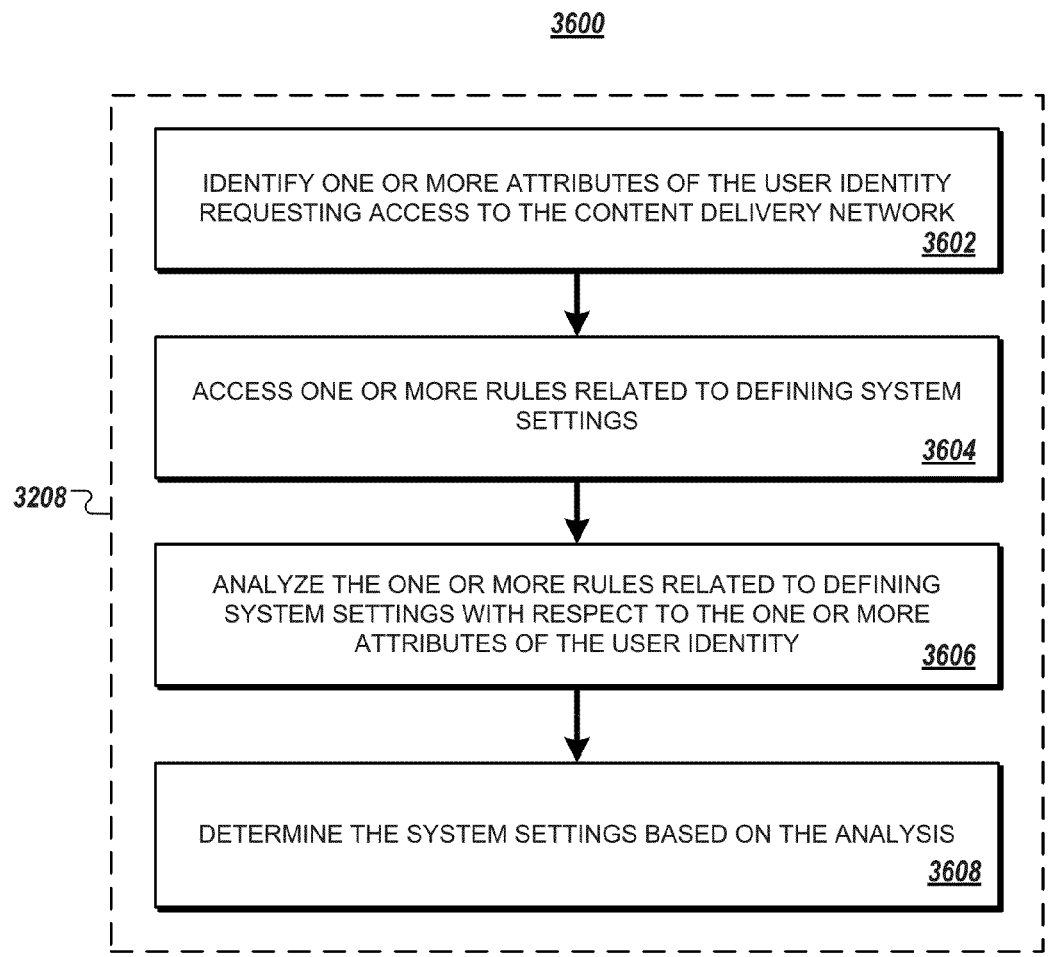

FIG. 36 illustrates a process 3600 for defining a content presentation portal. The operations of the process 3600 are described generally as being performed by the system 200. The operations of the process 3600 may be performed by one of the components of the system 200 (e.g., the server system 210) or may be performed by a combination of the components of the system 200. In some implementations, operations of the process 3600 may be performed by one or more processors included in one or more electronic devices.

The system 200 identifies one or more attributes of the user identity requesting access to the content delivery network (3602). For example, attributes of the user identity may include a viewing market within which a user associated with the user identity is located, demographics of the user identity, a psychographic profile of the user identity, channels to which the user identity is subscribed, a viewing history of the user identity, a history of interaction with points of interest by the user identity, a time of day, or a season of the year.

The system 200 accesses one or more rules related to defining system settings (3604). For example, rules related to defining system settings may include rules defining what channels to include in required sets of channels based on one or more of the user identity attributes, rules defining an order of channels within a required set of channels based on one or more of the user identity attributes, rules defining what sets of channels should be required for the user identity based on one or more of the user identity attributes, and/or rules defining an order of required sets of channels in the portal based on one or more user identity attributes. For instance, a rule may require that a set of channels defined by a preferred content provider (e.g., XYZ News) be a required set of channels and be positioned first in user portals of all user identities in a specific viewing market (e.g., a Washington D.C. viewing market). Rules may be used to comply with agreements with content providers or they may be used to promote well performing content providers. Additionally, rules may be different in different viewing markets and geographical regions, for example. In some implementations, the rules may be prioritized or ranked. The rules may be dynamic and adaptive to changes in content, content providers, or advertisers, for example.

The system 200 analyzes the one or more rules related to defining system settings with respect to the one or more attributes of the user identity (3606). For example, the system 200 analyzes the one or more rules related to defining system settings with respect to the user identity attributes to determine which rules to apply to the user identity attributes. For example, system 200 may analyze the one or more rules to determine which rules apply in the viewing market within which the user identity is located. Different content providers may serve different viewing markets, for instance.

The system 200 determines the system settings based on the analysis (3608). For example, system 200 applies the appropriate rules to the user identity attributes to determine the appropriate channels to include in required sets of channels for the user identity, an order of the channels in the required sets of channels for the user identity, required sets of channels for the user identity, and/or an order for the required sets of channels to be presented in the user identity's portal. For example, the rules may indicate that a viewing market of the user identity (e.g., Washington D.C.) is assigned the XYZ News set of channels and, thus, may determine the XYZ News set of channels as a required set of channels for the user identity. In addition, the system 200 may determine, based on the rules and the user identity's viewing history, that the XYZ News set of channels should be the first set of channels displayed in the user identity's content presentation portal.

The operations described above with respect to FIGS. 32-36 may be performed on any suitable media device (e.g., a television, a mobile device, a computer, etc.) that is capable of outputting the interfaces described with respect to FIGS. 32-36 and receiving input from a suitable input device (e.g., a remote control device, a touch screen interface, a mouse and keyboard, etc.) in performing the operations described with respect to FIGS. 32-36. For example, a portal may be displayed on a television and interacted with through commands received from a remote control device operated by a user perceiving the portal. In this example, the user may navigate through sets of channels within the portal by providing input using the remote control device and then navigate through channels within a selected set of channels by providing input using the remote control device. In another example, a portal may be displayed on a mobile device and interacted with through input (e.g., touch events, swiping gestures, etc.) applied to a touch screen interface of the mobile device. In this example, the user may navigate through sets of channels within the portal by providing swiping gestures (e.g., horizontal swiping gestures in a left or right direction) to the touch screen interface of the mobile device and then navigate through channels within a selected set of channels by providing swiping gestures (e.g., vertical swiping gestures in an up or down direction) to the touch screen interface of the mobile device. In yet another example, a portal may be displayed on a computer and interacted with through commands received from a mouse and/or keyboard operated by a user perceiving the portal. In this example, the user may navigate through sets of channels within the portal by providing input using the mouse and/or keyboard and then navigate through channels within a selected set of channels by providing input using the mouse and/or keyboard.

In some implementations, a content curator or a system operator may compile an index channel consisting of previews or highlights from selected episodes of a single channel or from several channels so as to create a "video index" channel. For example, in some implementations, the index channel provides the user with a short preview of a particular episode and at the end of the preview a point of interest will be presented requesting whether the user would like to watch the full episode. In this example, if the user responds affirmatively to the point of interest, for example, by pressing an appropriate button on his remote control, then the portal will automatically exit the index channel and display the channel containing the full episode. Conversely, if the user does not respond to the point of interest, then a short preview of the next episode in the index channel will be played. The index channel may enable a user to preview and select from various episodes included within a single channel, various channels included within a single set of channels, or various sets of channels available to the user within the content delivery network. In other words, the index channel functions as a directory for episodes, channels, and sets of channels available to the user from within the content delivery network and provides the user with an easy way to quickly browse through content and make a decision to either continue browsing or begin watching a full episode.

The action to take a user from one video to another video may be called "hyper-video." Once a user hyper-videos to an episode from the index channel (e.g., by responding affirmatively to the point of interest that requested whether the user would like to watch the full video), the user can select a "go back" input control (e.g., by pressing a go back button on a remote) at any time and the portal will return to the user's prior location in the index channel before the user hyper-videoed to the episode.

Figure 37:
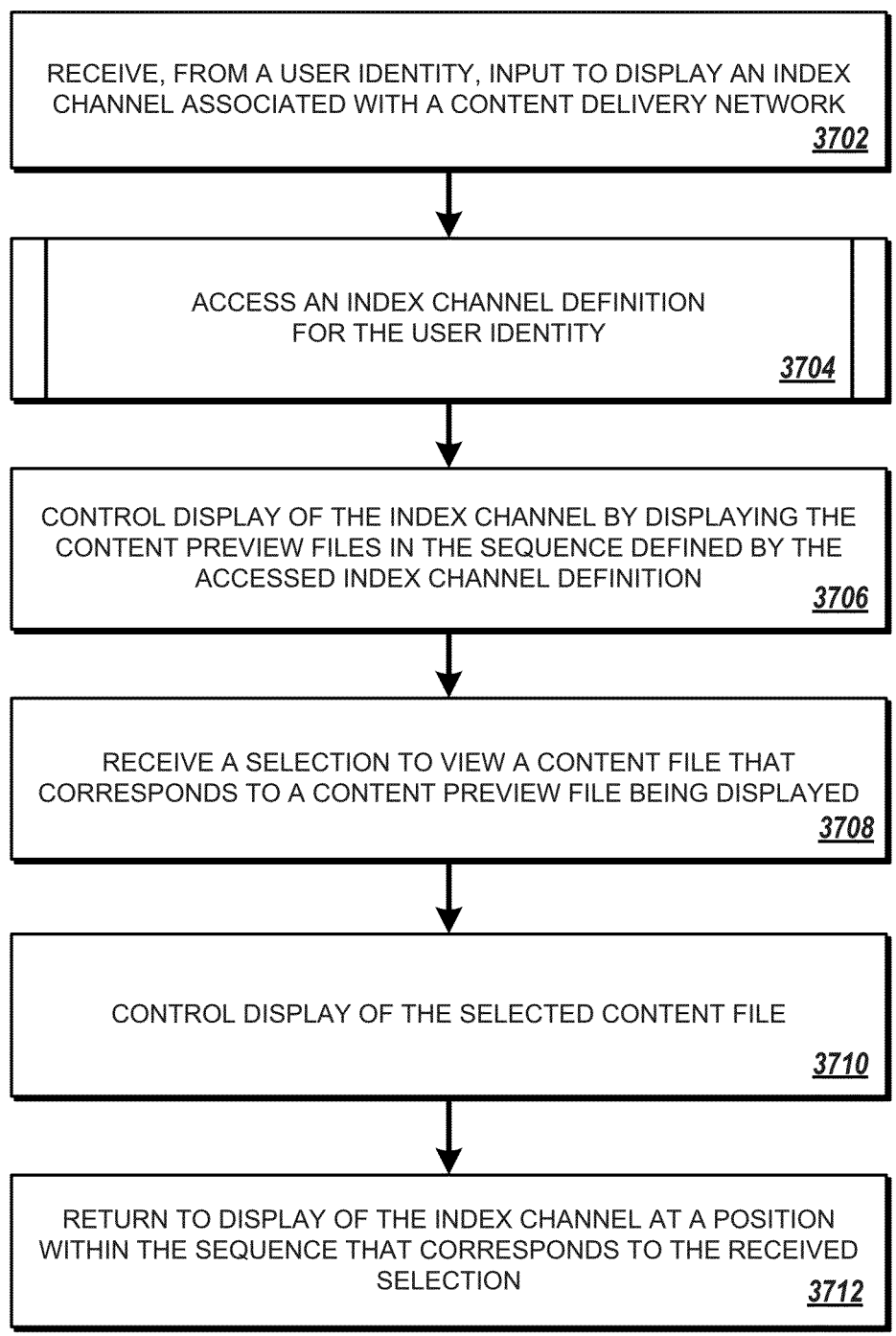

FIG. 37 illustrates a process 3700 for handling index channels and hyper video control. The operations of the process 3700 are described generally as being performed by the system 200. The operations of the process 3700 may be performed by one of the components of the system 200 (e.g., the server system 210) or may be performed by a combination of the components of the system 200. In some implementations, operations of the process 3700 may be performed by one or more processors included in one or more electronic devices.

The system 200 receives, from a user identity, input to display an index channel associated with a content delivery network (3702). For example, system 200 receives an input from a user identity indicating that the user identity would like to view an index channel. An index channel may enable a user associated with the identity to preview content that is available to the user identity within the content delivery network 202. For instance, an index channel may provide the user identity with multiple preview files that are related to content files stored on the content delivery network 202.

In some implementations, multiple different index channels may be available for the user identity to view. In these implementations, the input to display an index channel may be a user selection of a specific index channel. For example, one index channel may provide the user identity with previews of content contained within a specific channel (e.g., previews of episodes contained in a local XYZ News channel), while a second index channel may provide the user identity with previews of content contained within a specific set of channels (e.g., previews of episodes within channels contained in an XYZ News set of channels). In some examples, the index channel definition may be a generic definition that is common to all user identities, while in other examples the index channel definition may be unique to some or each user identity. Additional implementations may include multiple index channel definitions, some index channel definitions that are generic, some index channel definitions that are unique to subsets of user identities (e.g., a subset of users located within a common viewing market), and/or some index channel definitions that are unique to each user identity.

The system 200 accesses an index channel definition for the user identity (3704). For example, an index channel definition may include settings that define the content and various attributes of an index channel. Settings may include a listing of episodes, channels, or sets of channels and associated preview files to be included in the index channel, a viewing sequence for the preview files, and a predefined delay time between playing consecutive previews. Index channels may be defined by an operator of the delivery network, by a content provider or content curator, or by a user. The index channel definition will be described in more detail with respect to FIGS. 38, 39, and 40.

In some implementations, the index channel definition may be a generic definition that is common to all user identities, while in other implementations the index channel definition may be unique to some or each user identity. Additional implementations may include multiple index channel definitions, some index channel definitions that are generic, some index channel definitions that are unique to subsets of user identities (e.g., a subset of users located within a common viewing market), and/or some index channel definitions that are unique to each user identity.

The system 200 controls display of the index channel by displaying the content preview files in the sequence defined by the accessed index channel definition (3706), and the system 200 receives a selection to view a content file that corresponds to a content preview file being displayed (3708). For example, the system 200 displays the selected index channel in the user identity's content presentation portal. In this example, the system 200 may initially start playing a first content preview file in the sequence of preview files defined by the accessed index channel definition. The system 200 also may receive input from a user while a preview file is playing enabling the user to view a content file that corresponds to the playing preview file. For instance, while a user is viewing a preview file for an episode of Dateline XYZ News, the user may press a button (e.g., an "OK" or "Select" button) on a remote control to view the full episode. Conversely, if a playing preview file ends without the system 200 receiving a user input to view a full episode associated with the preview file, the system 200 may continue to monitor for a user input for a predetermined period of time before identifying and playing a next preview file in the sequence of preview files defined in the index channel definition. In some implementations, the system 200 may present an interface element (e.g., a link point of interest to the full episode) prompting the user to provide an input to watch the full episode associated with the ended preview file. The system 200 may continue playing preview files in the sequence defined by the index channel definition in the described manner until the system 200 receives an input indicating that the user would like to view a full episode. Details regarding the display format for presenting the index channel to the user are described with respect to FIGS. 41-46 below.

The system 200 controls display of the selected content file (3710). Upon receiving a selection to view a content file that corresponds to a playing preview file, the system accesses the associated content file (e.g., an episode) and immediately begins playing the content file from the beginning. For example, after a user selects to view the episode associated with a preview that the user was watching, the system 200 may immediately display the episode in a full screen view and begin playing the episode. Alternatively, for example, after the user selects to view the episode, the system 200 may display content presentation portal 3500 and begin playing the selected episode in the representation of the active channel set 3520.

The system 200 returns to display of the index channel at a position within the sequence that corresponds to the received selection (3712). For example, the system 200 returns to a display of the index channel at the same position within the sequence of preview files that the user was viewing when the user selected to view a content file associated with the preview file. Therefore, the user may continue viewing the index channel where the user left off without the need to navigate back to the same position. In some implementations, position within the sequence of preview files to which system 200 returns in the index channel is the next preview file in the sequence after the preview file which the user selected. For example, if the sequence of preview files included preview file A followed by preview file B and then by preview file C, and a user selected to watch the content file associated with preview file A, the system 200, when returning to display of the index channel, will begin playing preview file B. Some implementations may incorporate viewing history information about the user's user identity when determining a position in the preview file sequence to which to return. For example, in such implementations, the user's viewing history information may indicate that the user has previously viewed the content file associated with preview file B. In this example, when the system 200 returns to display the index channel after having received the user's selection to view the content file associated with preview file A, the system 200 may skip preview file B based on the user's viewing history information and instead begin playing preview file C.

In addition, there are several methods by which the system 200 may return to displaying the index channel from playing a content file (e.g., an episode). In some implementations, the system 200 may receive a user input to return to the system index channel at any time while playing a content file. In some examples, when the user selected content file is finished playing the system 200 may automatically return to the index channel at the position within the sequence that corresponds to the received selection. In additional implementations, when the user selected content file is finished playing the system 200 may identify a next content file organized in the same channel as that of the selected content file and begin playing the second content file. In these implementations, the system 200 may continue playing content files from the selected file's channel until a user input is received to return to the index channel.

In order to return to the position within the sequence that corresponds to the received selection, the system 200 may store an indication of the position within the sequence of preview files at a time that the system 200 receives the user's selection to view a content file. For example, the system may store an indication of the position (e.g., a pointer) within the sequence of preview files in an electronic storage location (e.g., RAM). In this example, the system 200 then may access the stored indication of the position when the system 200 returns to the index channel to begin playing the index channel at the position within the sequence that corresponds to the received selection. In some implementations, the system 200 may encapsulate the position in a location address of the selected content file. In these implementations, the system 200 may identify the position encapsulated in the location address of the content file when the system 200 returns to the index channel to begin playing the index channel at the position within the sequence that corresponds to the received selection.

In some implementations, index channels and episodes may be nested. In these implementations, a user may transition from a first index channel to a second index channel that is different than the first index channel and nested within the first index channel. From the second index channel, the user may then transition to an episode or another index channel nested within the second index channel. When the user transitions to an episode within the second index channel, the user may return from the episode to the second index channel at a position corresponding to the selection of the episode and then transition back to the first index channel at a position corresponding to the selection of the second index channel. Any number of nesting relationships may be used in index channels and episodes within the content delivery network and users may traverse through the nesting relationships using the techniques described throughout this disclosure.

Figure 38:
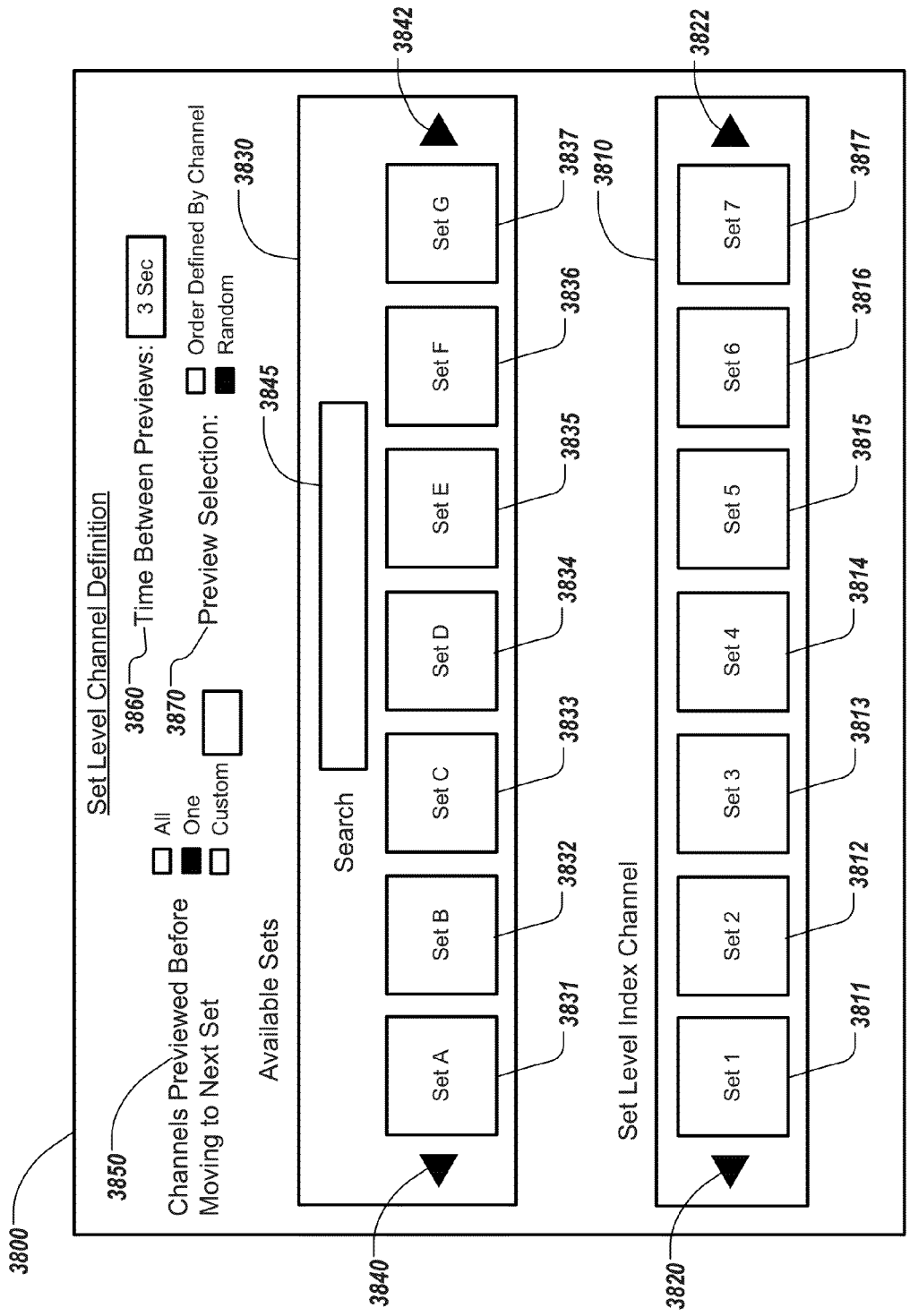
FIGS. 38 and 39 illustrate example interfaces that receive input to define an index channel.
Figure 39:
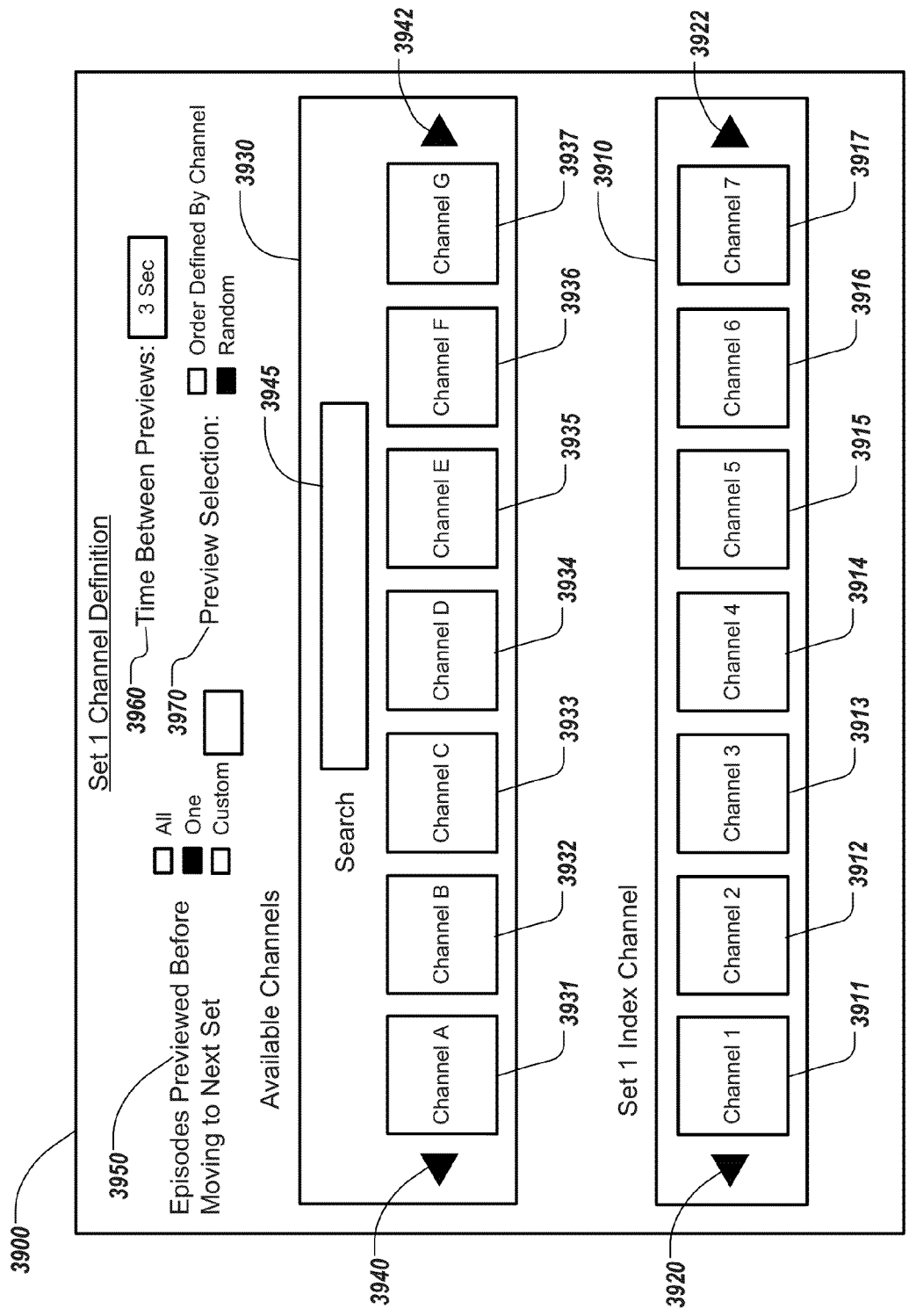

FIGS. 38 and 39 illustrate example interfaces 3800 and 3900 for defining index channels. Interfaces such as the examples shown may be used by content delivery system operators (e.g., a business that runs and maintains system 200) or content providers (e.g., a group of content curators from a television station) to create index channel definitions for use by end users. For example, a content delivery system operator may define generic index channels for use by all users of the system 200. Similarly, a content provider may define one or more index channels enabling a user to navigate through and preview channels and/or sets of channels created by the provider's content curators. In some implementations, end users also may be able to define their own index channels.

Referring to FIG. 38, interface 3800 illustrates an example interface for defining an index channel for sets of channels (e.g., a set level index channel). Interface 3800 includes a set level index channel viewing pane 3810 and an available sets viewing pane 3830. The set level index channel viewing pane 3810 displays icons representing the sets of channels that have been added to the set level index channel. For example, a Set 1 icon 3811, a Set 2 icon 3812, a Set 3 icon 3813, a Set 4 icon 3814, a Set 5 icon 3815, a Set 6 icon 3816, and a Set 7 icon 3817 have each been added to the set level index channel. The set level viewing pane 3810 also includes viewing pane scroll inputs 3820 and 3822 that enable a user to scroll through the channel set icons representing channel sets included in the set level index channel. For example, the set level index channel may include more channel set icons than can be displayed within the set level index channel viewing pane 3810. In this example, the scroll inputs 3820 and 3822 allow a user to scroll in either direction through all of the channel set icons that have been added to the set level index channel. In some implementations, the order in which the channel set icons are displayed within the set level index channel viewing pane 3810 defines a sequence in which preview files from the included channel sets should be played in the set level index channel. In such implementations, the user may alter the sequence by dragging and dropping channel set icons from one position in the set level index channel viewing pane 3810 to a new position within the set level index channel viewing pane 3810. For example, if a user wants preview files associated with Set 3 to play first, the user may drag the Set 3 icon 3813 from its current position to a new position to the left of the Set 1 icon 3811.

The available sets viewing pane 3830 displays all of the channel sets that are available for the user to add to the set level index channel. For example, the available channel viewing pane 3830 includes a Set A icon 3831, a Set B icon 3832, a Set C icon 3833, a Set D icon 3834, a Set E icon 3835, a Set F icon 3836, and a Set G icon 3837. As with the set level index channel viewing pane 3810, all of the channel sets available to the user may not be displayed within the available channel viewing pane 3830, so the available sets viewing pane 3830 also may include viewing pane scroll inputs 3840 and 3842 to allow a user to scroll through all of the available channel sets. In addition, the available sets viewing pane 3830 includes a search input box 3845. The search input box may enable a user to enter a textual search query for a specific channel set and upon receiving the textual search query the channel sets displayed in the available sets viewing pane 3830 may be filtered to show only those channel sets that match the textual search query.

Channel sets may be added to the set level index channel by dragging and dropping a set icon from the available sets viewing pane 3830 to the set level index channel viewing pane 3810. Likewise, channel sets may be removed from the set level index channel by dragging and dropping a set icon from the set level index channel viewing pane 3810 to the available sets viewing pane 3830.

In addition, the interface 3800 includes several index channel setting inputs 3850, 3860, and 3870. The channels previewed before moving to next set setting input 3850 enables a user to define the number preview files from each set of channels to be played. As shown, the setting input 3850 enables a user to select from three options: playing all of the preview files associated with each channel set, playing one preview file associated with each channel set, or a custom option in which the user may define the number of preview files to play from each channel set. After the defined number of preview files have been played, the index channel will begin playing one or more preview files from the next channel set in the sequence of channel sets as defined in the set level index channel preview pane 3810.

The time between previews setting input 3860 enables a user to define the length of time that the system 200 will monitor for a user selection of content associated with a preview file after the preview file has finished playing and before beginning to play the next preview file in the sequence of preview files for the index channel. For example, as shown, a user has entered a three second monitoring period in the setting input 3860. In this example, when a preview file finishes playing in the index channel the system 200 will monitor for a user input for three seconds before playing the next preview file in the defined sequence.

The preview selection setting input 3870 enables a user to choose an order in which multiple preview files from each channel set should be played. As shown, the setting input 3870 provides a user the options of playing preview files from each set of channels in an order defined by the channel or a random order. For example, an order defined by channel may indicate that preview files associated with channels within each set of channels should be played in the order in which the channels in the set of channels are ordered until the proper number of preview files (as indicated by the setting input 3850) have been played. Conversely, a random order may indicate that the system 200 will randomly choose preview files that are associated with a set of channels to be played until the proper number of preview files (as indicated by the setting input 3850) have been played.

Referring to FIG. 39, interface 3900 illustrates an example interface for defining an index channel for channels (e.g., a channel level index channel of channels in Set 1). Interface 3900 includes a Set 1 index channel viewing pane 3910 and an available channels viewing pane 3930. The Set 1 index channel viewing pane 3910 displays icons representing the channels that have been added to the Set 1 index channel from among all the channels available in channel Set 1. For example, a Channel 1 icon 3911, a Channel 2 icon 3912, a Channel 3 icon 3913, a Channel 4 icon 3914, a Channel 5 icon 3915, a Channel 6 icon 3916, and a Channel 7 icon 3917 have each been added to the Set 1 index channel. The Set 1 index channel viewing pane 3910 also includes viewing pane scroll inputs 3920 and 3922 that enable a user to scroll through the channel icons representing channels included in the Set 1 index channel. For example, the Set 1 index channel may include more channel icons than can be displayed within the Set 1 index channel viewing pane 3910. In this example, the scroll inputs 3920 and 3922 allow a user to scroll in either direction through all of the channel icons that have been added to the set level index channel. In some implementations, the order in which the channel icons are displayed within the Set 1 index channel viewing pane 3910 defines a sequence in which preview files from the included channels should be played in the Set 1 index channel. In such implementations, the user may alter the sequence by dragging and dropping channel icons from one position in the Set 1 index channel viewing pane 3910 to a new position within the Set 1 index channel viewing pane 3910. For example, if a user wants preview files associated with Channel 3 to play first, the user may drag the Channel 3 icon 3913 from its current position to a new position to the left of the Channel 1 icon 3911.

The available channels viewing pane 3930 displays all of the channels that are available in Set 1. For example, the available channels viewing pane 3930 includes a Channel A icon 3931, a Channel B icon 3932, a Channel C icon 3933, a Channel D icon 3934, a Channel E icon 3935, a Channel F icon 3936, and a Channel G icon 3937. As with the Set 1 index channel viewing pane 3910, all of the channels available in Set 1 may not be displayed within the available channels viewing pane 3930, so the available channels viewing pane 3930 also may include viewing pane scroll inputs 3940 and 3942 to allow a user to scroll through all of the available channels. In addition, the available channels viewing pane 3930 includes a search input box 3945. The search input box may enable a user to enter a textual search query for a specific channel and upon receiving the textual search query the channel icons displayed in the available channels viewing pane 3930 may be filtered to show only those channel icons that match the textual search query.

Channels may be added to the Set 1 index channel by dragging and dropping a channel icon from the available channels viewing pane 3930 to the Set 1 index channel viewing pane 3910. Likewise, channels may be removed from the Set 1 index channel by dragging and dropping a channel icon from the Set 1 index channel viewing pane 3910 to the available channels viewing pane 3930.

In addition, the interface 3900 includes several index channel setting inputs 3950, 3960, and 3970. The episodes previewed before moving to next set setting input 3950 enables a user to define the number preview files from each channel to be played. As shown, the setting input 3950 enables a user to select from three options: playing all of the preview files associated with each channel, playing one preview file associated with each channel, or a custom option in which the user may define the number of preview files to play from each channel. After the defined number of preview files have been played, the Set 1 index channel will begin playing one or more preview files from the next channel in the sequence of channels as defined in the Set 1 index channel preview pane 3910.

The time between previews setting input 3960 enables a user to define the length of time that the system 200 will monitor for a user selection of content associated with a preview file after the preview file has finished playing and before beginning to play the next preview file in the sequence of preview files for the Set 1 index channel. For example, as shown, a user has entered a three second monitoring period in the setting input 3960. In this example, when a preview file finishes playing in the Set 1 index channel the system 200 will monitor for a user input for three seconds before playing the next preview file in the defined sequence.

The preview selection setting input 3970 enables a user to choose an order in which multiple preview files from each channel set should be played. As shown, the setting input 3970 provides a user the options of playing preview files from each channel in an order defined by the channel or a random order. For example, an order defined by the channel may indicate that preview files associated with episodes within each channel should be played in the order in which the episodes in the channel are ordered until the proper number of preview files (as indicated by the setting input 3950) have been played. Conversely, a random order may indicate that the system 200 will randomly choose preview files that are associated with a channel to be played until the proper number of preview files (as indicated by the setting input 3950) have been played.

In some implementations, index channel definitions are determined for a user identity based on attributes of the user identity. For example, index channel definitions may be determined based on channel set/channel subscriptions, viewing history, viewing markets, demographics, interaction with points of interest, time of day, or seasons.

Figure 40:
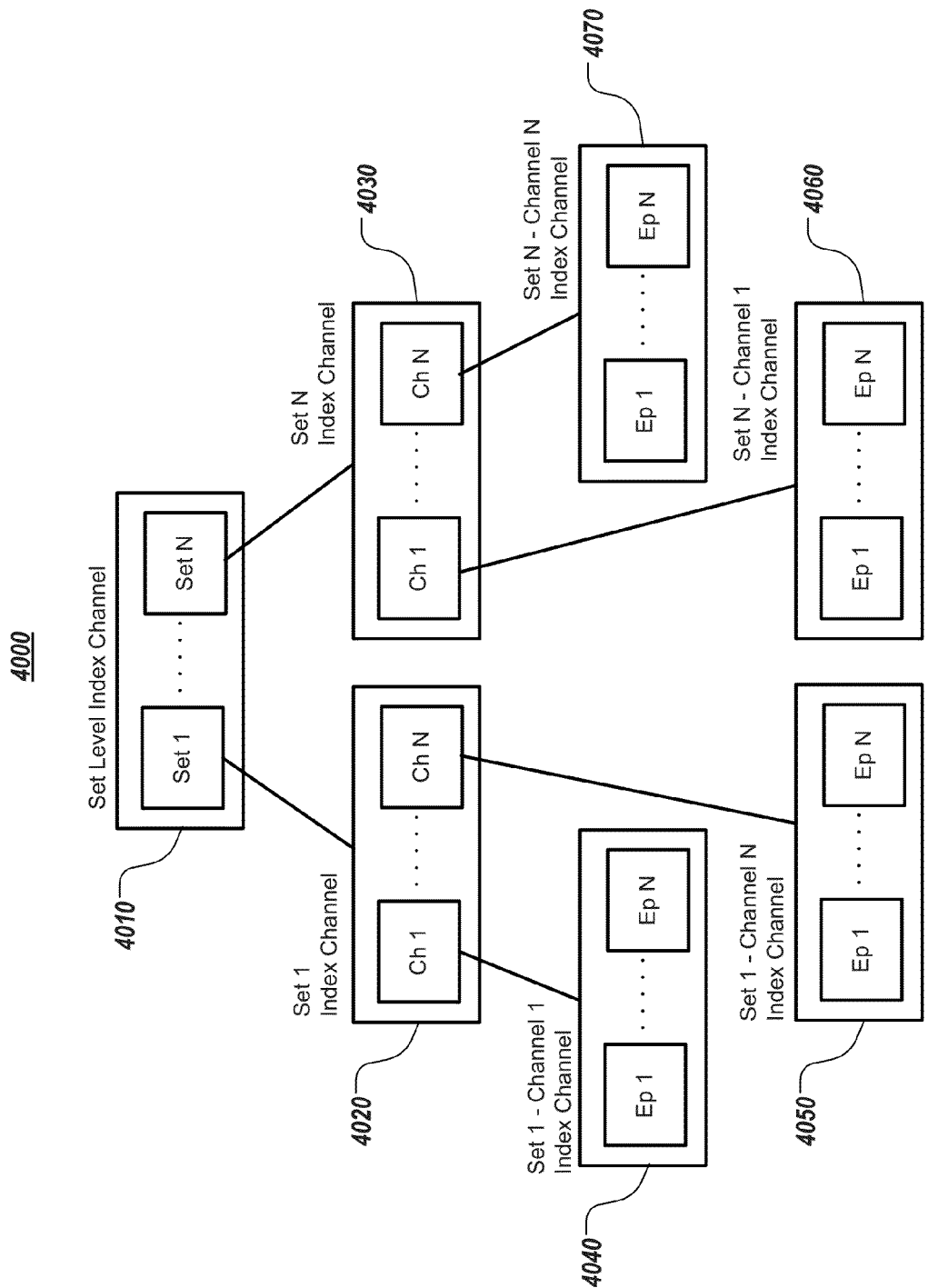
FIG. 40 illustrates an example index channel hierarchy.

FIG. 40 illustrates an example hierarchy 4000 of index channels. As shown in FIG. 40, index channels may be defined and stored in a hierarchy that reflects relationships among the various index channels used by the system 200. The relationships between index channels may be specified by different levels of index channels. For instance, set level index channels may be a highest level of index channels in which the entries in the set level index channels are sets of channels. Episode level index channels may be a lowest level of index channels in which the entries in the episode level index channels are episodes. Channel level index channels may be between the set level index channels and the episode level index channels and the entries in the channel level index channels are channels. Users may navigate the hierarchy of index channels starting with a set level index channel that includes a list of sets, moving to a channel level index channel that includes a list of channels within a set, and, finally, moving to an episode level index channel that includes a list of episodes within a channel.

As shown in FIG. 40, the hierarchy 4000 includes a set level index channel 4010 that includes sets from a first set to an nth set. The first set in the set level index channel 4010 is related to a first set index channel 4020 that includes channels organized within the first set and the nth set in the set level index channel 4010 is related to an nth set index channel 4030 that includes channels organized within the nth set. The first set index channel 4020 includes channels from a first channel in the first set to an nth channel in the first set and the nth set index channel 4030 includes channels from a first channel in the nth set to an nth channel in the nth set.

The first channel in the first set index channel 4020 is related to a first channel from first set index channel 4040 that includes episodes organized within the first channel in the first set and the nth channel in the first set index channel 4020 is related to an nth channel from first set index channel 4050 that includes episodes organized within the nth channel in the first set. The first channel from first set index channel 4040 includes episodes from a first episode in the first channel from the first set to an nth episode in the first channel from the first set and the nth channel from first set index channel 4050 includes episodes from a first episode in the nth channel from the first set to an nth episode in the nth channel from the first set.

The first channel in the nth set index channel 4030 is related to a first channel from nth set index channel 4060 that includes episodes organized within the first channel in the nth set and the nth channel in the nth set index channel 4030 is related to an nth channel from nth set index channel 4070 that includes episodes organized within the nth channel in the nth set. The first channel from nth set index channel 4060 includes episodes from a first episode in the first channel from the nth set to an nth episode in the first channel from the nth set and the nth channel from nth set index channel 4070 includes episodes from a first episode in the nth channel from the nth set to an nth episode in the nth channel from the nth set.

The index channel 4010 has a parent relationship to the index channels 4020 and 4030 and a grandparent relationship to the index channels 4040, 4050, 4060, and 4070. The index channels 4020 and 4030 have a child relationship to the index channel 4010 and a parent relationship to the index channels 4040, 4050, 4060, and 4070. The index channels 4040, 4050, 4060, and 4070 have a child relationship to the index channels 4020 and 4030 and a grandchild relationship to the index channel 4010.

Figure 41:
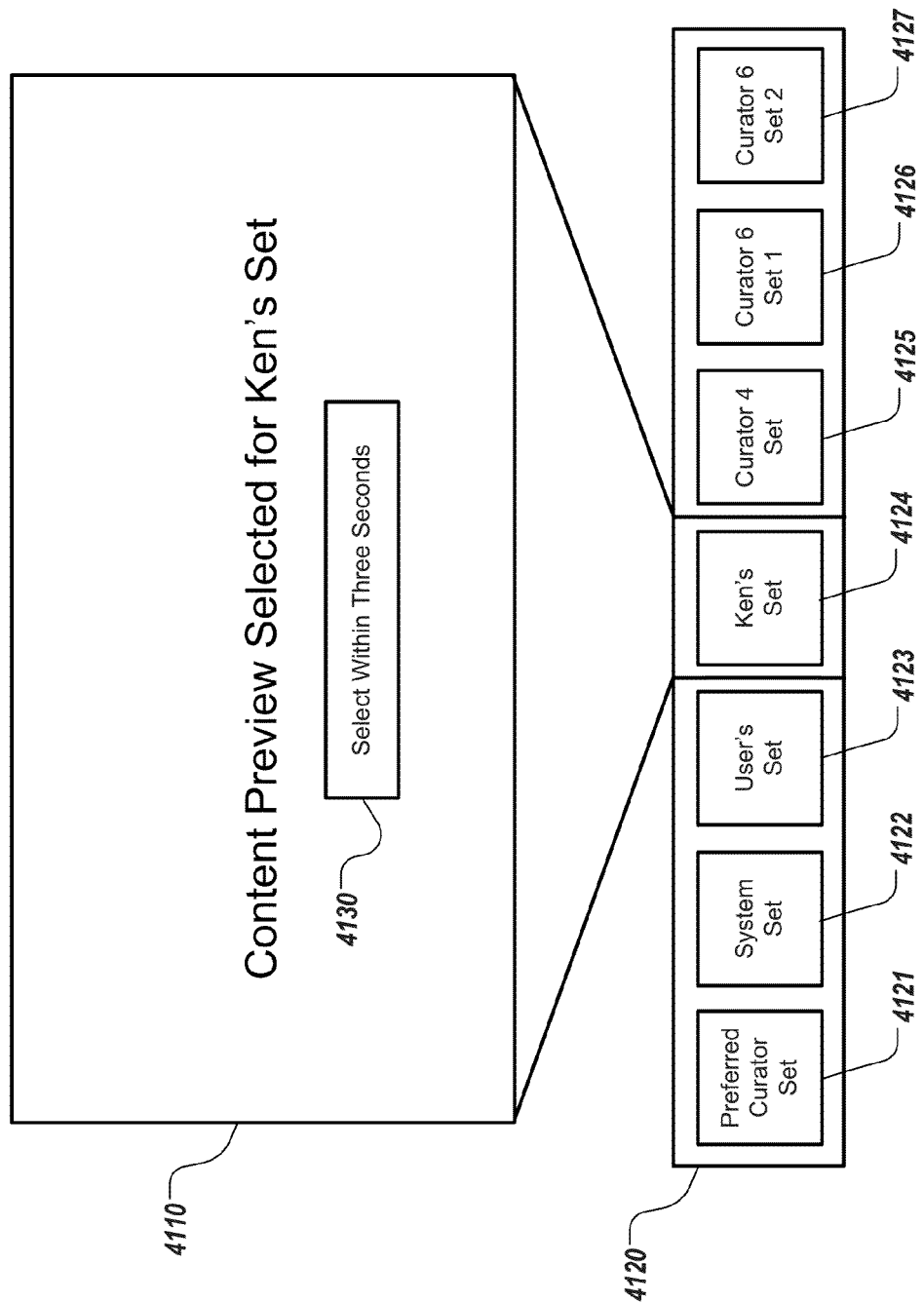
FIGS. 41-46 illustrate example displays of index channels.

FIG. 41 illustrates an example display of an index channel. The display of the index channel may be presented on any suitable display device, such as a television, a computer display, a tablet computer, or a smartphone, and may be driven by a media player connected to the content delivery network. In the example shown in FIG. 41, the display of the index channel includes a display area 4110 that displays a content preview file and a set index channel representation 4120. The display area 4110 displays content (e.g., a video) of a content preview file from one of the sets shown in the set index channel representation 4120. A user may provide input selecting the display area 4110 to cause a full screen view of the episode associated with the displayed content preview file to be displayed.

The set index channel representation 4120 illustrates the sets of channels arranged in the set index channel representation 4120. In this example, the set index channel representation 4120 includes the sets of channels illustrated in FIG. 34 such that the set index channel representation 4120 includes all of the sets of channels included in the portal of the user identity. As shown, the set index channel representation 4120 includes a preferred curator set 4121, a system set 4122, a user's set 4123, Ken's set 4124, Curator 4 set 4125, Curator 6 set 1 4126, and Curator 6 set 2 4127. The double lines in the center of the set index channel representation 4120 indicate the set that corresponds to the content preview file being displayed in the display area 4110. In the example shown in FIG. 41, a content preview file selected from Ken's set 4124 has just completed playing in the display area 4110.

In some implementations, a user may be able to provide input to move the sets in the set index channel representation 4120 to cause a different set to be positioned within the double lines and, as a consequence, change the position within the set index channel and cause a content preview file from a different set of channels to be displayed. In these implementations, the sets in the set index channel representation 4120 may be moved using left or right arrow inputs or through a click or touch and drag operation.

In addition, a user may provide input selecting one of the sets in the set index channel representation 4120. Selection of a set represented in the set index channel representation 4120 may cause display of an index channel for the selected set. In this regard, selection of a set represented in the set index channel representation 4120 may result in traversing to a lower level in the hierarchy of index channels shown in FIG. 40. For instance, selection of a set represented in the set index channel representation 4120 may result in the display of the index channel shown in FIG. 41 being replaced with the display of the index channel shown in FIGS. 43 and 44, discussed below.

In some examples, the set index channel representation 4120 automatically rotates to the next set in the set index channel as each content preview file completes and the user does not provide input to view the episode associated with the content preview file. In these examples, when a content preview file completes, the system 200 may display a message 4130 indicating that the content preview file will be switched to a new content preview file to the extent the user does not provide input selecting to view the episode corresponding to the content preview file within a threshold period of time. As shown in FIG. 41, the system 200 has detected completion of the content preview file selected from Ken's set 4124, displays the message 4130 to indicate that the user has three seconds to select the content preview file selected from Ken's set 4124, waits for three seconds for the user to provide input selecting the content preview file, and then moves to a content preview file from the next set within the set index channel based on a determination that input selecting the content preview file has not been received by the expiration of the three seconds. Providing the message 4130 and waiting a short period of time may be helpful to alert the user that the content preview file has ended and the system 200 is transitioning to the next set in the set index channel. The period of time that the system 200 waits prior to transitioning to the next set may be defined by a content curator and/or the user.

Figure 42:
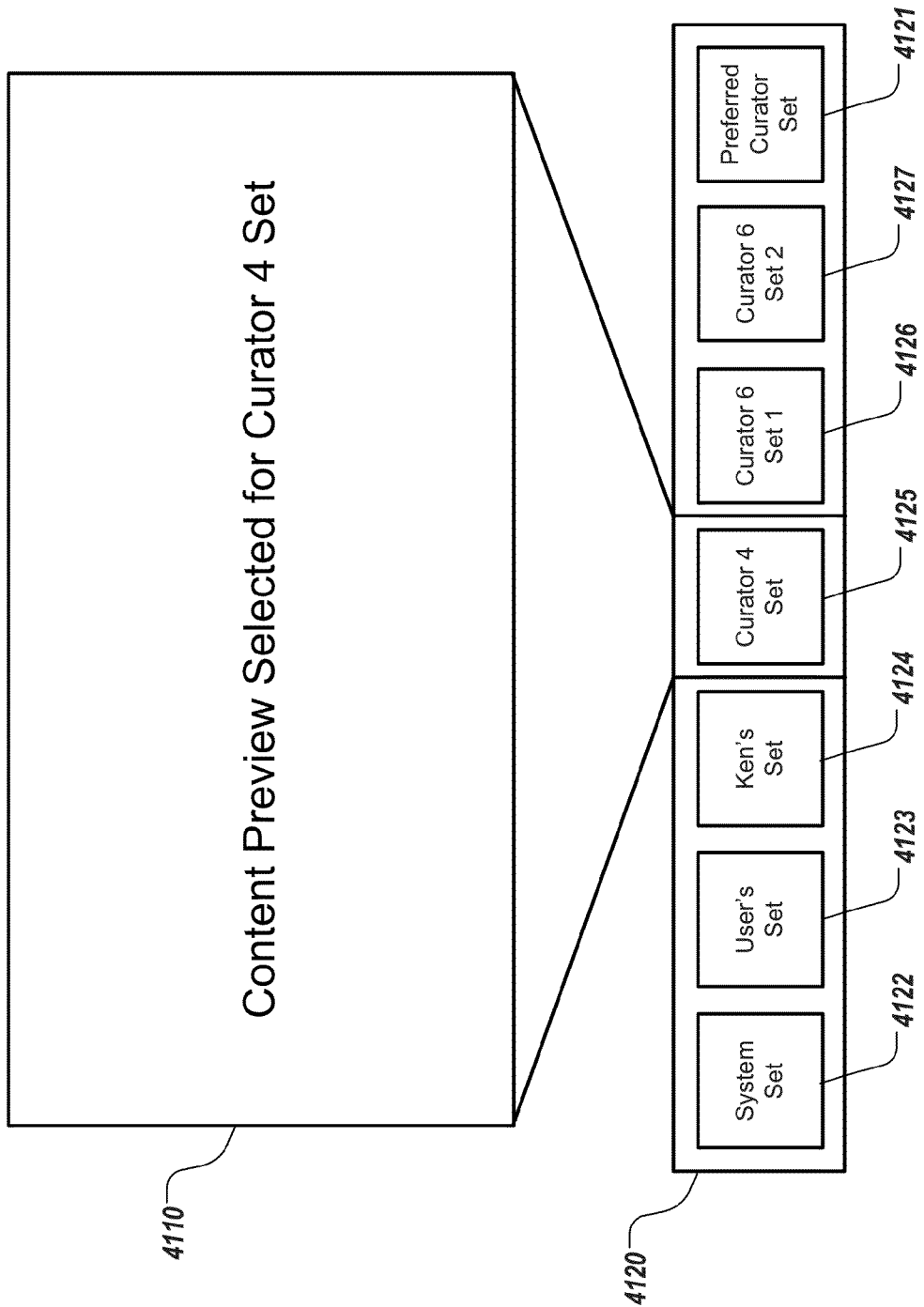

FIG. 42 illustrates the display of the index channel shown in FIG. 41 after the system has moved to the next set within the set index channel. As shown in FIG. 42, a content preview file from the Curator 4 set 4125 has been selected and begun playing in the display area 4110. In addition, the sets included in the set index channel representation 4120 have been rotated in accordance with the change in position within the set index channel. As shown, each of the sets 4122, 4123, 4124, 4125, 4126, and 4127 have been moved one position to the left and the set 4121 has been moved to the rightmost position in the set index channel representation 4120. In this regard, the set index channel operates in a circular manner such that the system 200 continuously cycles through all of the sets in the set index channel representation 4120 while the set index channel is displayed. In other implementations, the positions of the sets in the index may be fixed and the rightmost position in the set index channel representation 4120 may be left unfilled or filled by a previously undisplayed set, instead of the set 4121.

The system 200 may use a variety of techniques to select which content preview file from the set to display. For example, the system 200 may use the order of channels in the set and the order of episodes in the channels to select the content preview file. In this example, when the index channel first displays a particular set, the system 200 selects a content preview file for the first episode arranged in the first channel in the particular set. The next time the index channel displays the particular set the system may display a content preview file for the second episode arranged in the first channel in the particular set or a content preview file for the first episode arranged in the second channel in the particular set, depending on the preference of the content provider associated with the particular set and/or the user.

In another example, the content provider associated with the particular set may select an order for the content preview files displayed for the particular set that diverges from the order defined by the set or channels within the set. For instance, although it may make sense to view a series of episodes in a channel chronologically, the content provider may select a content preview file from a later episode to be displayed first because the content preview file from the later episode may present a more interesting storyline and may be more likely to get user's interested in the channel. Similarly, although it may make sense to arranged channels in a set alphabetically, the content provider may select to display a content preview file from a channel that is arranged later in the alphabetic list first because that channel is the most popular.

Further, selection of the content preview file to display for a set may be randomly selected. For example, when the index channel is positioned at a particular set, the system 200 may randomly select a channel within the set and then randomly select a content preview file from the randomly selected channel. In this example, rules may specify that all content preview files within the particular set must be displayed once prior to any content preview files in the particular set being played twice. Rules also may specify that a content preview file from each channel must be displayed before any channel is repeated.

Although FIGS. 41 and 42 have been described in terms of the index channel moving to the next set after a single content preview file from the set has been played, other implementations are possible. For instance, the system 200 may play all content preview files from a set before moving to the next set. Alternatively, the system 200 may play one content preview file from each channel in a set before moving to the next set. Any number or combination of content preview files may be displayed before moving to the next set and a content curator and/or the user may define how the system 200 plays content preview files in automatically moving through the set index channel.

Figure 43:
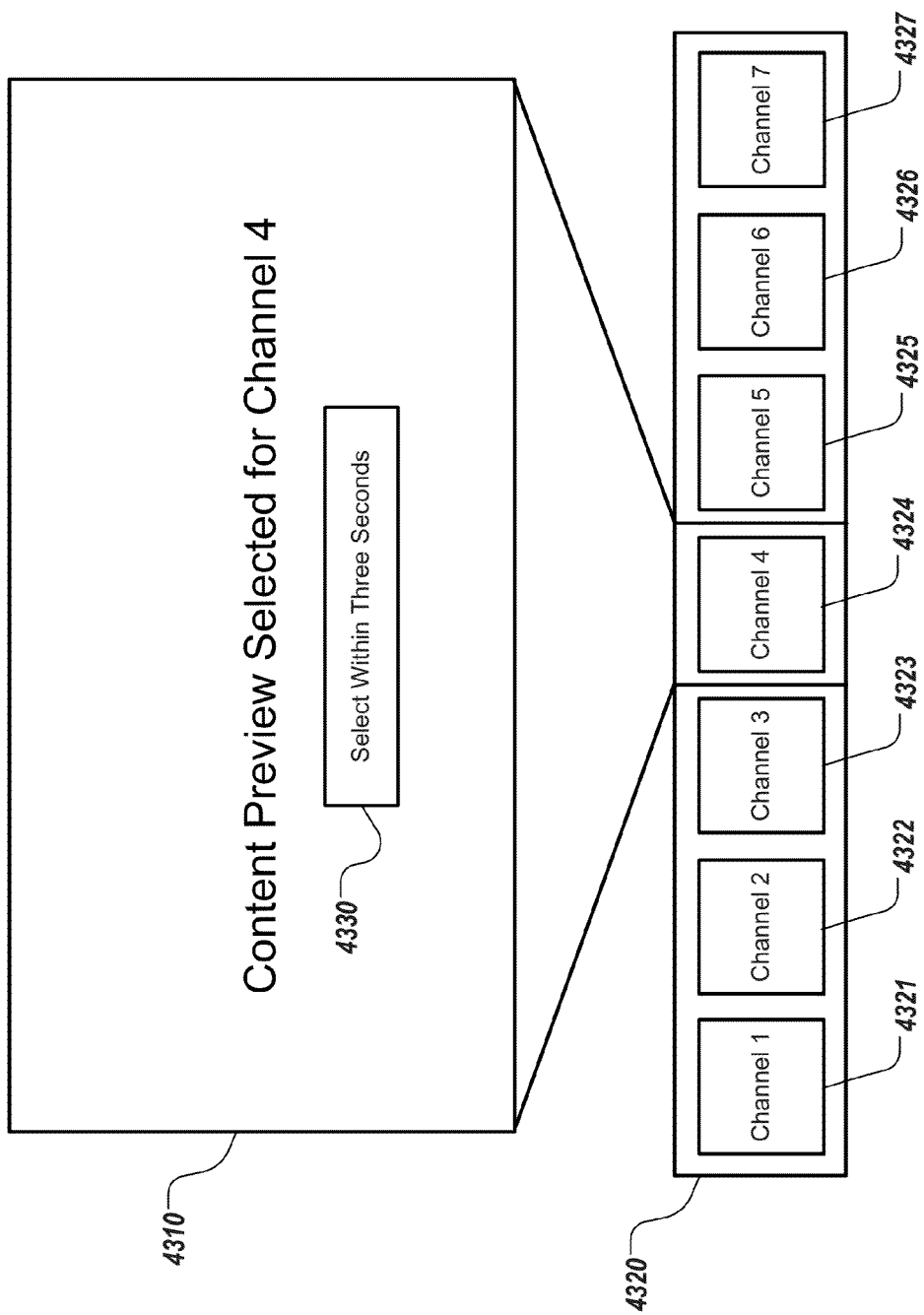

FIG. 43 illustrates an example display of an index channel. The display of the index channel may be presented on any suitable display device, such as a television, a computer display, a tablet computer, or a smartphone, and may be driven by a media player connected to the content delivery network. In the example shown in FIG. 43, the display of the index channel includes a display area 4310 that displays a content preview file and a channel index channel representation 4320 that corresponds to a set of channels. The display area 4310 displays content (e.g., a video) of a content preview file from one of the channels shown in the channel index channel representation 4320. A user may provide input selecting the display area 4310 to cause a full screen view of the episode associated with the displayed content preview file to be displayed. Selection of the display area 4310 may result in tuning to the channel associated with the displayed content preview file.

The channel index channel representation 4320 illustrates the channels arranged in the channel index channel representation 4320. In this example, the channel index channel representation 4320 includes channels organized in a set of channels, such as a set of channels to which the user has subscribed. As shown, the channel index channel representation 4320 includes a first channel 4321, a second channel 4322, a third channel 4323, a fourth channel 4324, a fifth channel 4325, a sixth channel 4326, and a seventh channel 4327. The double lines in the center of the channel index channel representation 4320 indicate the channel that corresponds to the content preview file being displayed in the display area 4310. In the example shown in FIG. 43, a content preview file selected from the fourth channel 4324 has just completed playing in the display area 4310.

In some implementations, a user may be able to provide input to move the channels in the channel index channel representation 4320 to cause a different channel to be positioned within the double lines and, as a consequence, change the position within the channel index channel and cause a content preview file from a different channel to be displayed. In these implementations, the channels in the channel index channel representation 4320 may be moved using left or right arrow inputs or through a click or touch and drag operation.

In addition, a user may provide input selecting one of the channels in the channel index channel representation 4320. Selection of a channel represented in the channel index channel representation 4320 may cause display of an index channel for the selected channel. In this regard, selection of a channel represented in the channel index channel representation 4320 may result in traversing to a lower level in the hierarchy of index channels shown in FIG. 40. For instance, selection of a channel represented in the channel index channel representation 4320 may result in the display of the index channel shown in FIG. 43 being replaced with the display of the index channel shown in FIGS. 45 and 46, discussed below.

In some examples, the channel index channel representation 4320 automatically rotates to the next channel in the channel index channel as each content preview file completes and the user does not provide input to view the episode associated with the content preview file. In these examples, when a content preview file completes, the system 200 may display a message 4330 indicating that the content preview file will be switched to a new content preview file to the extent the user does not provide input selecting to view the episode corresponding to the content preview file within a threshold period of time. As shown in FIG. 43, the system 200 has detected completion of the content preview file selected from the fourth channel 4324, displays the message 4330 to indicate that the user has three seconds to select the content preview file selected from the fourth channel 4324, waits for three seconds for the user to provide input selecting the content preview file, and then moves to a content preview file from the next channel within the channel index channel based on a determination that input selecting the content preview file has not been received by the expiration of the three seconds. Providing the message 4330 and waiting a short period of time may be helpful to alert the user that the content preview file has ended and the system 200 is transitioning to the next channel in the channel index channel. The period of time that the system 200 waits prior to transitioning to the next channel may be defined by a content curator and/or the user.

Figure 44:
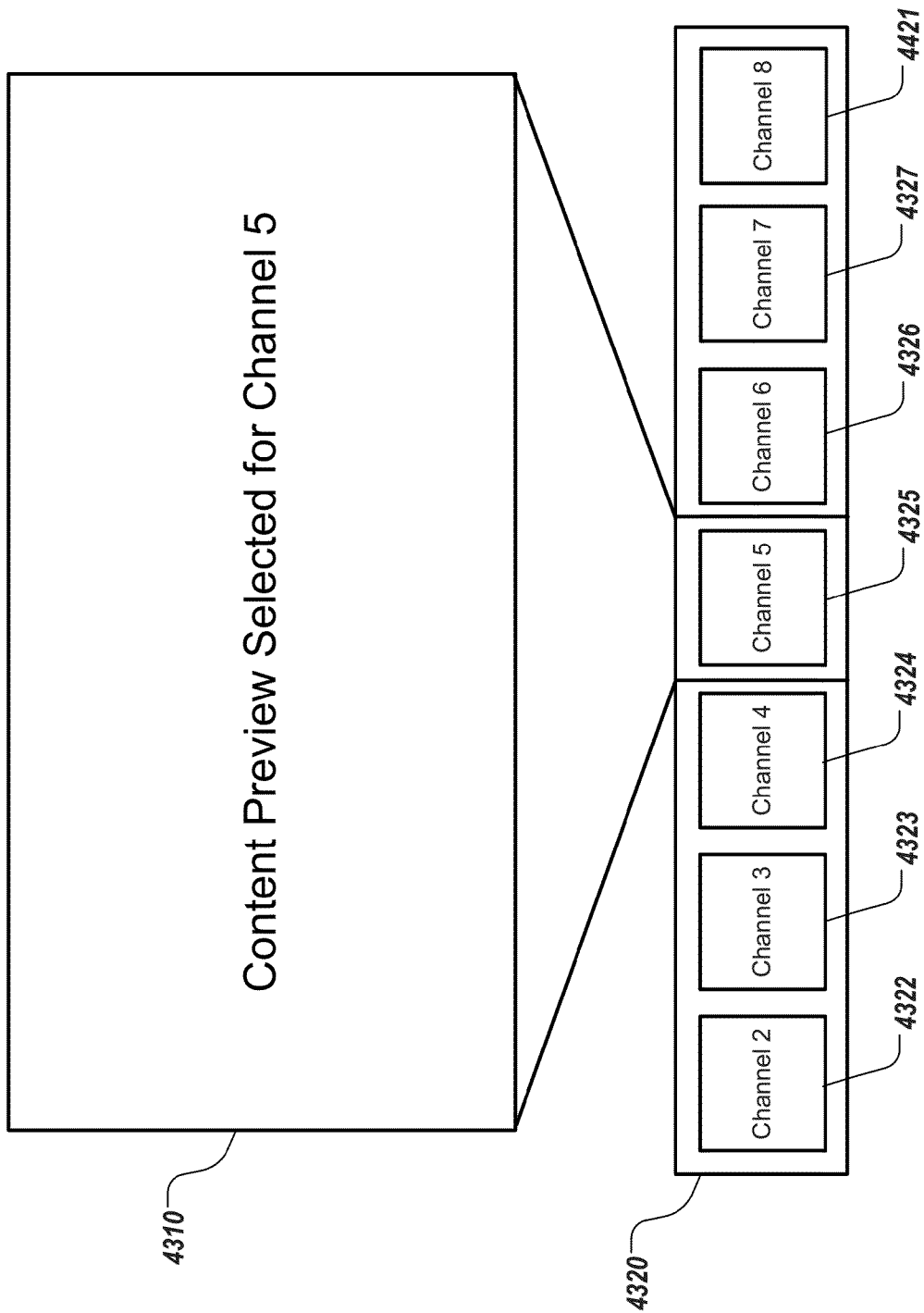

FIG. 44 illustrates the display of the index channel shown in FIG. 43 after the system has moved to the next channel within the channel index channel. As shown in FIG. 44, a content preview file from the fifth channel 4325 has been selected and begun playing in the display area 4310. In addition, the channels included in the channel index channel representation 4320 have been rotated in accordance with the change in position within the channel index channel. As shown, each of the channels 4322, 4323, 4324, 4325, 4326, and 4327 have been moved one position to the left and an eighth channel 4421 has been moved to the rightmost position in the channel index channel representation 4320. In this regard, the channel index channel representation 4320 has a fixed size and cannot display a representation of all channels included in the channel index channel. As such, the channel index channel representation 4320 provides a window into a portion of the channel index channel positioned near the current position in the channel index channel.

The system 200 may use a variety of techniques to select which content preview file from the channel to display. For example, the system 200 may use the order of episodes in the channel to select the content preview file. In this example, when the index channel first displays a particular channel, the system 200 selects a content preview file for the first episode arranged in the particular channel. The next time the index channel displays the particular channel the system may display a content preview file for the second episode arranged in the particular channel.

In another example, the content curator associated with the particular channel may select an order for the content preview files displayed for the particular channel that diverges from the order defined by the particular channel. For instance, although it may make sense to view a series of episodes in a channel chronologically, the content curator may select a content preview file from a later episode to be displayed first because the content preview file from the later episode may present a more interesting storyline and may be more likely to get user's interested in the channel.

Further, selection of the content preview file to display for a channel may be randomly selected. For example, when the index channel is positioned at a particular channel, the system 200 may randomly select an episode from the particular channel and use a content preview file that corresponds to the selected episode. In this example, rules may specify that all content preview files within the particular channel must be displayed once prior to any content preview files in the particular channel being played twice.

Although FIGS. 43 and 44 have been described in terms of the index channel moving to the next channel after a single content preview file from the channel has been played, other implementations are possible. For instance, the system 200 may play all content preview files from a channel before moving to the next channel. Any number or combination of content preview files may be displayed before moving to the next channel and a content curator and/or the user may define how the system 200 plays content preview files in automatically moving through the channel index channel.

Figure 45:
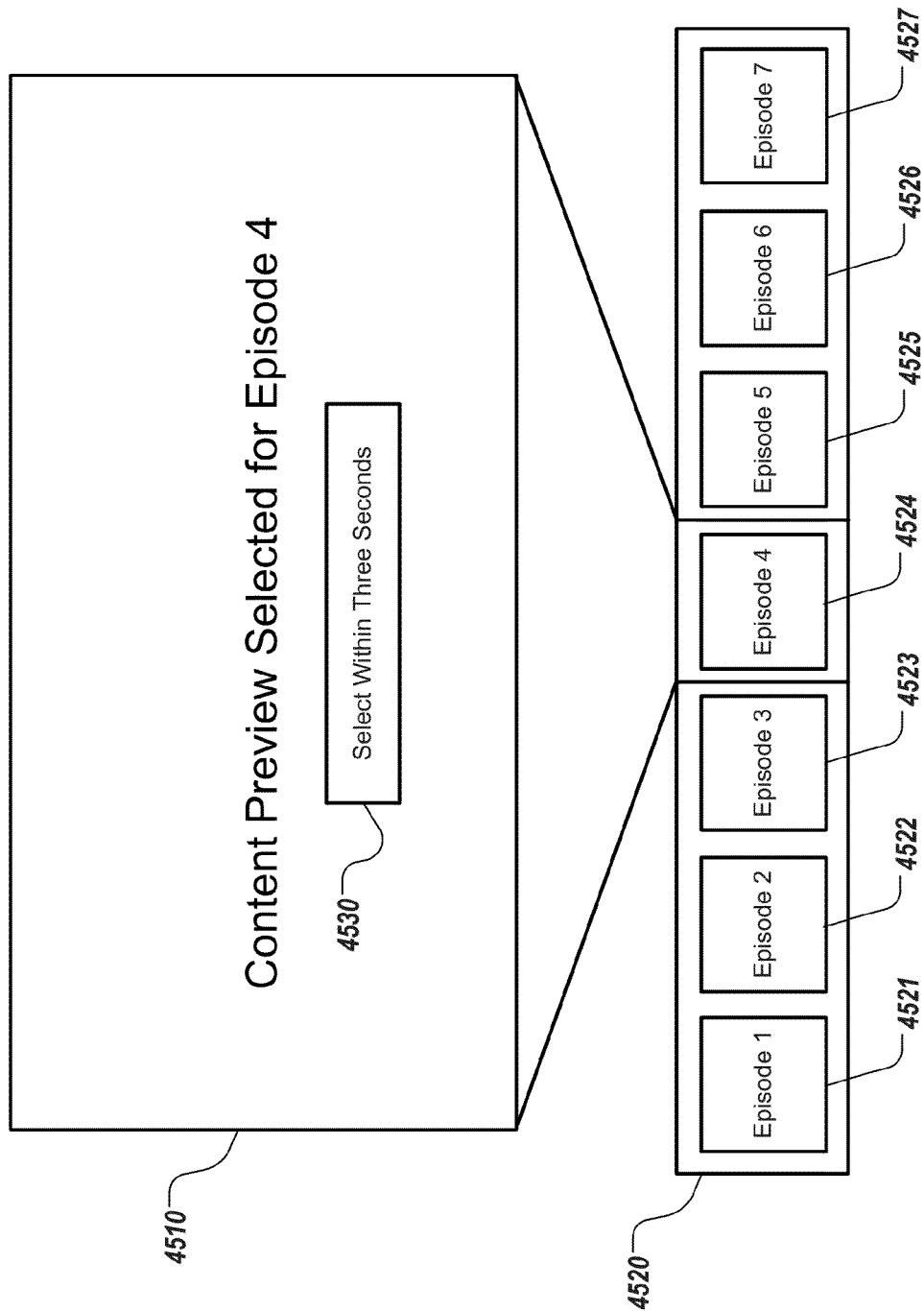

FIG. 45 illustrates an example display of an index channel. The display of the index channel may be presented on any suitable display device, such as a television, a computer display, a tablet computer, or a smartphone, and may be driven by a media player connected to the content delivery network. In the example shown in FIG. 45, the display of the index channel includes a display area 4510 that displays a content preview file and an episode index channel representation 4520 that corresponds to a channel. The display area 4510 displays content (e.g., a video) of a content preview file from one of the episodes shown in the episode index channel representation 4520. A user may provide input selecting the display area 4510 to cause a full screen view of the episode associated with the displayed content preview file to be displayed.

The episode index channel representation 4520 illustrates the episodes arranged in the episode index channel representation 4520. In this example, the episode index channel representation 4520 includes episodes organized in a channel, such as a channel to which the user has subscribed. As shown, the episode index channel representation 4520 includes a first episode 4521, a second episode 4522, a third episode 4523, a fourth episode 4524, a fifth episode 4525, a sixth episode 4526, and a seventh episode 4527. The double lines in the center of the episode index channel representation 4520 indicate the episode that corresponds to the content preview file being displayed in the display area 4510. In the example shown in FIG. 45, a content preview file for the fourth episode 4524 has just completed playing in the display area 4510.

In some implementations, a user may be able to provide input to move the episodes in the episode index channel representation 4520 to cause a different episode to be positioned within the double lines and, as a consequence, change the position within the episode index channel and cause a content preview file from a different episode to be displayed. In these implementations, the episodes in the episode index channel representation 4520 may be moved using left or right arrow inputs or through a click or touch and drag operation.

In some examples, the episode index channel representation 4520 automatically rotates to the next episode in the episode index channel as each content preview file completes and the user does not provide input to view the episode associated with the content preview file. In these examples, when a content preview file completes, the system 200 may display a message 4530 indicating that the content preview file will be switched to a new content preview file to the extent the user does not provide input selecting to view the episode corresponding to the content preview file within a threshold period of time. As shown in FIG. 45, the system 200 has detected completion of the content preview file selected from the fourth episode 4524, displays the message 4530 to indicate that the user has three seconds to select the content preview file selected from the fourth episode 4524, waits for three seconds for the user to provide input selecting the content preview file, and then moves to a content preview file from the next episode within the episode index channel based on a determination that input selecting the content preview file has not been received by the expiration of the three seconds. Providing the message 4530 and waiting a short period of time may be helpful to alert the user that the content preview file has ended and the system 200 is transitioning to the next episode in the episode index channel. The period of time that the system 200 waits prior to transitioning to the next episode may be defined by a content curator and/or the user.

Figure 46:
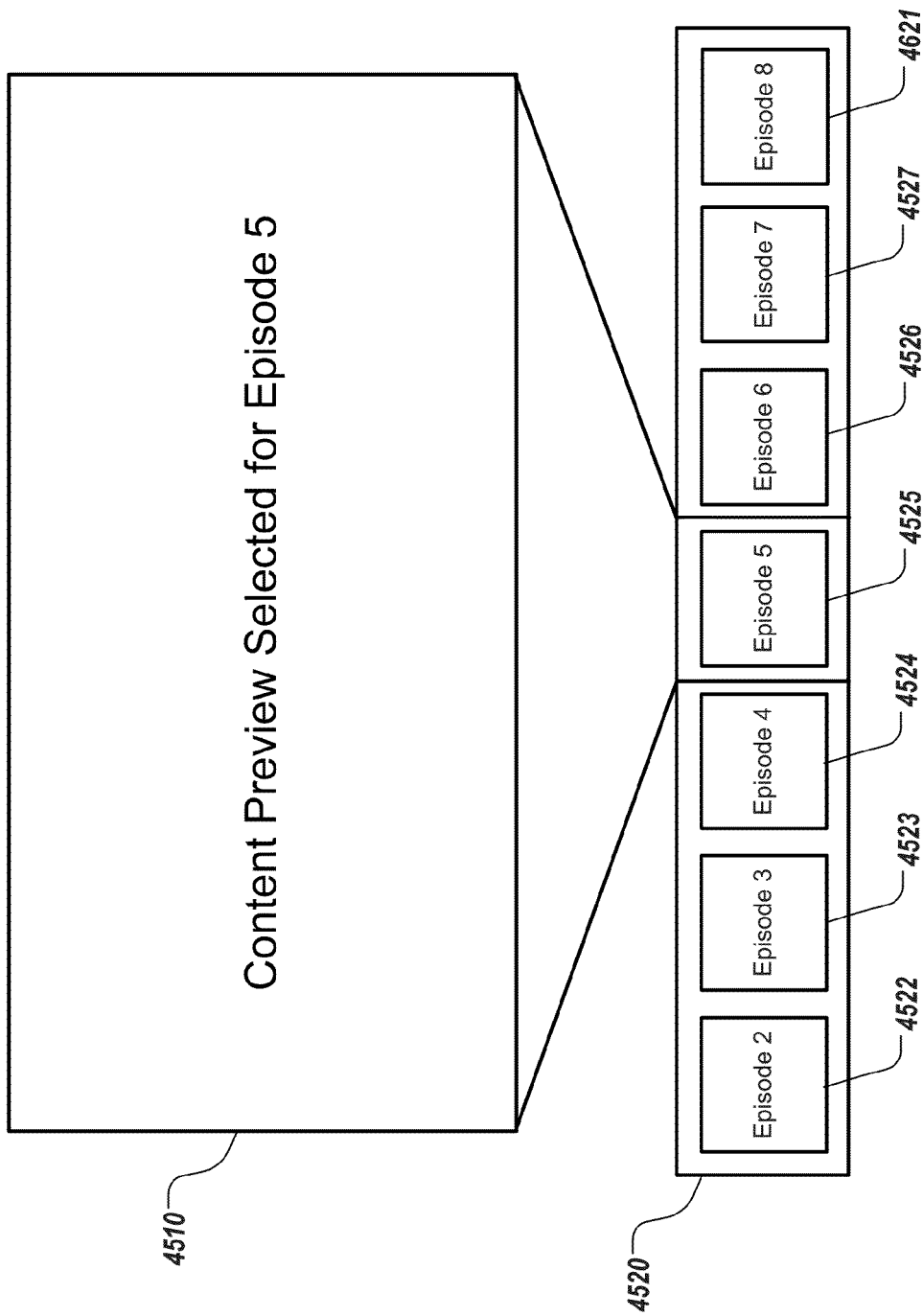

FIG. 46 illustrates the display of the index channel shown in FIG. 45 after the system has moved to the next episode within the episode index channel. As shown in FIG. 46, a content preview file from the fifth episode 4525 has begun playing in the display area 4510. In addition, the episodes included in the episode index channel representation 4520 have been rotated in accordance with the change in position within the episode index channel. As shown, each of the episodes 4522, 4523, 4524, 4525, 4526, and 4527 have been moved one position to the left and an eighth episode 4621 has been moved to the rightmost position in the episode index channel representation 4520. In this regard, the episode index channel representation 4520 has a fixed size and cannot display a representation of all episodes included in the channel.

As such, the episode index channel representation 4520 provides a window into a portion of the channel positioned near the current position in the episode index channel.

Figure 47:
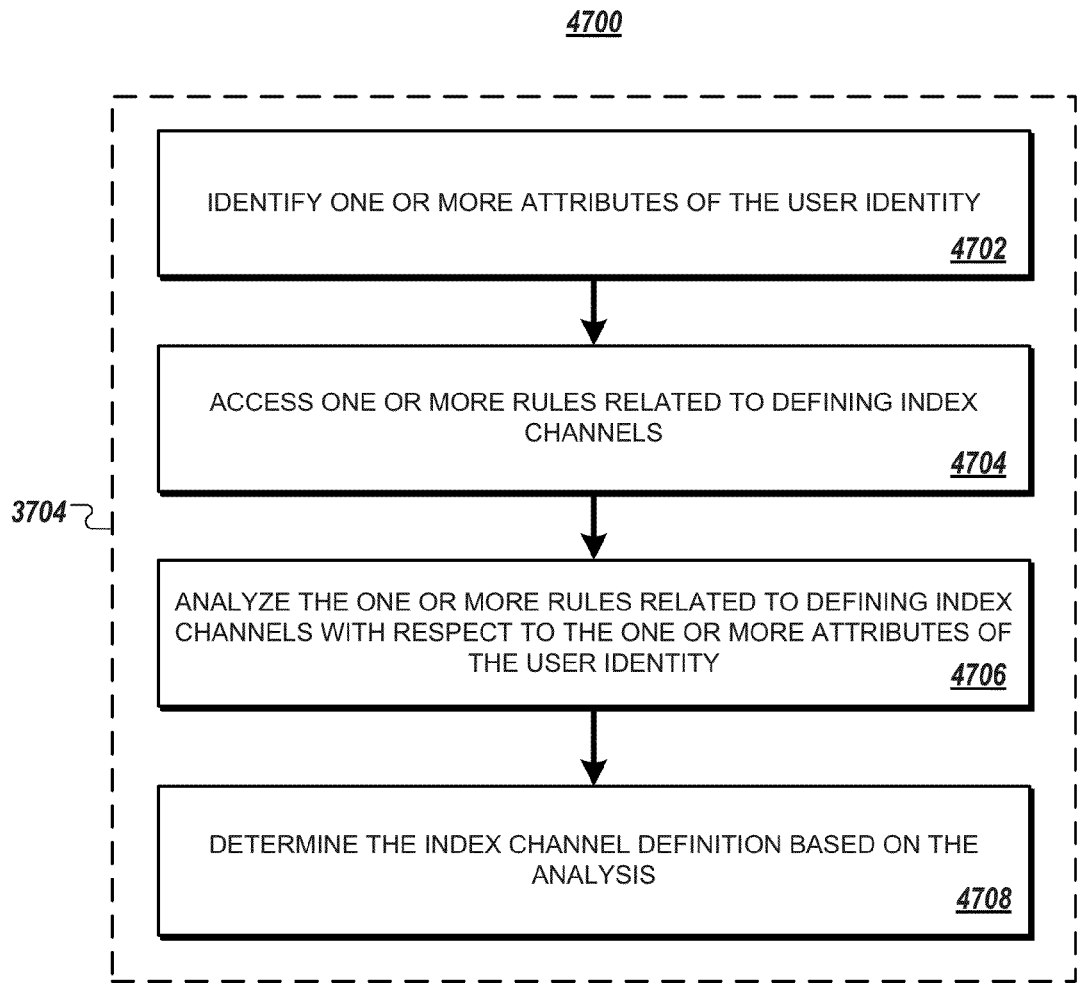

FIG. 47 illustrates a process 4700 for determining an index channel definition. The operations of the process 4700 are described generally as being performed by the system 200. The operations of the process 4700 may be performed by one of the components of the system 200 (e.g., the server system 210) or may be performed by a combination of the components of the system 200. In some implementations, operations of the process 4700 may be performed by one or more processors included in one or more electronic devices.

The system 200 identifies one or more attributes of the user identity (4702). For example, attributes of the user identity may include channels/channel sets to which the user identity subscribes, a viewing history of the user identity, a history of interaction with points of interest by the user identity, a viewing market within which a user associated with the user identity is located, demographics of the user identity, a psychographic profile of the user identity, a time of day, or a season of the year.

The system 200 accesses one or more rules related to defining index channels (4704). For example, rules related to defining an index channel may include rules defining what channels/channel sets to include in an index channel based on one or more of the user identity attributes, rules defining an order of channels/channel sets within an index channel based on one or more of the user identity attributes, and/or rules defining what index channels to provide to the user identity based on one or more of the user identity attributes. For instance, a rule may require that channels/channel sets to which the user identity subscribes must be included in an index channel. In another example, a rule may define one or more channels/channel sets to which the user identity is not subscribed, but which are similar to the channels/channel sets to which the user identity is subscribed. In addition, rules may be used to comply with agreements with content providers or they may be used to promote well performing content providers. Additionally, rules may be different in different viewing markets and geographical regions, for example. In some implementations, the rules may be prioritized or ranked. The rules may be dynamic and adaptive to changes in content, content providers, or advertisers.

The system 200 analyzes the one or more rules related to defining index channels with respect to the one or more attributes of the user identity (4706). For example, the system 200 analyzes the one or more rules related to defining index channels with respect to the user identity attributes to determine which rules to apply to the user identity attributes. For example, system 200 may analyze the one or more rules to determine which rules apply based on the user identity's viewing history or the channels/channel sets to which the user identity subscribes. In another example, system 200 may analyze the one or more rules to determine which rules apply in the viewing market within which the user identity is located. Different content providers may serve different viewing markets, for instance.

The system 200 determines the index channel definition based on the analysis (4708). For example, system 200 applies the appropriate rules to the user identity attributes to determine the appropriate channels/channel sets to include in an index channel for the user identity, an order of the channels/channel sets in the index channel for the user identity, and/or which index channels to provide to the user identity.

The operations described above with respect to FIGS. 37-47 may be performed on any suitable media device (e.g., a television, a mobile device, a computer, etc.) that is capable of outputting the interfaces described with respect to FIGS. 37-47 and receiving input from a suitable input device (e.g., a remote control device, a touch screen interface, a mouse and keyboard, etc.) in performing the operations described with respect to FIGS. 37-47. For example, index channels may be displayed on a television and interacted with through commands received from a remote control device operated by a user perceiving the index channels. In this example, the user may navigate through the index channels by providing input using the remote control device and then select episodes and return to index channels (e.g., hyper video) by providing input using the remote control device. In another example, index channels may be displayed on a mobile device and interacted with through input (e.g., touch events, swiping gestures, etc.) applied to a touch screen interface of the mobile device. In this example, the user may navigate through index channels by providing swiping gestures (e.g., horizontal swiping gestures in a left or right direction) to the touch screen interface of the mobile device and then select episodes and return to index channels (e.g., hyper video) by providing touch events to the touch screen interface of the mobile device. In yet another example, index channels may be displayed on a computer and interacted with through commands received from a mouse and/or keyboard operated by a user perceiving the index channels. In this example, the user may navigate through index channels by providing input using the mouse and/or keyboard and then select episodes and return to index channels (e.g., hyper video) by providing input using the mouse and/or keyboard.

Figure 48:
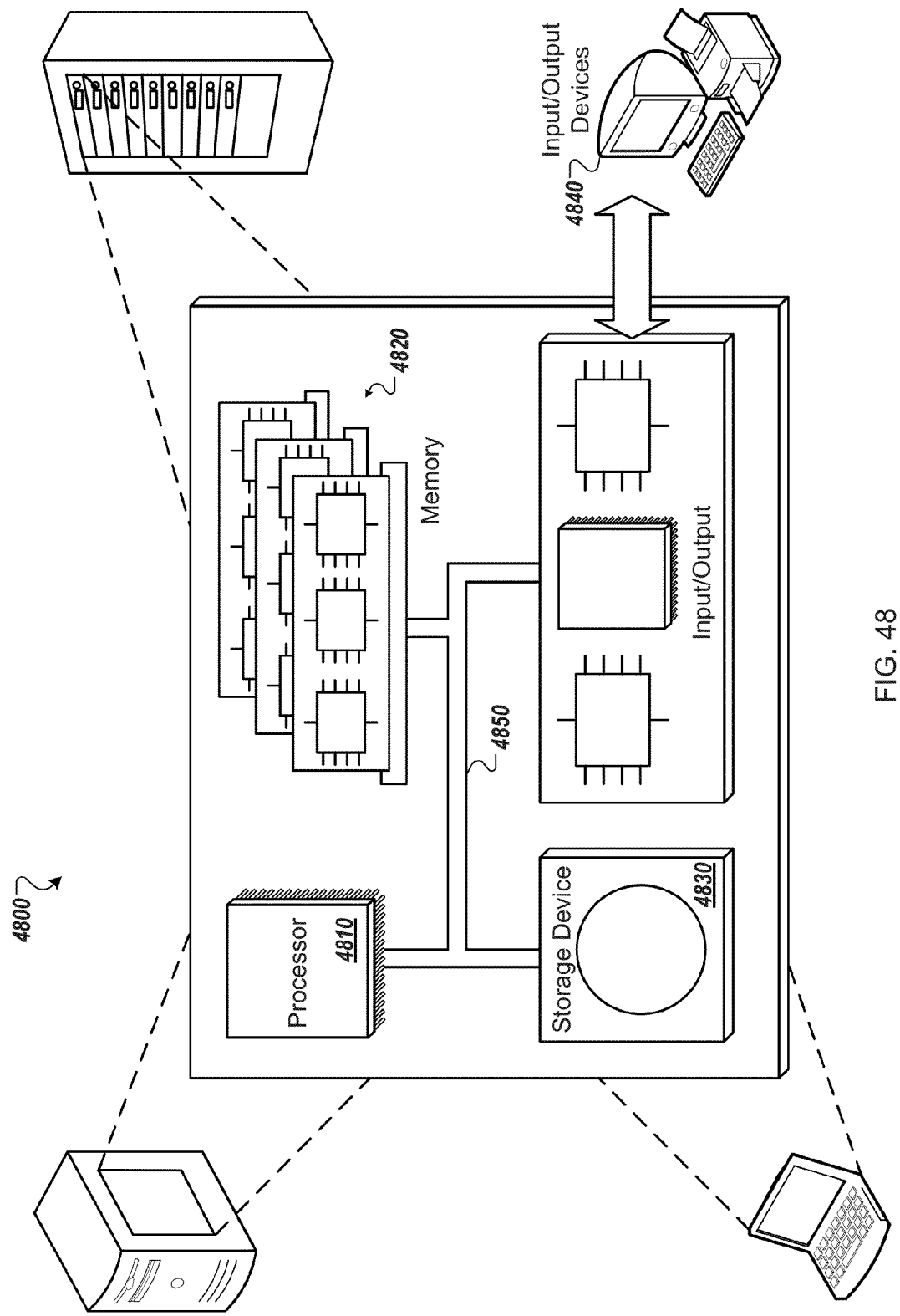

FIG. 48 is a schematic diagram of an example of a generic computer system 4800. The system 4800 can be used for the operations described in association with the processes 300, 400, 500, 600, 700, 800, 1100, 1200, 1400, 1600, 2600, 2700, 2800, 3000, 3200, 3600, 3700, and 4700 according to one implementation. For example, the system 4800 may be included in either or all of the server system 210 and the server 216.

The system 4800 includes a processor 4810, a memory 4820, a storage device 4830, and an input/output device 4840. Each of the components 4810, 4820, 4830, and 4840 are interconnected using a system bus 4850. The processor 4810 is capable of processing instructions for execution within the system 4800. In one implementation, the processor 4810 is a single-threaded processor. In another implementation, the processor 4810 is a multi-threaded processor. The processor 4810 is capable of processing instructions stored in the memory 4820 or on the storage device 4830 to display graphical information for a user interface on the input/output device 4840.

The memory 4820 stores information within the system 4800. In one implementation, the memory 4820 is a computer-readable medium. In one implementation, the memory 4820 is a volatile memory unit. In another implementation, the memory 4820 is a non-volatile memory unit.

The storage device 4830 is capable of providing mass storage for the system 4800. In one implementation, the storage device 4830 is a computer-readable medium. In various different implementations, the storage device 4830 may be a floppy disk device, a hard disk device, an optical disk device, or a tape device.

The input/output device 4840 provides input/output operations for the system 4800. In one implementation, the input/output device 4840 includes a keyboard and/or pointing device. In another implementation, the input/output device 4840 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier, e.g., in a machine-readable storage device, for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The elements of a computer may include a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

A number of implementations have been described. Nevertheless, it will be understood that various modifications may be made without departing from the spirit and scope of the disclosure. Accordingly, other implementations are within the scope of the following claims.

What is claimed is:

1. A method of defining a point of interest for content, the method comprising:
    accessing data used in defining a point of interest that supplements content arranged in a channel associated with a content curator on a content delivery network, the accessed data defining:
        timing information that indicates when the point of interest is used to supplement content arranged in the channel associated with the content curator on the content delivery network,
        output information that defines how the point of interest is output with content arranged in the channel associated with the content curator on the content delivery network, and
        action information that defines one or more actions that occur based on user interaction with the point of interest;
    defining the point of interest based on the timing information, the output information, and the action information;
    associating the point of interest with at least one of (1) the channel associated with the content curator on the content delivery network and (2) a content link arranged in the channel associated with the content curator on the content delivery network;
    during a time at which a user has selected the channel associated with the content curator and is experiencing content defined by the channel associated with the content curator, controlling, based on the timing information and the output information, output of the point of interest in addition to the content defined by the channel associated with the content curator;
    receiving an indication that the user interacted with the point of interest output in addition to the content defined by the channel associated with the content curator;
    based on the indication that the user interacted with the point of interest, performing, by at least one processor, an action defined by the action information;
    tracking, across multiple, different content curators that define channels on the content delivery network, points of interests that have been defined by the multiple, different content curators and that have been output to users of the content delivery network;
    tracking, across the multiple, different content curators that define channels on the content delivery network, user responses to the points of interests that have been defined by the multiple, different content curators and that have been output to users of the content delivery network; and
    determining, for each of the multiple, different content curators, statistics related to use of points of interests by that content curator and effectiveness of points of interests defined by that content curator based on the tracking of the points of interests and the user responses to the points of interests.

2. The method of claim 1:
    wherein the timing information indicates that the point of interest is to be output at a specific time during output of content linked to by the content link arranged in the channel associated with the content curator on the content delivery network;
wherein associating the point of interest with at least one of (1) the channel associated with the content curator on the content delivery network and (2) a content link arranged in the channel associated with the content curator on the content delivery network comprises associating the point of interest with the content link arranged in the channel associated with the content curator on the content delivery network; and
wherein controlling, based on the timing information and the output information, output of the point of interest in addition to the content defined by the channel associated with the content curator comprises controlling, at the specific time during output of the content linked to by the content link, output of the point of interest in addition to the content linked to by the content link.

3. The method of claim 2, wherein associating the point of interest with the content link arranged in the channel associated with the content curator on the content delivery network comprises making the point of interest available in multiple channels that are associated with the content curator and that each include the content link.

4. The method of claim 2, further comprising withholding the point of interest from channels that are defined by other content curators on the content delivery network and that include the content link such that the point of interest is output only when the user is experiencing the content linked to by the content link from the channel associated with the content curator.

5. The method of claim 1:
wherein the timing information indicates that the point of interest is to be output at a specific time during selection of the channel associated with the content curator on the content delivery network;
wherein associating the point of interest with at least one of (1) the channel associated with the content curator on the content delivery network and (2) a content link arranged in the channel associated with the content curator on the content delivery network comprises associating the point of interest with the channel associated with the content curator on the content delivery network; and
wherein controlling, based on the timing information and the output information, output of the point of interest in addition to the content defined by the channel associated with the content curator comprises controlling, at the specific time during selection of the channel associated with the content curator, output of the point of interest in addition to the content defined by the channel associated with the content curator.

6. The method of claim 5, wherein controlling, at the specific time during selection of the channel associated with the content curator, output of the point of interest in addition to the content defined by the channel associated with the content curator comprises controlling, at the specific time during selection of the channel associated with the content curator, output of the point of interest regardless of how the channel has been controlled during selection such that the point of interest is output with different content for different users.

7. The method of claim 1:
wherein the timing information indicates a duration of how long the point of interest is output to supplement content arranged in the channel associated with the content curator on the content delivery network; and
wherein controlling, based on the timing information and the output information, output of the point of interest in addition to the content defined by the channel associated with the content curator comprises controlling, for the duration indicated by the timing information, output of the point of interest in addition to the content defined by the channel associated with the content curator.

8. The method of claim 1:
wherein the output information defines text to be displayed with content arranged in the channel associated with the content curator on the content delivery network; and
wherein controlling, based on the timing information and the output information, output of the point of interest in addition to the content defined by the channel associated with the content curator comprises adding the text defined by the output information to a display of the content defined by the channel associated with the content curator.

9. The method of claim 1:
wherein the output information defines one or more user input controls to be displayed with content arranged in the channel associated with the content curator on the content delivery network; and
wherein controlling, based on the timing information and the output information, output of the point of interest in addition to the content defined by the channel associated with the content curator comprises adding the one or more user input controls defined by the output information to a display of the content defined by the channel associated with the content curator.

10. The method of claim 1:
wherein the action information defines a notification action that occurs based on user interaction with the point of interest; and
wherein performing the action defined by the action information comprises:
accessing information defined, by the notification action, to be communicated to the user that interacted with the point of interest;
identifying communication information associated with the user that interacted with the point of interest, the communication information being for a communication mechanism that is different than a mechanism used in communicating the content defined by the channel associated with the content curator; and
sending, to the user that interacted with the point of interest using the identified communication information, the accessed information.

11. The method of claim 10:
wherein identifying communication information associated with the user that interacted with the point of interest comprises identifying an electronic mail address associated with the user that interacted with the point of interest; and
wherein sending, to the user that interacted with the point of interest using the identified communication information, the accessed information comprises sending, to the user that interacted with the point of interest using the identified electronic mail address, the accessed information.

12. The method of claim 10:
wherein identifying communication information associated with the user that interacted with the point of interest comprises identifying device information for a communication device of the user that is different than a device outputting the content defined by the channel associated with the content curator; and
wherein sending, to the user that interacted with the point of interest using the identified communication information, the accessed information comprises sending, to the communication device of the user using the identified device information, the accessed information.

13. The method of claim 1:
wherein the action information defines a scheduled notification action that occurs based on user interaction with the point of interest; and
wherein performing the action defined by the action information comprises:
  accessing information defined, by the scheduled notification action, to be communicated to the user that interacted with the point of interest;
  determining a time, defined by the scheduled notification action, at which to deliver the accessed information;
  identifying communication information associated with the user that interacted with the point of interest, the communication information being for a communication mechanism that is different than a mechanism used in communicating the content defined by the channel associated with the content curator;
  monitoring for the time at which to deliver the accessed information; and
  based on the monitoring, sending, using the identified communication information, the accessed information to the user that interacted with the point of interest at the time at which to deliver the accessed information.

14. The method of claim 1:
wherein the action information defines a poll action that occurs based on user interaction with the point of interest;
wherein controlling, based on the timing information and the output information, output of the point of interest in addition to the content defined by the channel associated with the content curator comprises controlling, based on the timing information and the output information, output of a poll with a question and multiple answer input controls in addition to the content defined by the channel associated with the content curator;
wherein receiving the indication that the user interacted with the point of interest output in addition to the content defined by the channel associated with the content curator comprises receiving an indication of a selection, by the user, of one of the multiple answer input controls; and
wherein performing the action defined by the action information comprises:
  determining an answer to the poll for the user that corresponds to the one of the multiple answer input controls selected by the user;
  updating data tracking results of the poll based on the determined answer to the poll for the user;
  determining a result of the poll based on the updated data tracking results of the poll; and
  controlling output, to the user, of the determined result of the poll.

15. The method of claim 1:
wherein the point of interest is an episode point of interest;
wherein the timing information indicates that the episode point of interest is to be output at a specific time during output of content linked to by the content link arranged in the channel associated with the content curator on the content delivery network; and
wherein associating the point of interest with at least one of (1) the channel associated with the content curator on the content delivery network and (2) a content link arranged in the channel associated with the content curator on the content delivery network comprises associating the episode point of interest with the content link arranged in the channel associated with the content curator on the content delivery network, further comprising:
receiving, from the content curator, additional input defining a channel point of interest that supplements content arranged in the channel associated with the content curator on the content delivery network, the received additional input defining:
  additional timing information that indicates when the channel point of interest is used to supplement content arranged in the channel associated with the content curator on the content delivery network,
  additional output information that defines how the channel point of interest is output with content arranged in the channel associated with the content curator on the content delivery network, and
  additional action information that defines one or more actions that occur based on user interaction with the channel point of interest;
defining the channel point of interest based on the additional timing information, the additional output information, and the additional action information;
associating the channel point of interest with the channel associated with the content curator on the content delivery network;
determining that the channel point of interest conflicts with the episode point of interest;
based on the determination that the channel point of interest conflicts with the episode point of interest, accessing one or more rules used in resolving conflicts for points of interest;
analyzing the channel point of interest and the episode point of interest with respect to the one or more rules; and
based on the analysis, selecting one of the channel point of interest and the episode point of interest to output in addition to the content defined by the channel associated with the content curator.

16. The method of claim 15:
wherein accessing one or more rules used in resolving conflicts for points of interest comprises accessing a rule that prioritizes channel points of interest over episode points of interest; and
wherein selecting one of the channel point of interest and the episode point of interest comprises selecting the channel point of interest.

17. The method of claim 1, wherein accessing data used in defining the point of interest that supplements content arranged in the channel associated with the content curator on the content delivery network comprises receiving, from the content curator, input defining the point of interest that supplements content arranged in the channel associated with the content curator on the content delivery network.

18. The method of claim 1, wherein accessing data used in defining the point of interest that supplements content arranged in the channel associated with the content curator on the content delivery network comprises automatically, without input from the content curator, determining data used in defining the point of interest based on one or more rules that control definition of points of interest for the channel associated with the content curator on the content delivery network.

19. The method of claim 1:
wherein controlling output of the point of interest in addition to the content defined by the channel associated with the content curator comprises controlling a television to output the point of interest in addition to the content defined by the channel associated with the content curator; and wherein receiving the indication that the user interacted with the point of interest output in addition to the content defined by the channel associated with the content curator comprises receiving, from a remote control that controls the television, one or more commands interacting with the point of interest.

20. The method of claim 1:
wherein controlling output of the point of interest in addition to the content defined by the channel associated with the content curator comprises controlling a mobile device to output the point of interest in addition to the content defined by the channel associated with the content curator; and
wherein receiving the indication that the user interacted with the point of interest output in addition to the content defined by the channel associated with the content curator comprises receiving, from a touch screen interface that controls the mobile device, touch input interacting with the point of interest.

21. The method of claim 1:
wherein controlling output of the point of interest in addition to the content defined by the channel associated with the content curator comprises controlling a computer to output the point of interest in addition to the content defined by the channel associated with the content curator; and
wherein receiving the indication that the user interacted with the point of interest output in addition to the content defined by the channel associated with the content curator comprises receiving, from at least one of a mouse and keyboard that control the computer, one or more commands interacting with the point of interest.

22. A system comprising:
at least one computer; and
at least one computer-readable medium coupled to the at least one computer having instructions stored thereon which, when executed by the at least one computer, causes the at least one computer to perform operations comprising:
  accessing data used in defining a point of interest that supplements content arranged in a channel associated with a content curator on a content delivery network, the accessed data defining:
    timing information that indicates when the point of interest is used to supplement content arranged in the channel associated with the content curator on the content delivery network,
    output information that defines how the point of interest is output with content arranged in the channel associated with the content curator on the content delivery network, and
    action information that defines one or more actions that occur based on user interaction with the point of interest;
  defining the point of interest based on the timing information, the output information, and the action information;
  associating the point of interest with at least one of (1) the channel associated with the content curator on the content delivery network and (2) a content link arranged in the channel associated with the content curator on the content delivery network;
  during a time at which a user has selected the channel associated with the content curator and is experiencing content defined by the channel associated with the content curator, controlling, based on the timing information and the output information, output of the point of interest in addition to the content defined by the channel associated with the content curator;
  receiving an indication that the user interacted with the point of interest output in addition to the content defined by the channel associated with the content curator;
  based on the indication that the user interacted with the point of interest, performing an action defined by the action information;
  tracking, across multiple, different content curators that define channels on the content delivery network, points of interests that have been defined by the multiple, different content curators and that have been output to users of the content delivery network;
  tracking, across the multiple, different content curators that define channels on the content delivery network, user responses to the points of interests that have been defined by the multiple, different content curators and that have been output to users of the content delivery network; and
  determining, for each of the multiple, different content curators, statistics related to use of points of interests by that content curator and effectiveness of points of interests defined by that content curator based on the tracking of the points of interests and the user responses to the points of interests.

23. At least one non-transitory computer-readable storage medium encoded with at least one computer program comprising instructions that, when executed, operate to cause a computer to perform operations comprising:
  accessing data used in defining a point of interest that supplements content arranged in a channel associated with a content curator on a content delivery network, the accessed data defining:
    timing information that indicates when the point of interest is used to supplement content arranged in the channel associated with the content curator on the content delivery network,
    output information that defines how the point of interest is output with content arranged in the channel associated with the content curator on the content delivery network, and
    action information that defines one or more actions that occur based on user interaction with the point of interest;
  defining the point of interest based on the timing information, the output information, and the action information;
  associating the point of interest with at least one of (1) the channel associated with the content curator on the content delivery network and (2) a content link arranged in the channel associated with the content curator on the content delivery network;
  during a time at which a user has selected the channel associated with the content curator and is experiencing content defined by the channel associated with the content curator, controlling, based on the timing information and the output information, output of the point of interest in addition to the content defined by the channel associated with the content curator;
  receiving an indication that the user interacted with the point of interest output in addition to the content defined by the channel associated with the content curator;

based on the indication that the user interacted with the point of interest, performing an action defined by the action information;

tracking, across multiple, different content curators that define channels on the content delivery network, points of interests that have been defined by the multiple, different content curators and that have been output to users of the content delivery network;

tracking, across the multiple, different content curators that define channels on the content delivery network, user responses to the points of interests that have been defined by the multiple, different content curators and that have been output to users of the content delivery network; and determining, for each of the multiple, different content curators, statistics related to use of points of interests by that content curator and effectiveness of points of interests defined by that content curator based on the tracking of the points of interests and the user responses to the points of interests.

\* \* \* \* \*